(12) United States Patent
Ito et al.

(10) Patent No.: US 7,084,944 B2
(45) Date of Patent: Aug. 1, 2006

(54) OPTICAL COMPENSATORY SHEET COMPRISING A BIAXIALLY STRETCHED CELLULOSE ACETATE FILM, POLARIZING PLATE AND LIQUID CRYSTAL DISPLAY

(75) Inventors: Yoji Ito, Kanagawa (JP); Masataka Ogawa, Kanagawa (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 18 days.

(21) Appl. No.: 10/276,258

(22) PCT Filed: May 15, 2001

(86) PCT No.: PCT/JP01/04041

§ 371 (c)(1),
(2), (4) Date: Nov. 15, 2002

(87) PCT Pub. No.: WO01/88574

PCT Pub. Date: Nov. 22, 2001

(65) Prior Publication Data

US 2003/0218709 A1    Nov. 27, 2003

(30) Foreign Application Priority Data

| May 15, 2000 | (JP) | ............................. 2000-141485 |
| Jun. 21, 2000 | (JP) | ............................. 2000-185810 |
| Aug. 22, 2000 | (JP) | ............................. 2000-251188 |
| Sep. 1, 2000 | (JP) | ............................. 2000-265651 |
| Sep. 19, 2000 | (JP) | ............................. 2000-283525 |
| Sep. 21, 2000 | (JP) | ............................. 2000-287403 |

(51) Int. Cl.
*G02F 1/1335* (2006.01)
*C09K 19/00* (2006.01)

(52) U.S. Cl. ...................... 349/117; 349/96; 349/121; 428/1.1

(58) Field of Classification Search ........ 349/117–121, 349/96, 98; 428/1.1, 1.33, 532
See application file for complete search history.

(56) References Cited

U.S. PATENT DOCUMENTS

| 5,472,538 | A | * | 12/1995 | Minakuchi et al. ............ 156/85 |
| 6,359,671 | B1 | * | 3/2002 | Abileah ....................... 349/119 |
| 6,380,996 | B1 | * | 4/2002 | Yokoyama et al. .......... 349/117 |
| 6,503,581 | B1 | * | 1/2003 | Shibue et al. ................. 428/1.1 |
| 6,630,973 | B1 | * | 10/2003 | Matsuoka et al. ........... 349/117 |

FOREIGN PATENT DOCUMENTS

| EP | 0911656 A2 | 4/1999 |
| JP | 3-64703 A | 3/1991 |
| JP | 7-140325 A | 6/1995 |
| JP | 8-43626 A | 2/1996 |
| JP | 9-127332 A | 5/1997 |

(Continued)

*Primary Examiner*—Tarifur R. Chowdhury
(74) *Attorney, Agent, or Firm*—Buchanan Ingersoll PC

(57) ABSTRACT

An optical compensatory sheet comprises a cellulose acetate film. The film contains 100 weight parts of cellulose acetate having an acetic acid content of 59.0 to 61.5% and 0.01 to 20 weight parts of an aromatic compound having at least two aromatic rings. The cellulose acetate film has an Re retardation value measured at 550 nm (Re550) in the range of 0 to 200 nm and an Rth retardation value measured at 550 nm (Rth550) in the range of 70 to 400 nm. The cellulose acetate film further has a thickness in the range of 10 to 70 μm. The optical compensatory sheet is used in a liquid crystal display.

15 Claims, 9 Drawing Sheets

FOREIGN PATENT DOCUMENTS

| | | |
|---|---|---|
| JP | 2000-111914 A | 4/2000 |
| JP | 2000-131524 A | 5/2000 |
| JP | 2000-284124 * | 10/2000 |
| JP | 2001-91743 A | 4/2001 |
| JP | 2001-98086 A | 4/2001 |

* cited by examiner

OPTICAL COMPENSATORY SHEET COMPRISING A BIAXIALLY STRETCHED CELLULOSE ACETATE FILM, POLARIZING PLATE AND LIQUID CRYSTAL DISPLAY

FIELD OF INVENTION

The present invention relates to an optical compensatory sheet, a polarizing plate and a liquid crystal display using the same.

BACKGROUND OF INVENTION

A cellulose acetate film is used in various photographic or optical elements because it is tough and has enough flame retardant properties. The cellulose acetate film is a representative photographic support. Further, the film is also used in a liquid crystal display. The cellulose acetate film has a high optical isotropy (giving relatively low retardation) compared with other polymer films. Accordingly, an optical isotropic film such as a protective film of a polarizing plate usually comprises the cellulose acetate film.

On the other hand, an optical compensatory sheet (phase retarder) in a liquid crystal display must have optical anisotropy (must give high retardation). Accordingly, a film of synthetic polymer (such as polycarbonate or polysulfone) giving high retardation is normally used as the compensatory sheet. In practice, the film of synthetic polymer is stretched to prepare a stretched birefringent film for the optical compensatory sheet.

As described above, generally in the technical field of optical elements, the synthetic polymer film is used as the element that must have optical anisotropy (must give high retardation), while the cellulose acetate film is used as the element that must have optical isotropy (must give low retardation).

In contrast, European Patent No. 0911656A2 discloses a cellulose acetate film giving such high retardation that it can be used as an optical anisotropic element. A liquid crystal display can give an image of high quality where the cellulose acetate film is provided between a polarizing plate and a liquid crystal cell.

In place of the stretched birefringent film, an optical compensatory sheet comprising a transparent support and a thereon provided optically anisotropic layer comprising discotic molecules has been proposed. The optically anisotropic layer is formed through the steps of aligning the discotic molecules and then fixing the alignment. The discotic molecules give large birefringence and have various alignment forms, and accordingly an optical compensatory sheet obtained from the discotic molecules has a specific optical characteristic that cannot be obtained from the conventional stretched birefringent film. The optical compensatory sheet comprising discotic molecules is described in Japanese Patent Provisional Publication No. 6(1994)-214116, U.S. Pat. Nos. 5,583,679, 5,646,703 and German Patent Publication No. 3,911,620A1.

The optical compensatory sheet is also used in a λ/4 plate, which is widely used in an anti-reflection film or a liquid crystal display. However, in spite of the name of λ/4, most λ/4 plates give λ/4 at particular wavelengths.

Japanese Patent Provisional Publication Nos. 5(1993)-27118 and 5(1993)-27119 disclose a λ/4 plate in which a birefringent film giving high retardation and another birefringent film giving low retardation are laminated so that their optical axes may be perpendicularly crossed. If the retardation difference of those films is kept λ/4 in the whole visible wavelength region, the λ/4 plate theoretically gives λ/4 in the whole visible wavelength region.

Japanese Patent Provisional Publication No. 10(1998)-68816 discloses a λ/4 plate giving λ/4 in a wide wavelength region. The disclosed λ/4 plate comprises laminated two films made of the same polymer, and one of the films gives λ/4 and the other gives λ/2 at the same wavelength. Japanese Patent Provisional Publication No. 10(1998)-90521 also describes another wide-ranging λ/4 plate comprising laminated two polymer films. As the polymer film used in the above disclosed λ/4 plates, a stretched film of synthetic polymer such as polycarbonate is used.

A liquid crystal display (hereinafter often referred to as LCD) is widely employed instead of CRT (cathode ray tube) because of its small thickness, lightweight, and low power consumption. The liquid crystal display generally comprises a pair of polarizing plates and a liquid crystal cell provided between them. The liquid crystal cell comprises a pair of substrates, rod-like liquid crystal molecules and an electrode layer. The rod-like liquid crystal molecules are provided between the substrates, and the electrode layer has a function of applying a voltage to the rod-like liquid crystal molecules. On each substrate, an orientation layer is provided to align the rod-like liquid crystal molecules. Each polarizing plate comprises a pair of transparent protective films and a polarizing membrane provided between them.

In the liquid crystal display, an optical compensatory sheet (phase retarder) is often provided between the liquid crystal cell and the polarizing plate, to prevent the displayed image from undesirable coloring. The layered composition of the polarizing plate (or polarizing membrane) and the optical compensatory sheet serves as an elliptically polarizing plate. The optical compensatory sheet also often enlarges a viewing angle of the liquid crystal cell. As the optical compensatory sheet, a stretched birefringent polymer film has been conventionally used.

In a TFT (thin film transistor) liquid crystal display of TN (twisted nematic) mode (which is widely and mainly used), the optical compensatory sheet is provided between the liquid crystal cell and the polarizing plate (in the manner described in Japanese Patent Provisional Publication No. 8(1996)-50206) to ensure an image of high quality. However, that liquid crystal display is often made relatively thick.

Japanese Patent Provisional Publication No. 1(1989)-68940 discloses another liquid crystal display. In the liquid crystal display, the optical compensatory sheet is provided on one surface of the polarizing membrane, and on the other surface an elliptically polarizing plate having a protective film is provided. That liquid crystal display can be made relatively thin, and can give an image with high contrast when seen frontally. However, the optical compensatory sheet in the display is often deformed (for example, by heat) to cause phase retardation. If so, when the display gives a black image, the transmittance at the peripheral part of the screen so increases that the displayed image is framed with leaked light. Thus, the liquid crystal display has insufficient durability.

In order to solve the above problem, Japanese Patent Provisional Publication No. 7(1995)-191217 and European Patent No. 0911656A2 disclose another liquid crystal display. In the disclosed display, an optically anisotropic layer comprising a discotic compound is provided on a transparent support to form an optical compensatory sheet serving as the protective film of the polarizing plate. That liquid crystal display can be made relatively thin, and has improved durability.

U.S. Pat. Nos. 4,583,825 and 5,410,422 disclose a liquid crystal display comprising a liquid crystal cell of bend alignment mode in which rod-like liquid crystal molecules in upper part and ones in lower part are aligned essentially in reverse (symmetrically). Since rod-like liquid crystal molecules in upper part and ones in lower part are symmetrically aligned, the liquid crystal cell of bend alignment mode has self-optical compensatory function. Therefore, this mode is referred to as OCB (optically compensatory bend) mode. The liquid crystal display of bend alignment mode has an advantage of responding rapidly.

The liquid crystal display of bend alignment mode responds rapidly, and gives a clear image within a wide viewing angle, as compared with a generally used display (e.g., a display of TN mode or STN mode). However, in order to take the place of CRT, the display of bend alignment mode must be further improved.

To improve the display of bend alignment mode, the optical compensatory sheet (which is generally used to improve a conventional display) may be used. However, a conventional compensatory sheet of stretched birefringent film cannot fully compensate the display of bend alignment mode.

As described above, an optical compensatory sheet comprising a transparent support and a thereon provided optically anisotropic layer comprising discotic molecules has been proposed in place of the stretched birefringent film. In fact, Japanese Patent Provisional Publication No. 9(1997)-197397 (corresponding to U.S. Pat. No. 5,805,253) and International Patent WO96/37804 (corresponding to European Patent Application No. 0783128A) disclose a liquid crystal display of bend alignment mode equipped with the optical compensatory sheet comprising discotic molecules. The compensatory sheet comprising discotic molecules remarkably improves the viewing angle of bend alignment mode display.

However, according to Japanese Patent Provisional Publication No. 11(1999)-316378, light at a particular wavelength often leaks to color the displayed image undesirably if the optical compensatory sheet comprising discotic molecules is used in the liquid crystal display of bend alignment mode. The publication reports that this undesired coloring is due to wavelength dependence of transmittance of the elliptically polarizing plate (layered composition of the polarizing device and the optical compensatory sheet).

In the publication, to avoid the undesired coloring, the polarizing membrane and the optical compensatory sheet are placed so that the average direction obtained by projecting normal of the disc plane of the discotic molecule onto the support may be essentially at the angle of 45° to the polarizing axis in the plane of polarizing membrane. The thus-placed optical compensatory sheet fully compensates the liquid crystal cell of bend alignment.

SUMMARY OF INVENTION

The inventors have found that, in the case where a polarizing plate in which an optical compensatory sheet (a cellulose acetate film or a cellulose acetate film having an optically anisotropic layer provided thereon) works as a protective film is attached on a large display panel (17 inches or more), the sheet cannot be fully prevented from deforming by heat to increase the transmittance at the peripheral part of the screen (consequently, to framewise leak light). Accordingly, it is necessary for the optical compensatory sheet not only to optically compensate a liquid crystal cell but also to have excellent durability against fluctuation of working conditions such as heat and moisture.

In the case where an optical compensatory sheet serves as a λ/4 plate, two polymer films are normally laminated to give λ/4 in a wide wavelength region. The films, however, must be carefully placed so that the angle between them may be strictly controlled.

Although a λ/4 plate consisting of one polymer film has been proposed, it hardly gives λ/4 in a wide wavelength region. Further, even if such single-film λ/4 plate is installed in a liquid crystal display, the viewing angle property is not so much improved as expected. On the other hand, if the single-film λ/4 plate is installed in a liquid crystal display of reflection type, the displayed image has contrast not inferior to an image given by a display equipped with the aforementioned λ/4 plate consisting of laminated films. However, when such display of reflection type is used in a mobile terminal device (particularly, when used as a large display of the device, for which displays of reflection type are generally used), it does not have enough durability against heat. In fact, the film of λ/4 plate is distorted with heat generated by elements of the display (e.g., backlight), and accordingly the retardation value becomes uneven and the slow axis changes its direction in the plane of the film. As a result, the transmittance at the peripheral part of the liquid crystal cell increases when the display gives a black image, and consequently the displayed image is framed with leaked light.

A polarizing plate used in a liquid crystal display comprises a pair of transparent protective films and a polarizing membrane provided between them. Therefore, if the aforementioned optical compensatory sheet is laminated on the polarizing membrane to form an elliptically polarizing plate, the compensatory sheet serves as the protective film (on one side) of the polarizing membrane. The thus-formed elliptically polarizing plate has a layered structure in which the transparent protective film, the polarizing membrane and the optical compensatory sheet are piled up in this order. Since the compensatory sheet replaces one protective film of the polarizing plate, the display can be made thinner and lighter. Further, in preparation of that display, the step of assembling the reduced element is omitted and hence troubles in assembling can be reduced.

In the case where a cellulose acetate film is used as the transparent protective film, it is a problem that the cellulose acetate film has poor affinity to the polarizing membrane (normally, which is made of polyvinyl alcohol). Actually, there is no adhesive that can strongly bond them together. In Japanese Patent Provisional Publication No. 8(1996)-94838, the transparent protective film is saponified to improve the affinity to the polarizing membrane. Through the saponification of the transparent protective film, ester bonds of cellulose acetate at the surface are partially hydrolyzed and reduced to hydroxyl groups of original cellulose. Since both cellulose and polyvinyl alcohol are polymers having hydroxyl groups, they have good affinity. Accordingly, the polarizing membrane and the saponified transparent protective film are easily combined.

The inventors have studied the polarizing plate comprising the protective film, the polarizing membrane and the optical compensatory sheet composed of a saponified cellulose acetate film, piled up in order. As a result, it is found that the optical functions of the optical compensatory sheet are impaired as compared with that before the saponification. Further, it is also found that the alkaline liquid used for the saponification yellows after the treatment. Furthermore, the inventers have found that there is room for improvement in the adhesion between the cellulose acetate film and the polarizing membrane.

As described above, a liquid crystal display is equipped with an optical compensatory sheet comprising a cellulose acetate film or a cellulose acetate film on which an optically anisotropic layer prepared from a liquid crystal compound is provided. In that display, the transmittance at the peripheral part of the screen often increases. In particular, if the display has a large screen, the transmittance at the peripheral part remarkably increases.

On the other hand, a cellulose acetate film has poor affinity to other elements (e.g., polarizing membrane, orientation layer), and accordingly the optical compensatory sheet should be improved in durability for practical use.

An object of the present invention is to provide an optical compensatory sheet that can optically compensate a liquid crystal cell without leaking light. The optical compensatory sheet aimed in the invention comprises a cellulose acetate film or a cellulose acetate film having an optically anisotropic layer provided thereon.

Another object of the invention is to provide an optical compensatory sheet (λ/4 plate) consisting of one cellulose acetate film and giving λ/4 in a wide wavelength region without leaking light.

A further object of the invention is to provide an optical compensatory sheet that can optically compensate a liquid crystal cell and that excels in adhesion onto a polarizing membrane.

A furthermore object of the invention is to provide an optical compensatory sheet whose optical functions are essentially not affected by saponification.

A still further object of the invention is to provide an excellent (elliptically) polarizing plate that does not leak light and that excels in the adhesion. In the aimed polarizing plate, an optical compensatory sheet and a polarizing membrane are unified.

A still furthermore object of the invention is to provide a circularly polarizing plate giving circularly polarized light in a wide wavelength region without leaking light and without causing troubles in the adhesion. In the aimed polarizing plate, a λ/4 plate (optical compensatory sheet) and a polarizing membrane are unified.

The other object of the invention is to provide a liquid crystal display (particularly, a display having a liquid crystal cell of OCB mode) that is optically compensated with an optical compensatory sheet without leaking light.

A liquid crystal cell is optically compensated with the optical compensatory sheet comprising a cellulose acetate film or a cellulose acetate film on which an optically anisotropic layer prepared from a liquid crystal compound is provided. According to the inventors' study, if the cellulose acetate film used for the compensatory sheet has a thickness in the range of 10 to 70 μm, the liquid crystal display is prevented from leaking light. The relation between the thickness of the cellulose acetate film and the leakage of light is described after.

The present invention provides an optical compensatory sheet comprising a cellulose acetate film which contains 100 weight parts of cellulose acetate having an acetic acid content of 59.0 to 61.5%, and 0.01 to 20 weight parts of an aromatic compound having at least two aromatic rings, wherein the cellulose acetate film has an Re retardation value measured at 550 nm (Re550) in the range of 0 to 200 nm, an Rth retardation value measured at 550 nm (Rth550) in the range of 70 to 400 nm, and a thickness in the range of 10 to 70 μm.

The retardation values in plane (Re) and in the thickness direction (Rth) of the film are defined by the following formulas (I) and (II), respectively.

$$Re = (nx - ny) \times d \quad \text{(I)}$$

$$Rth = [\{(nx + ny)/2\} - nz] \times d \quad \text{(II)}$$

In the formulas (I) and (II), nx is a refractive index along the slow axis (direction giving the maximum refractive index) in the plane of the film.

In the formulas (I) and (II), ny is a refractive index along the fast axis (direction giving the minimum refractive index) in the plane of the film.

In the formula (II), nz is a refractive index in the thickness direction of the film.

In the formulas (I) and (II), d is the thickness of the film in terms of nm.

The invention also provides a polarizing plate which comprises a pair of transparent protective films and a polarizing membrane provided between the films, one of said transparent protective films comprising a cellulose acetate film which contains 100 weight parts of cellulose acetate having an acetic acid content of 59.0 to 61.5% and 0.01 to 20 weight parts of an aromatic compound having at least two aromatic rings, wherein the cellulose acetate film has an Re retardation value measured at 550 nm (Re550) in the range of 0 to 200 nm, an Rth retardation value measured at 550 nm (Rth550) in the range of 70 to 400 nm, and a thickness in the range of 10 to 70 μm.

The invention further provides a liquid crystal display comprising a pair of polarizing plates and a liquid crystal cell provided between the plates, wherein each of the polarizing plates comprises a pair of transparent protective films and a polarizing membrane provided between the films, at least one of said transparent protective films placed between the cell and the membranes comprising a cellulose acetate film which contains 100 weight parts of cellulose acetate having an acetic acid content of 59.0 to 61.5% and 0.01 to 20 weight parts of an aromatic compound having at least two aromatic rings, wherein the cellulose acetate film has an Re retardation value measured at 550 nm (Re550) in the range of 0 to 200 nm, an Rth retardation value measured at 550 nm (Rth550) in the range of 70 to 400 nm, and a thickness in the range of 10 to 70 μm.

The invention furthermore provides a circularly polarizing plate which comprises an optical compensatory sheet and a linearly polarizing membrane, said compensatory sheet and said linearly polarizing membrane being so arranged that a slow axis in plane of the compensatory sheet is oriented essentially at an angle of 45° to a transmission axis of the linearly polarizing plate, said optical compensatory sheet comprising a cellulose acetate film which contains 100 weight parts of cellulose acetate having an acetic acid content of 59.0 to 61.5% and 0.01 to 20 weight parts of an aromatic compound having at least two aromatic rings, wherein the cellulose acetate film has an Re retardation value measured at 550 nm (Re550) in the range of 0 to 200 nm, an Rth retardation value measured at 550 nm (Rth550) in the range of 70 to 400 nm, a thickness in the range of 10 to 70 μm, an Re retardation value measured at 450 nm (Re450) in the range of 100 to 125 nm, and an Re retardation value measured at 590 nm (Re590) in the range of 120 to 160 nm, said Re450 and Re590 values satisfying the condition of Re590−Re450≧2 nm.

The invention still further provides a liquid crystal display of a reflection type comprising a reflection board, a liquid crystal cell and a polarizing membrane in this order, and a cellulose acetate film being provided between said reflection board and said polarizing membrane, wherein the cellulose acetate film contains 100 weight parts of cellulose acetate having an acetic acid content of 59.0 to 61.5% and 0.01 to 20 weight parts of an aromatic compound having at least two aromatic rings, said cellulose acetate film having an Re retardation value measured at 550 nm (Re550) in the range of 0 to 200 nm, an Rth retardation value measured at 550 nm (Rth550) in the range of 70 to 400 nm, a thickness in the range of 10 to 70 μm, an Re retardation value measured at 450 nm (Re450) in the range of 100 to 125 nm, and an Re retardation value measured at 590 nm (Re590) in the range of 120 to 160 nm, said Re450 and Re590 values satisfying the condition of Re590−Re450≧2 nm.

The invention still furthermore provides a liquid crystal display comprising a pair of polarizing plates and a liquid crystal cell of bend alignment mode provided between the plates, wherein at least one polarizing plate is an elliptically polarizing plate which comprises a first optically anisotropic layer comprising discotic molecules oriented in hybrid alignment, a second optically anisotropic layer comprising at least one cellulose acetate film, and a polarizing membrane, said polarizing membrane being arranged as an outermost layer, said first and second optically anisotropic layers and said polarizing membrane being so arranged that a direction giving the maximum refractive index in plane of the first optically anisotropic layer is oriented essentially at an angle of 45° to a transmission axis in plane of the polarizing membrane and that a direction giving the maximum refractive index in plane of the second optically anisotropic layer is directed essentially parallel or perpendicular to a transmission axis in plane of the polarizing membrane, wherein the cellulose acetate film of the second optically anisotropic layer contains 100 weight parts of cellulose acetate having an acetic acid content of 59.0 to 61.5% and 0.01 to 20 weight parts of an aromatic compound having at least two aromatic rings, said cellulose acetate film having an Re retardation value measured at 550 nm (Re550) in the range of 1 to 20 nm, an Rth retardation value measured at 550 nm (Rth550) in the range of 150 to 300 nm, and a thickness in the range of 10 to 70 μm.

Moreover, the invention provides a liquid crystal display comprising a pair of polarizing plates and a liquid crystal cell of bend alignment mode provided between the plates, wherein at least one polarizing plate is an elliptically polarizing plate which comprises a first optically anisotropic layer comprising discotic molecules oriented in hybrid alignment, a second optically anisotropic layer comprising at least one cellulose acetate film, and a polarizing membrane, said polarizing membrane being arranged as an outermost layer, said first and second optically anisotropic layers and said polarizing membrane being so arranged that a direction giving the maximum refractive index in plane of the first optically anisotropic layer is oriented essentially at an angle of 450 to a transmission axis in plane of the polarizing membrane and that a direction giving the maximum refractive index in plane of the second optically anisotropic layer is directed essentially parallel to a transmission axis in plane of the polarizing membrane, wherein the cellulose acetate film of the second optically anisotropic layer contains 100 weight parts of cellulose acetate having an acetic acid content of 59.0 to 61.5% and 0.01 to 20 weight parts of an aromatic compound having at least two aromatic rings, said cellulose acetate film having an Re retardation value measured at 550 nm (Re550) in the range of 20 to 100 nm, an Rth retardation value measured at 550 nm (Rth550) in the range of 150 to 300 nm, and a thickness in the range of 10 to 70 μm.

The thickness of the cellulose acetate film used in the optical compensatory sheet, the kind and the amount of the additive (the aromatic compound having at least two aromatic rings) and the production conditions (e.g., condition in stretching the film) are adequately controlled, and thereby the inventors have succeeded in optically compensating a liquid crystal cell without leaking light.

The inventors have also succeeded in providing an optical compensatory sheet (λ/4 plate) giving λ/4 in a wide wavelength region without leaking light. For the purpose of that, the thickness of cellulose acetate film, the kind and the amount of the additive (the aromatic compound having at least two aromatic rings) and the production conditions (e.g., condition in stretching the film) are adequately controlled. The provided λ/4 plate can remarkably improves the viewing angle of liquid crystal display.

Further, the invention provides an optical compensatory sheet (λ/4 plate) consisting of one cellulose acetate film and giving λ/4 in a wide wavelength, and thereby makes it unnecessary to perform the conventional production step in which two polymer films are carefully laminated so that the angle between them may be strictly controlled.

In the invention, in order to optically compensate a liquid crystal cell, the cellulose acetate film used for the optical compensatory sheet is made to have an Re retardation value measured at 550 nm (Re550) in the range of 0 to 200 nm and an Rth retardation value measured at 550 nm (Rth550) in the range of 70 to 400 nm.

Also in the invention, in order to prevent the transmittance from increasing (to prevent the leakage of light) at the peripheral area, the cellulose acetate film used for the optical compensatory sheet is made to have a thickness in the range of 10 to 70 μm. A conventional thin cellulose acetate film has such a low Rth value that it cannot fully optically compensate a liquid crystal cell. On contrast, however, the cellulose acetate film of the invention contains the additive by which the film can fully optically compensate a liquid crystal cell in spite of being thin enough to prevent the leakage of light. Since the cellulose acetate film has a thickness in the range of 10 to 70 μm, the leakage of light is avoided without impairing treatablity in producing the optical compensatory sheet or in laminating the compensatory sheet onto the polarizing membrane. Further, the optical compensatory sheet of the invention is thin enough to reduce both the production cost and the thickness of resultant liquid crystal display.

A polarizing plate comprises two protective films and a polarizing membrane provided between the films. The polarizing membrane is a stretched polyvinyl alcohol film adsorbed with iodine or dichromatic dye, and the protective film generally comprises a cellulose acetate film. If the aforementioned optical compensatory sheet is used as one of the protective films, the optical compensatory function is given to the polarizing plate without increasing the element. Further, if a surface of the cellulose acetate film is saponified to have a surface energy of 55 to 75 mN/m, the adhesion to polyvinyl alcohol is enhanced to prepare a polarizing plate excellent in durability. Furthermore, when the surface of the cellulose acetate film is saponified, the saponifying conditions are adequately controlled so that alkaline solution used for the saponification may be colored little and so that the saponification may not affect the optical characters of the compensatory sheet.

If cellulose acetate having an acetic acid content less than 59.0% is used, the aforementioned optical anisotropy can be easily realized. However, a film of such cellulose acetate has poor properties. In the invention, cellulose acetate having an acetic acid content of 59.0 to 61.5% is used, and the above retardation values are achieved by other means (by adding the additive, and by controlling the production conditions) to obtain a cellulose acetate film having both aimed optical anisotropy and excellent properties.

The aforementioned optical compensatory sheet and a polarizing plate comprising that sheet as a protective film can be advantageously used in liquid crystal displays of VA (vertically aligned) mode, OCB (optically compensated bend) mode and TN (twisted nematic) mode, and a display of reflection type.

The optical compensatory sheet can be advantageously used in a liquid crystal display of bend alignment mode (OCB type).

The liquid crystal display of bend alignment mode is equipped with an elliptically polarizing plate in which an optically compensatory sheet containing a discotic compound is used. For that optically compensatory sheet, a material giving high birefringence (e.g., polycarbonate) has been conventionally used.

According to the invention, the polarizing plate used in the display of bend alignment mode is composed of a polarizing membrane, an optically anisotropic layer comprising a discotic compound (hereinafter "first optically anisotropic layer") and at least one cellulose acetate film having particular optical characters (hereinafter "second optically anisotropic layer").

The first optically anisotropic layer and the polarizing membrane are placed so that the average direction obtained by projecting normal of the disc plane of the discotic compound onto the cellulose acetate film may be essentially at the angle of 45° to the transmission axis in the plane of polarizing membrane. Further, the second optically anisotropic layer and the polarizing membrane are placed so that the slow axis of the second anisotropic layer may be essentially parallel or perpendicular to the transmission axis in the plane of polarizing membrane. The display of bend alignment mode having that structure gives a completely optically compensated image, and black spots are not seen at the corners of the displayed image even if the display is used for a long time. Further, that display of OCB mode gives a display without leaking light.

In the present specification, the term "essentially parallel" means that the angle between the noticed directions is within the range of the strict angle ±5°. This angle allowance is preferably less than ±4°, more preferably less than ±3°, most preferably less than ±2°.

The terms "slow axis" and "transmission axis" mean the directions giving the maximum refractive index and the minimum refractive index, respectively.

Figure 1:
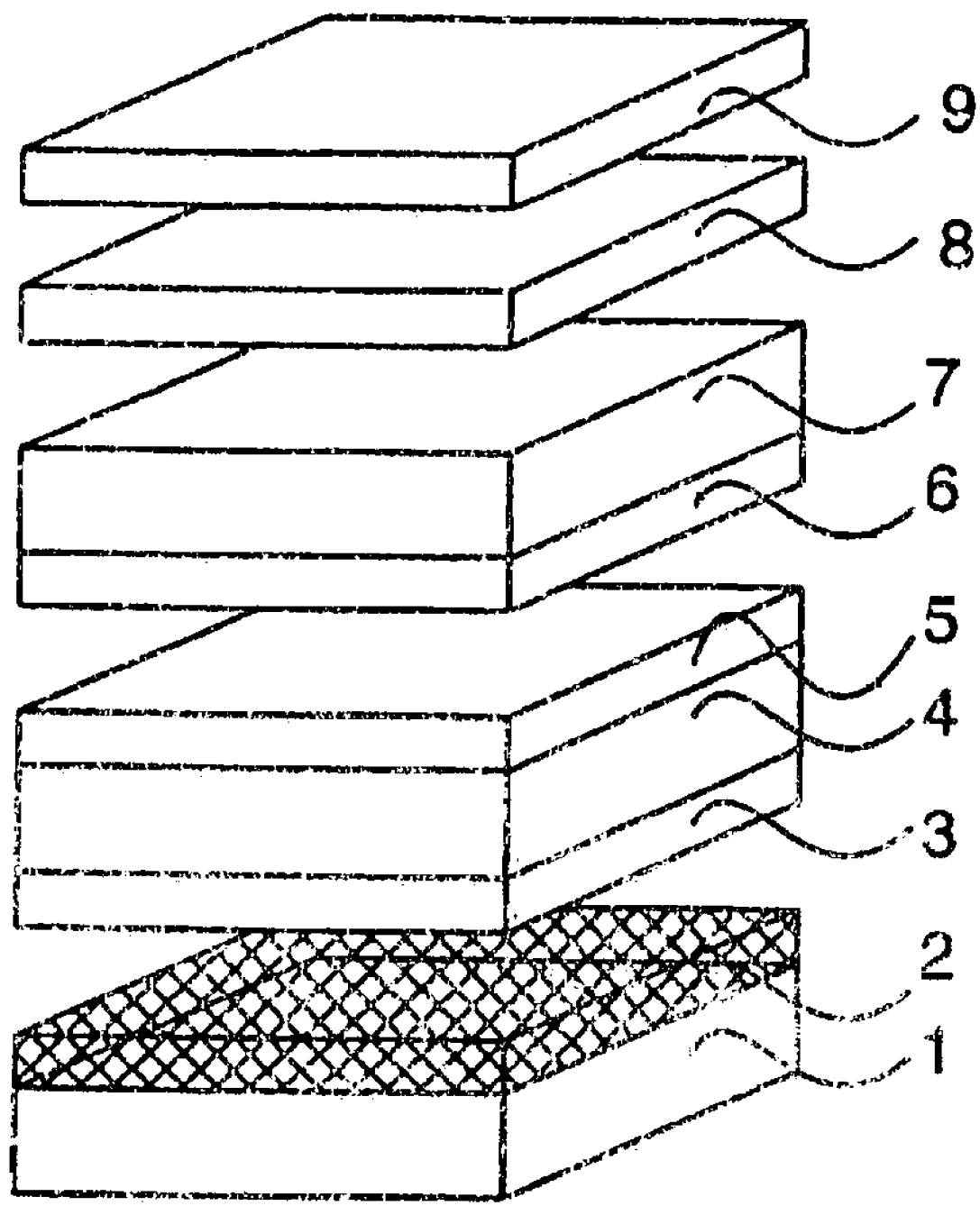
FIG. 1 schematically shows the basic structure of a liquid crystal display of reflection type.

DETAILED DESCRIPTION OF INVENTION (Prevention of Light Leakage)

The inventors have studied, and found that the transmittance at the peripheral part of the screen in the liquid crystal display increases to cause frame-like leakage of light by the following two mechanisms.

In the first mechanism, the cause is fluctuation of conditions such as heat and moisture under which the liquid crystal display works.

When used in a liquid crystal display, the optical compensatory sheet is normally fixed on a liquid crystal cell with an adhesive. If the display is exposed to fluctuation of temperature and humidity, the cellulose acetate film used as the compensatory sheet expands or shrinks. Since the compensatory sheet is fixed, the expansion or shrinkage is repressed to cause internal stress in the film. The stress induces birefringence in the film (photoelastic effect) to change the optical character, and as a result the film leaks light.

In the second mechanism, the cause is thermal unevenness in the plane of the compensatory sheet. The thermal unevenness is given by, for example, backlight in the liquid crystal display, and it induces distortion of the film. Consequently, the optical character is changed in the above manner to leak light.

Further, the inventors have found that a film of hydroxyl group-containing polymer such as cellulose acetate is particularly affected by fluctuation of working conditions.

In order to prevent the sheet from leaking light, the compensatory sheet is made to change the optical character little and further to keep thermal evenness.

The inventors have found that the change of optical character relates to the thickness, the photoelastic coefficient, the virtual distortion caused by fluctuation of working conditions, and the elasticity of the compensatory sheet. Therefore, in order to remarkably reduce the leakage of light, the compensatory sheet is made to be thin, to have a low photoelastic coefficient, to be distorted little by fluctuation of working conditions, and to have a small modulus of elasticity. Further, if the compensatory sheet has a high thermal conductivity, heat in the sheet is evenly distributed to reduce the leakage of light.

According to the study of the inventors, it is particularly effective in preventing the leakage of light to make the cellulose acetate film thin enough. The transmittance relates to the product of birefringence and the thickness of the film (the product indicates phase retardation). In fact, the transmittance increases with the increase of the phase retardation. Accordingly, if the cellulose acetate film is made thin enough, small phase retardation is realized even if birefringence is generated in the same degree. Consequently, the thin cellulose acetate film reduces the increase of transmittance at the peripheral part of the screen. However, if the film is too thin, other troubles such as impairment of handling treatablity come up.

In consideration of balance between the prevention of light leakage and the handling treatablity in producing the optical compensatory sheet, the thickness of the cellulose acetate film is determined as follows.

In the invention, the cellulose acetate film used as the optical compensatory sheet is made to have a thickness in the range of 10 to 70 μm. The thickness is preferably in the range of 20 to 60 μm, more preferably in the range of 30 to 50 μm.

The cellulose acetate film preferably has a thermal conductivity of 1 W/(m·K) or more.

In order to reduce the virtual distortion, it is preferred that the cellulose acetate film be biaxially stretched to promote planar alignment of the polymer molecules or that the film be made to have a moisture expansion coefficient of $30 \times 10^{-5}$/% RH or less. The moisture expansion coefficient is preferably $15 \times 10^{-5}$/% RH or less, more preferably $10 \times 10^{-5}$/% RH or less.

The cellulose acetate film preferably has a photoelastic coefficient of $1.0 \times 10^{-5}$ cm$^2$/Kg or less.

The cellulose acetate film has a modulus of elasticity preferably in the range of 3,000 MPa or less, more preferably in the range of 2,500 Mpa or less.

(Retaradtion of Film)

The retardation values in plane (Re) and in the thickness direction (Rth) of the film are defined by the following formulas (I) and (II), respectively:

$$Re = (nx - ny) \times d \quad (I)$$

$$Rth = [\{(nx + ny)/2\} - nz] \times d. \quad (II)$$

In the formulas (I) and (II), nx is a refractive index along the slow axis (direction giving the maximum refractive index) in the plane of the film.

In the formulas (I) and (II), ny is a refractive index along the fast axis (direction giving the minimum refractive index) in the plane of the film.

In the formula (II), nz is a refractive index in the thickness direction of the film.

In the formulas (I) and (II), d is the thickness of the film in terms of nm.

In the cellulose acetate film of the invention, the Re retardation value measured at 550 nm (Re550) is controlled in the range of 0 to 200 nm, and the Rth retardation value measured at 550 nm (Rth550) is controlled in the range of 70 to 400 nm.

If the optical compensatory sheet consists of the cellulose acetate film, the Re retardation value measured at 550 nm (Re550) is controlled preferably in the range of 20 to 70 nm.

If the optical compensatory sheet consists of the cellulose acetate film having an optically anisotropic layer provided thereon, the Re retardation value measured at 550 nm (Re550) is controlled preferably in the range of 0 to 20 nm.

If one optical compensatory sheet is used in the liquid crystal display, the Rth retardation value of the cellulose acetate film measured at 550 nm (Rth550) is controlled preferably in the range of 150 to 400 nm.

If two optical compensatory sheets are used in the liquid crystal display, the Rth retardation value of the cellulose acetate film measured at 550 nm (Rth550) is controlled preferably in the range of 70 to 250 nm, more preferably in the range of 70 to 200 nm.

The cellulose acetate film has a birefringent index (Δn: nx−ny) measured at 550 nm preferably in the range of 0.00028 to 0.020, more preferably in the range of 0.00196 to 0.01375, further preferably in the range of 0.00168 to 0.006875, most preferably in the range of 0.00275 to 0.00458. The birefringent index in the thickness direction {(nx+ny)/2−nz} measured at 550 nm is preferably in the range of 0.001 to 0.04.

(λ/4 Plate)

In the case where the optical compensatory sheet consisting of the cellulose acetate film is used as a λ/4 plate, the film is controlled to have an Re retardation value measured at 450 nm (Re450) in the range of 100 to 125 nm and another Re retardation value measured at 590 nm (Re590) in the range of 120 to 160 nm. These Re retardation values satisfy preferably the condition of Re590−Re450≧2 nm, more preferably the condition of Re590−Re450≧5 nm, most preferably the condition of Re590−Re450≧10 nm.

The Re retardation value measured at 450 nm (Re450) is preferably in the range of 108 to 125 nm, the Re retardation value measured at 550 nm (Re550) is preferably in the range of 125 to 142 nm, the Re retardation value measured at 590 nm (Re590) is preferably in the range of 130 to 152 nm, and the Re550 and Re590 values satisfy preferably the condition of Re590−Re550≧2 nm, more preferably the condition of Re590−Re550≧5 nm, most preferably the condition of Re590−Re550≧10 nm. Further, Re550 and Re450 values preferably satisfy the condition of Re550−Re450≧10 nm.

It is also preferred that the λ/4 plate (optical compensatory sheet) of the invention singly satisfy the condition of:

$$1 \leq (nx - nz)/(nx - ny) \leq 2$$

in which nx is a refractive index parallel to the slow axis in the plane of the plate, ny is a refractive index perpendicular to the slow axis in the plane of the plate, and nz is a refractive index in the thickness direction.

The cellulose acetate film having the above optical characters can be made of cellulose acetate containing the retardation-increasing agent described after.

The retardation values and its wavelength dependence of the cellulose acetate film can be controlled by (1) adjusting the composition (particularly, average acetic acid content) of cellulose acetate, (2) adjusting the kind and the amount of retardation increasing agent, and (3) adjusting the thickness of the film. In particular, by means of the above (2), a phase retarder can be made of cellulose acetate, which has been conventionally known as an optically isotropic material.

The cellulose acetate film having the aforementioned optical characters can be prepared from the following materials in the manner described below.

(Cellulose Acetate)

In the invention, cellulose acetate having an acetic acid content of 59.0 to 61.5% is used. The acetic acid content is-preferably in the range of 59.5 to 61.3%.

The term "acetic acid content" means the amount of combined acetic acid per one unit weight of cellulose. The acetic acid content is determined according to ASTM: D-817-91 (tests of cellulose acetate).

The cellulose acetate has a viscosity average polymerization degree (DP) of preferably 250 or more, more preferably 290 or more.

Further, it is also preferred for the cellulose acetate used in the invention to have a narrow molecular weight distribution of Mw/Mn (Mw and Mn are weight and number average molecular weights, respectively) determined by gel permeation chromatography. The value of Mw/Mn is preferably in the range of 1.0 to 1.7, more preferably in the range of 1.3 to 1.65, most preferably in the range of 1.4 to 1.6.

In the cellulose acetate used in the invention, the substitution degree at 6-position is preferably high, in detail 0.88 or more. The substitution degree at 6-position is preferably 32% or more, more preferably 33% or more, most preferably 34% or more, based on the total substitution degree at 2-, 3- and 6-positions.

If cellulose acetate is prepared by a normal method, the acetyl substitution degree at 2- or 3-position is larger than that at 6-position. Therefore, conditions for the synthesis must be particularly controlled to make the substitution degree at 6-position higher (0.88 or more, 32% or more of the total substitution degree).

It is preferred to reduce the amount of sulfuric acid catalyst used in the acetylation reaction and accordingly to continue the reaction for a long time. If the sulfuric acid catalyst is used in a large amount, the reaction proceeds fast. In that case, however, sulfuric ester is formed with cellulose in a large amount according to the amount of the catalyst. The formed ester is liberated to produce remaining hydroxyl groups after the reaction. Since the 6-position is highly reactive, the sulfuric ester is much formed at the 6-position. Consequently, a large amount of sulfuric acid catalyst reduces the acetyl substitution degree at 6-position. Therefore, in order to synthesize the cellulose acetate having a high substitution degree at 6-position, the sulfuric acid catalyst must be used in as a small amount as possible, and the reaction time must be lengthened to make up for slowdown of the reaction rate.

The acetyl substitution degrees at 2-, 3- and 6-position can be measured by means of $^{13}$C-NMR after the cellulose acetate is propionylated. The measurement of substitution degree is described in detail in Tezuka et al., Carbohydr. Res., 273(1995), 83–91.

The cellulose acetate having a high substitution degree at 6-position is described in Japanese Patent Provisional No. 11(1999)-5851 (Synthesis Examples 1 to 3).

(Retardation-increasing Agent)

An aromatic compound having at least two aromatic rings is used as a retardation-increasing agent for controlling the retardation of the cellulose acetate film.

The aromatic compound is added in an amount of 0.01 to 20 weight parts, preferably in an amount of 0.05 to 15 weight parts, more preferably in an amount of 0.1 to 10 weight parts, based on 100 weight parts of cellulose acetate. Two or more aromatic compounds may be used in combination.

In the present invention, "an aromatic ring" means not only an aromatic hydrocarbon ring but also an aromatic heterocyclic ring.

As the aromatic hydrocarbon ring, a six-membered ring (namely, a benzene ring) is particularly preferred.

The aromatic heterocyclic ring is generally unsaturated. The aromatic heterocyclic ring is preferably a five-, six- or seven-membered ring, and more preferably a five- or six-membered ring. The aromatic heterocyclic ring generally has double bonds as many as possible. The heteroatom in the ring preferably is nitrogen atom, sulfur atom or oxygen atom, and more preferably is nitrogen atom. Examples of the aromatic heterocyclic ring include furan ring, thiophene ring, pyrrole ring, oxazole ring, isoxazole ring, thiazole ring, isothiazole ring, imidazole ring, pyrazole ring, furazane ring, triazole ring, pyran ring, pyridine ring, pyridazine ring, pyrimidine ring, pyrazine ring and 1,3,5-triazine ring.

Preferred aromatic rings are benzene ring, furan ring, thiophene ring, pyrrole ring, oxazole ring, thiazole ring, imidazole ring, triazole ring, pyridine ring, pyrimidine ring, pyrazine ring and 1,3,5-triazine ring. Benzene ring and 1,3,5-triazine ring are more preferred The aromatic compound preferably contains at least one 1,3,5-triazine ring.

The number of aromatic rings in the aromatic compound is preferably in the range of 2 to 20, more preferably in the range of 2 to 12, further preferably in the range of 2 to 8, and most preferably in the range of 2 to 6.

The relation of the two or more aromatic rings is categorized into three cases, namely (a) the case in which the aromatic rings form a condensed ring, (b) the case in which the aromatic rings are connected through a single bond, and (c) the case in which the aromatic rings are connected through a linking group. In the case (c), a spirobond is not formed because the rings are aromatic.

The relation of the aromatic rings may be any of the cases (a) to (c).

Examples of the condensed ring in the case (a) include indene ring, naphthalene ring, azulene ring, fluorene ring, phenanthrene ring, anthracene ring, acenaphthylene ring, biphenylene ring, naphthacene ring, pyrene ring, indole ring, isoindole ring, benzofuran ring, benzothiophene ring, indolizine ring, benzoxazole ring, benzothiazole ring, benzimidazole ring, benzotriazole ring, purine ring, indazole ring, chromene ring, quinoline ring, isoquinoline ring, quinolizine ring, quinazoline ring, cinnoline ring, quinoxaline ring, phthalazine ring, pteridine ring, carbazole ring, acridine ring, phenanthridine ring, xanthene ring, phenazine ring, phenothiazine ring, phenoxthine ring, phenoxazine ring and thianthrene ring. Preferred are naphthalene ring, azulene ring, indole ring, benzoxazole ring, benzothiazole ring, benzimidazole ring, benztriazole ring and quinoline ring.

The single bond in the case (b) is preferably between carbon atoms of the two aromatic rings. Two or more single bonds may connect the two aromatic rings to form an aliphatic ring or a non-aromatic ring between them.

The linking group in the case (c) is also preferably between carbon atoms of the two aromatic rings. The linking group is preferably an alkylene group, an alkenylene group, an alkynylene group, —CO—, —O—, —NH—, —S— and a combination thereof.

Examples of the linking group formed by the combination are shown below. In each of the following examples, the right and left terminals may be reversed.

c1: —CO—O—
c2: —CO—NH—
c3: -alkylene-O—
c4: —NH—CO—NH—
c5: —NH—CO—O—
c6: —O—CO—O—
c7: —O-alkylene-O—
c8: —CO-alkenylene-
c9: —CO-alkenylene-NH—
c10: —CO-alkenylene-O—
c11: -alkylene-CO—O-alkylene-O—CO-alkylene-
c12: —O-alkylene-CO—O-alkylene-O—CO-alkylene-O—
c13: —O—CO-alkylene-CO—O—
c14: —NH—CO-alkenylene-
c15: —O—Co-alkenylene- The aromatic ring and the linking group may have substituent groups.

Examples of the substituent group include halogen atoms (F, Cl, Br, I), hydroxyl, carboxyl, cyano, amino, nitro, sulfo, carbamoyl, sulfamoyl, ureido, an alkyl group, an alkenyl group, an alkynyl group, an aliphatic acyl group, an aliphatic acyloxy group, an alkoxy group, an alkoxycarbonyl group, an alkoxycarbonylamino group, an alkylthio group, an alkylsulfonyl group, an aliphatic amide group, an aliphatic sulfoneamide group, an aliphatic substituted amine group, an aliphatic substituted carbamoyl group, an aliphatic substituted sulfamoyl group, an aliphatic substituted ureido group and a non-aromatic heterocyclic group.

The alkyl group preferably has 1 to 8 carbon atoms. A chain alkyl group is preferred to a cyclic one, and a straight chain alkyl group is particularly preferred. The alkyl group may further have a substituent group (e.g., hydroxyl, carboxyl, an alkoxy group, an alkyl-substituted amino group). Examples of the (substituted) alkyl group include methyl, ethyl, n-butyl, n-hexyl, 2-hydroxyethyl, 4-carboxybutyl, 2-methoxyethyl and 2-diethylaminoethyl.

The alkenyl group preferably has 2 to 8 carbon atoms. A chain alkenyl group is preferred to a cyclic one, and a straight chain alkenyl group is particularly preferred. The alkenyl group may further have a substituent group. Examples of the alkenyl group include vinyl, allyl and 1-hexenyl.

The alkynyl group preferably has 2 to 8 carbon atoms. A chain alkynyl group is preferred to a cyclic one, and a straight chain alkynyl group is particularly preferred. The alkynyl group may further have a substituent group. Examples of the alkynyl group include ethynyl, 1-butynyl and 1-hexynyl.

The aliphatic acyl group preferably has 1 to 10 carbon atoms. Examples of the aliphatic acyl group include acetyl, propanoyl and butanoyl.

The aliphatic acyloxy group preferably has 1 to 10 carbon atoms. Examples of the aliphatic acyloxy group include acetoxy.

The alkoxy group preferably has 1 to 8 carbon atoms. The alkoxy group may further have a substituent group (e.g., another alkoxy group). Examples of the (substituted) alkoxy group include methoxy, ethoxy, butoxy and methoxyethoxy.

The alkoxycarbonyl group preferably has 2 to 10 carbon atoms. Examples of the alkoxycarbonyl group include methoxycarbonyl and ethoxycarbonyl.

The alkoxycarbonylamino group preferably has 2 to 10 carbon atoms. Examples of the alkoxycarbonylamino group include methoxycarbonylamino and ethoxycarbonylamino.

The alkylthio group preferably has 1 to 12 carbon atoms. Examples of the alkylthio group include methylthio, ethylthio and octylthio.

The alkylsulfonyl group preferably has 1 to 8 carbon atoms. Examples of the alkylsulfonyl group include methanesulfonyl and ethanesulfonyl.

The aliphatic amide group preferably has 1 to 10 carbon atoms. Examples of the aliphatic amide group include acetoamide The aliphatic sulfoneamide group preferably has 1 to 8 carbon atoms. Examples of the aliphatic sulfoneamide group include methanesulfoneamide, butanesulfoneamide and n-octanesulfoneamide.

The aliphatic substituted amine group preferably has 1 to 10 carbon atoms. Examples of the aliphatic substituted amine group include dimethylamino, diethylamino and 2-carboxyethyl amino.

The aliphatic substituted carbamoyl group preferably has 2 to 10 carbon atoms. Examples of the aliphatic substituted carbamoyl group include methylcarbamoyl and diethylcarbamoyl.

The aliphatic substituted sulfamoyl group preferably has 1 to 8 carbon atoms. Examples of the aliphatic substituted sulfamoyl group include methylsulfamoyl and diethylsulfamoyl.

The aliphatic substituted ureido group preferably has 2 to 10 carbon atoms. Examples of the aliphatic substituted ureido group include methylureido.

Examples of the non-aromatic heterocyclic group include piperidino and morpholino.

The retardation increasing agent has a molecular weight of 300 to 800.

The retardation increasing agent has a boiling point of 260° C. or more. The boiling point can be measured by means of a commercially available apparatus (e.g., TG/DTA100, Seiko Electronics Co., Ltd.).

Concrete examples of the retardation-increasing agent are described in Japanese Patent Provisional Publication Nos. 2000-111914, 2000-275434 and PCT/JP 00/02619.

(Infrared Absorber)

An infrared absorber can be added to the cellulose acetate film, to adjust the retardation value at each wavelength.

The amount of the infrared absorber is preferably in the range of 0.01 to 5 weight parts, more preferably in the range of 0.02 to 2 weight parts, further preferably in the range of 0.05 to 1 weight part, and most preferably in the range of 0.1 to 0.5 weight parts, based on 100 weight parts of cellulose acetate. Two or more infrared absorbers may be used in combination.

The infrared absorber shows the maximum absorption preferably in the wavelength region of 750 to 1,100 nm, more preferably in the wavelength region of 800 to 1,000 nm. It is also preferred for the infrared absorber to have essentially no absorption in the visible wavelength region.

As the infrared absorber, an infrared absorbing dye or pigment is preferred. An infrared absorbing dye is particularly preferred.

The infrared absorbing dyes include organic compounds and inorganic ones. Organic infrared absorbing dyes are preferred. Examples of the organic infrared absorbing dyes include cyanine compounds, metal chelate compounds, aminium compounds, diimmonium compounds, quinone compounds, squarilium compounds and methine compounds. The infrared absorbing dyes are described in "Shikizai (color material) [written in Japanese]", 61(4), pp. 215–226 (1988) and "Kagaku to Kogyo (chemistry and industry [written in Japanese]", 43–53 (1986, May).

In view of infrared absorbance and absorption spectrum, infrared absorbing dyes developed in the field of silver halide photographic photosensitive material are preferred. Examples of the infrared absorbing dyes developed in the field of silver halide photographic photosensitive material include dihydroperimidine squarilium dye (described in U.S. Pat. No. 5,380,635 and Japanese Patent Application No. 8(1996)-189817), cyanine dye (described in Japanese Patent Provisional Publication Nos. 62(1987)-123454, 3(1991)-138640, 3(1991)-211542, 3(1991)-226736, 5(1993)-313305 and 6(1994)-43583, Japanese Patent Application No. 7(1995)-269097 and European Patent No. 0,430,244), pyrylium dye (described in Japanese Patent Provisional Publication Nos. 3(1991)-138640 and 3(1991)-211542), diimmonium dye (described in Japanese Patent Provisional Publication Nos. 3(1991)-138640 and 3(1991)-211542), pyrazolopyridone dye (described in Japanese Patent Provisional Publication No. 2(1990)-282244), indoaniline dye (described in Japanese Patent Provisional Publication Nos. 5(1993)-323500 and 5(1993)-323501), polymethine dye (described in Japanese Patent Provisional Publication Nos. 3(1991)-26765 and 4(1992)-190343, and European Patent No. 0,377,961), oxonol dye (described in Japanese Patent Provisional Publication No. 3(1991)-9346), anthraquinone dye (described in Japanese Patent Provisional Publication No. 4(1992)-13654), naphthalocyanine dye (described in U.S. Pat. No. 5,009,989), and naphtholactum dye (described in European Patent No. 0,568,267).

(Production of Cellulose Acetate Film)

The cellulose acetate film is preferably prepared according to a solvent case method. As the solvent, an organic solvent is preferably used. The solvent case method comprises the steps of dissolving cellulose acetate in an organic solvent to prepare a solution (dope) and casting the dope to prepare a film.

The organic solvent is preferably selected from the group consisting of an ether having 3 to 12 carbon atoms, a ketone having 3 to 12 carbon atoms, an ester having 3 to 12 carbon atoms and a halogenated hydrocarbon having 1 to 6 carbon atoms.

The ether, ketone and ester may have a cyclic structure. A compound having two or more functional groups of ether (—O—), ketone (—CO—) and ester (—COO—) can be also used as the organic solvent. The organic solvent can have another functional group such as alcoholic hydroxyl. In the case where the organic solvent has two or more of the above functional groups, the number of the carbon atoms is defined as a compound having one optionally selected from those groups.

Examples of the ether having 3 to 12 carbon atoms include diisopropyl ether, dimethoxymethane, 1,4-dioxane, 1,3-dioxolane, tetrahydrofuran, anisole and phenetol.

Examples of the ketone having 3 to 12 carbon atom include acetone, methyl ethyl ketone, diethyl ketone, diisobutyl ketone, cyclohexanone and methylcyclohexanone.

Examples of the ester having 3 to 12 carbon atoms include ethyl formate, propyl formate, pentyl formate, methyl acetate, ethyl acetate, and pentyl acetate.

Examples of the compounds having two or more kinds of functional groups include 2-ethoxyethyl acetate, 2-methoxyethanol and 2-butoxyethanol.

The halogenated hydrocarbon has preferably one or two carbon atoms, more preferably one carbon atom. The halogen atom of the halogenated hydrocarbon is preferably chlorine. The ratio of hydrogen substituted with halogen is preferably in the range of 25 to 75 mol. %, more preferably in the range of 30 to 70 mol. %, further preferably in the range of 35 to 65 mol. %, and most preferably in the range of 40 to 60 mol. %. Methylene chloride is a representative halogenated hydrocarbon.

Two or more organic solvents can be used in combination.

A cellulose acetate solution can be prepared according to a conventional method. The conventional method means that the solution is prepared at a temperature of not lower than 0° C. (room temperature or elevated temperature). The preparation of the solution can be conducted by means of a process and apparatus used in a conventional solvent cast method. The conventional method preferably uses a halogenated hydrocarbon (particularly methylene chloride) as an organic solvent.

The amount of cellulose acetate is so adjusted that a prepared solution contains cellulose acetate in an amount of 10 to 40 wt. %. The amount of cellulose acetate is more preferably 10 to 30 wt. %. An optional additive (described below) can be added to an organic (main) solvent.

The solution can be prepared by stirring cellulose acetate and an organic solvent at an ordinary temperature (0 to 40° C.). A solution of high concentration may be prepared by stirring them at an elevated temperature under a high pressure. In that case, cellulose acetate and the organic solvent are placed in a closed vessel, and are stirred at an elevated temperature under a high pressure. The temperature is set to be higher than the boiling point at atmospheric pressure but lower than the boiling point of the solvent at the high pressure. Accordingly, the heating temperature is normally not lower than 40° C., preferably in the range of 60 to 200° C., and more preferably in the range of 80 to 110° C.

The components can be preliminary dispersed coarsely, and the coarse dispersion can be placed in the vessel. Otherwise, the components can be also introduced into the vessel in series. The vessel should be equipped with a stirring device. A pressure in the vessel can be formed by introducing an inert gas such as nitrogen gas into the vessel, or by heating and evaporating the solvent to increase the vapor pressure. Otherwise, the components can be added to the vessel at a high pressure after the vessel is sealed.

The vessel is preferably heated from the outside. For example, the vessel can be heated with a jacket type heating apparatus. Otherwise, liquid heated with a plate heater placed outside of the vessel may be circulated through a pipe wound around the vessel, to heat the whole vessel.

The mixture is preferably stirred with a propeller mixer provided in the vessel. The wing of the propeller preferably has a length reaching the inside wall of the vessel. Further, at the tip of the wing, a scratching mean is provided to scratch and renew the mixture attached on the inside wall.

In the vessel, various meters such as pressure gauge and thermometer may be provided. The components are dissolved in the solvent in the vessel. The thus-prepared dope may be cooled and then taken out of the vessel, or may be taken out and then cooled with a heat exchanger.

The solution can be also prepared according to a cooling dissolution method. According to the cooling dissolution method, cellulose acetate can be dissolved even in organic solvents in which cellulose acetate cannot be dissolved according to a conventional method. Further, according to the method, cellulose acetate can be rapidly and homogeneously dissolved in an organic solvent in which cellulose acetate can be dissolved by a conventional process.

First in the process of cooling dissolution method, the polymer is gradually added with stirring into an organic solvent at room temperature.

The amount of the polymer in the mixture is preferably in the range of 10 to 40 wt. %, more preferably in the range of 10 to 30 wt. %. Various additives described below may be added in the mixture.

At the next stage, the prepared mixture is cooled to a temperature of −100 to −10° C., preferably −80 to −10° C., more preferably −50 to −20° C., most preferably −50 to −30° C. The cooling procedure can be carried out, for example, with dry ice-methanol bath (−75° C.) or with cooled ethylene glycol solution (−30 to −20° C.). Through the cooling procedure, the mixture is solidified.

The cooling rate is preferably 4° C./minute or more, more preferably 8° C./minute or more, and most preferably 12° C./minute or more. The cooling rate is preferably as fast as possible. However, a theoretical upper limit of the cooling rate is 10,000° C. per second, a technical upper limit is 1,000° C. per second, and a practical upper limit is 100° C. per second. The cooling rate means the change of temperature at the cooling step per the time taken to complete the cooling step. The change of temperature means the difference between the temperature at which the cooling step is started and the temperature at which the cooling step is completed.

The cooled mixture is then warmed to a temperature of 0 to 200° C., preferably 0 to 150° C., more preferably 0 to 120° C., most preferably 0 to 50° C. Through the warming procedure, the polymer is dissolved in the organic solvent. For warming, the mixture may be left at room temperature or may be heated in a warm bath.

The warming rate is 4° C./minute or more, more preferably 8° C./minute or more, and most preferably 12° C./minute or more. The warming rate is preferably as fast as possible. However, a theoretical upper limit of the warming rate is 10,000° C. per second, a technical upper limit is 1,000° C. per second, and a practical upper limit is 100° C. per second. The warming rate means the change of temperature at the warming step per the time taken to complete the warming step. The change of temperature means the difference between the temperature at which the warming step is started and the temperature at which the warming step is completed.

Thus, a homogeneous solution can be prepared. If the polymer is not sufficiently dissolved, the cooling and warming procedures may be repeated. It can be judged by observation with the eyes whether the polymer is sufficiently dissolved or not.

In the process of cooling dissolution method, a sealed vessel is preferably used to prevent contamination of water, which may be caused by dew condensation at the cooling step. Further, the mixture may be cooled under a reduced pressure so that the time taken to complete the cooling step can be shortened, and hence a vessel resisting pressure is preferably used to conduct the procedures under a reduced pressure.

According to differential scanning calorimetric measurement (DSC), a 20 wt. % solution prepared by dissolving cellulose acetate (acetic acid content: 60.9%, viscosity average polymerization degree: 299) in methyl acetate through the cooling dissolution process has a pseudo-phase transition point between gel and sol at about 33° C. Below that temperature, the solution is in the form of homogeneous gel. The solution, therefore, must be kept at a temperature above the pseudo-phase transition point, preferably at a temperature higher than the pseudo-phase transition point by about 10° C. The pseudo-phase transition point depends upon various conditions such as the organic solvent, the acetic acid content, the viscosity average polymerization degree and the concentration of cellulose acetate.

The polymer film is formed from the prepared polymer solution (dope) according to the solvent cast method.

The dope is cast on a drum or a band, and the solvent is evaporated to form a film. The solid content of the dope is preferably controlled in the range of 18 to 35%. The surface of the drum or band is preferably beforehand polished to be a mirror. The casting and drying steps of the solvent cast method are described in U.S. Pat. Nos. 2,336,310, 2,367,603, 2,492,078, 2,492,977, 2,492,978, 2,607,704, 2,739,069, 2,739,070, British Patent Nos. 640,731, 736,892, Japanese Patent Publication Nos. 45(1970)-4554, 49(1974)-5614, Japanese Patent Provisional Publication Nos. 60(1985)-176834, 60(1985)-203430 and 62(1987)-115035.

The surface temperature of the drum or band is preferably 10° C. or below. After case on the drum or band, the dope is blown with air for 2 seconds or more to dry. The formed film is then peeled, and blown with hot air whose temperature is successively changed from 100° C. to 160° C. in order to evaporate remaining solvent. This procedure is described in Japanese Patent Publication No. 5(1993)-47855. The procedure can shorten the time taken to complete the steps of casting to peeling. For performing the procedure, the cast dope must gel at the surface temperature of the drum or band.

From the prepared dope, two or more layers can be formed according to the simultaneous casting (co-casting) method. Also in that case, the cellulose acetate film is preferably produced according to the solvent cast method. The dope is cast on a drum or a band, and the solvent is evaporated to form a film. The solid content of the dope is preferably controlled in the range of 10 to 40%. The surface of the drum or band is preferably beforehand polished to be a mirror.

In the case where two or more cellulose acetate solutions are used, the solutions may be cast from nozzles provided at intervals in the transferring direction of the support to form a layered film. This method is described in, for example, Japanese Patent Provisional Publication Nos. 61(1986)-158414, 1(1989)-122419 and 11(1999)-198285. The solutions may be simultaneously cast from two nozzles to form a layered film. This method is described in, for example, Japanese Patent Publication No. 60(1985)-27562, Japanese Patent Provisional Publication Nos. 61(1986)-94724, 61(1986)-947245, 61(1986)-104813, 61(1986)-158413 and 6(1994)-134933.

Further, the method described in Japanese Patent Provisional Publication No. 56(1981)-162617 can be also adopted. In that method, a highly viscous cellulose acetate solution is enclosed with a low viscous one, and then the thus-combined solutions are simultaneously extruded and cast.

Furthermore, the method described in, for example, Japanese Patent Publication No. 44(1969)-20235 may be adopted. In the method, a film is beforehand formed from a solution extruded out of one of two nozzles. After the formed film is peeled and reversely placed on the support, another solution is extruded from the other nozzle to cast onto the film (on the surface having faced to the support) to form a layered film.

The cellulose acetate solutions may be the same or different from each other. If some functional layers are to be formed, each cellulose acetate solution corresponding to each function may be extruded from each nozzle. Further, the cellulose acetate solution of the invention may be cast simultaneously with other dopes for other functional layers (e.g., adhesive layer, dye layer, antistatic layer, antihalation layer, ultraviolet layer, polarizing layer.

In the case where a thick film having a single layer is formed by the conventional solvent cast method, it is necessary to extrude a dope of high concentration and high viscosity. That dope is generally so unstable that solid particles are often deposited, and that the formed film often has poor evenness. If the viscous dope is extruded simultaneously from plural nozzles onto the support, a thick film having excellent evenness can be prepared. Further, since the thick dope is rapidly dried, the film can be rapidly produced.

A plasticizer can be added to the cellulose acetate film to improve the mechanical strength. The plasticizer has another function of shortening the time for the drying process. Phosphoric esters and carboxylic esters are normally used as the plasticizer. Examples of the phosphoric esters include triphenyl phosphate (TPP) and tricresyl phosphate (TCP). Examples of the carboxylic esters include phthalic esters and citric esters. Examples of the phthalic esters include dimethyl phthalate (DMP), diethyl phthalate (DEP), dibutyl phthalate (DBP), dioctyl phthalate (DOP), diphenyl phthalate (DPP) and diethylhexyl phthalate (DEHP). Examples of the citric esters include triethyl o-acetylcitrate (OACTE) and tributyl o-acetylcitrate (OACTB). Examples of the other carboxylic esters include butyl oleate, methylacetyl ricinoleate, dibutyl sebacate and various trimellitic esters. Phthalic ester plasticizers (DMP, DEP, DBP, DOP, DPP, DEHP) are preferred. Further, DEP and DPP are particularly preferred.

The amount of the plasticizer is preferably in the range of 0.1 to 25 wt. %, more preferably in the range of 1 to 20 wt. %, and most preferably in the range of 3 to 15 wt. % based on the amount of cellulose acetate.

Deterioration inhibitors (e.g., anti-oxidizing agent, peroxide decomposer, radical inhibitor, metal inactivating agent, oxygen scavenger, amine) can be incorporated into the cellulose acetate film. The deterioration inhibitors are described in Japanese Patent Provisional Publication Nos. 3(1991)-199201, 5(1993)-1907073, 5(1993)-194789, 5(1993)-271471 and 6(1994)-107854. The deterioration inhibitor is preferably added in the range of 0.01 to 1 wt. %, and more preferably in the range of 0.01 to 0.2 wt. % based on the amount of the prepared solution (dope). If the amount is less than 0.01 wt. %, the effect of the deterioration inhibitor cannot be expected. If the amount is more than 1 wt. %, the inhibitor would bleed out on the surface of the film. Butyrated hydroxytoluene (BHT) and tribenzylamine (TBA) are particularly preferred deterioration inhibitors.

(Polyesterurethane)

The cellulose acetate film preferably contains polyesterurethane to improve the mechanical characters. The polyesterurethane is preferably prepared from isocyanate and the polyester represented by the following formula (1), and is further preferably soluble in dichloromethane.

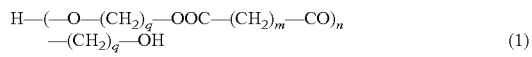

(1)

In the formula, q is an integer of 2 to 4, m is an integer of 2 to 4, and n is an integer of 1 to 100.

The structuring polyester consists of a glycol part and a dibasic acid part. The glycol part is derived from ethylene glycol, 1,3-propanediol or 1,4-butanediol. The dibasic acid part is derived from succinic acid, glutamic acid or adipic acid. The polyester has hydroxyls at both terminals. The polymerization degree n is in the range of 1 to 100, and the preferred degree depends upon the used glycol and dibasic acid. The polyester preferably has a molecular weight in the range of 1,000 to 4,500.

The polyesterurethane resin soluble in dichloromethane is prepared by the reaction between isocyanate and the polyester represented by the above formula (1), and generally has a repeating unit represented by the following formula (2).

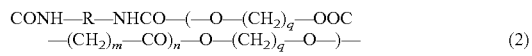

(2)

In the formula, q is an integer of 2 to 4, m is an integer of 2 to 4, n is an integer of 1 to 100, and R is a divalent atomic group residue.

Examples of the divalent atomic group residue are shown below.

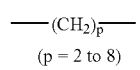

(R1)

(p = 2 to 8)

-continued

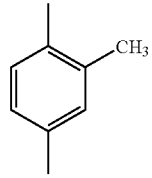

(R2)

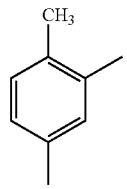

(R3)

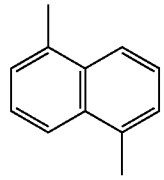

(R4)

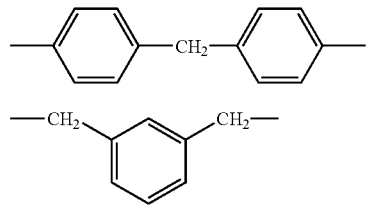

(R5)

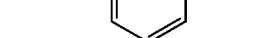

(R6)

Examples of the isocyanate used for preparing the polyesterurethane resin include polymethylenediisocyanate (general formula: $OCN(CH_2)_pNCO$ in which p is an integer of 2 to 8) such as ethylene diisocyanate, trimethylene diisocyanate, tetramethylene diisocyanate and hexamethylene diisocyanate; aromatic diisocyanate such as p-phenylene diisocyanate, tolylene diisocyanate, p,p'-diphenylmethane diisocyanate and 1,5-naphthylene diisocyanate; and m-xylene diisocyanate. Those examples by no means restrict the invention. Tolylene diisocyanate, m-xylene diisocyanate and tetramethylene diisocyanate are preferred because they are easily obtained and stable enough to treat. Further, they have excellent compatibility with cellulose acetate when they turn into polyurethane.

The molecular weight of the polyesterurethane resin is preferably in the range of 2,000 to 50,000, and is optionally selected according to the kind and the molecular weight of the structuring polyesters and linking diisocyanates. The molecular weight is further preferably in the range of 5,000 to 15,000 because the polyesterurethane resin having that molecular weight improves mechanical characters of the resultant film and has good compatibility with cellulose acetate.

The polyesterurethane resin soluble in dichloromethane can be easily prepared through the steps of mixing isocyanate and the polyesterdiols of the formula (1), and heating and stirring the mixture.

The polyesters represented by the formula (1) can be easily prepared through the thermal fusion condensation with polyesterifying or ester-exchanging reaction between corresponding bibasic acids (or alkyl esters thereof) and glycols, or through the interfacial condensation between acid chlorides thereof and glycols. In the reactions, the conditions are controlled so that the resultant polyester has hydroxyls at the terminal position.

The dichloromethane-soluble polyesterurethane resin used in the invention has excellent compatibility with cellulose acetate having an acetic acid content of 58% or more. In fact, 200 weight parts of the polyesterurethane having a molecular weight of 10,000 or less is miscible even with 100 weight parts of acetyl cellulose, although its compatibility slightly depends upon the resin structure.

Accordingly, in the case where the polyesterurethane resin is incorporated in the cellulose acetate to improve the mechanical characters of the resultant film, the content of polyesterurethane is properly determined according to the kind and molecular weight of the urethane resin and to the aimed mechanical characters.

If the mechanical characters are to be improved with the properties of cellulose acetate maintained, the content of the polyesterurethane resin is preferably in the range of 0.1 to 30 weight parts based on 100 weight parts of cellulose acetate.

The polyesterurethane resin is stable enough not to be decomposed at 180° C. or below. Since this dichloromethane-soluble polyesterurethane resin has excellent compatibility with cellulose acetate having an acetic acid content of 58% or more, a highly transparent film can be formed from the mixture thereof. Further, having a high average molecular weight, the polyesterurethane evaporates little even at high temperature while a conventional low molecular-weight plasticizer easily vaporizes. Accordingly, a film prepared from the mixture of the polyesterurethane and the cellulose acetate causes less trouble (such as evaporation and migration of plasticizer) than known films containing conventional plasticizers.

The polyesterurethane enhances the bending and tearing strengths of the cellulose acetate film at high and low temperatures, and accordingly the film is hardly broken. Hitherto, for enhancing the mechanical strengths, low molecular-weight plasticizer has been conventionally used. However, although the conventional method improves the film durability to a certain degree under the conditions of room temperature and high humidity, it cannot fully prevent the film from losing flexibility under the conditions of low temperature and high humidity. Even if much amount of low molecular-weight plasticizer is used for the purpose of improving the mechanical characters, the mechanical characters are actually remarkably impaired.

The cellulose acetate containing the dichloromethane-soluble polyesterurethane resin has tensile strength impaired a little according to the content of the resin. However, the degree of impairment is relatively small as compared with the case where low molecular-weight plasticizer is used. On the other hand, with respect to bending strength, a film made of the cellulose acetate containing the polyesterurethane resin is as strong as one without plasticizer. Further, the polyesterurethane resin prevents the plasticizer from migration at low and high temperatures, and hence gives a flexible, transparent and glossy cellulose acetate film that hardly adheres to other films.

(Highly Thermo-conductive Particles)

The cellulose acetate film preferably has a thermal conductivity of 1 W/(m·K) or more. The thermal conductivity is preferably as high as possible, but is generally 10 W/(m·K) or less if the film is prepared in the following manner.

For controlling the thermal conductivity of cellulose acetate film, highly thermo-conductive particles are preferably added into the dope for preparing the film. Further, on a surface of the cellulose acetate film, a thermo-conductive layer containing highly thermo-conductive particles may be provided to control the thermal conductivity. A polymer containing highly thermo-conductive particles may be co-cast with cellulose acetate, or may be applied on the cellulose acetate film to form the thermo-conductive layer.

Examples of the highly thermo-conductive particles include particles of aluminum nitride, silicon nitride, boron nitride, magnesium nitride, silicon carbide, aluminum oxide, zinc oxide, magnesium oxide, carbon, diamond and metals. The particles are preferably transparent not to deteriorate transparency of the film.

The amount of thermo-conductive particles is preferably in the range of 5 to 100 weight parts based on 100 weight parts of cellulose acetate. If it is less than 5 weigh parts, the thermal conductivity is insufficiently improved. On the other hand, if the amount is more than 100 weight parts, it is difficult to form the film and the resultant film is fragile.

The highly thermo-conductive particles have an average particle size of preferably 0.05 to 80 μm, more preferably 0.01 to 10 μm. The particles may be spherical or needle-like.

In the invention, the thermal conductivity of cellulose acetate film is measured in the following manner.

First, a sample film is placed between a copper heater case and a copper plate in TO-3 type hater, and is pressed by 10%. The film is then kept for 4 minutes while the copper heater case is electrified at 5 W, and the temperature difference between the case and the plate is measured. From the obtained date, the thermal conductivity is calculated according to the formula:

thermal conductivity $\{W/(m·K)\}=\{$electric power $(W)\times$ thickness $(m)\}/\{$temperature difference $(K)\times$measured area $(m^2)\}$.

(Stretching of Cellulose Acetate Film)

The cellulose acetate film is preferably stretched to control the retardation and to reduce the virtual distortion. Since the virtual distortion is reduced in the stretching direction, it is preferred to stretch the film biaxially to reduce the distortion in all directions in the film plane.

The stretching ratio is preferably in the range of 3 to 100%.

The biaxial stretching may be carried out simultaneously or successively. In consideration of continuous production, the film is preferably subjected to successive biaxial stretching. The film formed from the cast dope is peeled from the drum or band, and is first laterally and then longitudinally stretched. It may be first longitudinally and then laterally stretched.

The lateral stretching is carried out in the manner described in, for example, Japanese Patent Provisional Publication Nos. 62(1987)-115035, 4(1992)-152125, 4(1992)-284211, 4(1992)-298310 and 11(1999)-48271. The film is stretched at room temperature or elevated temperature. The temperature is preferably not higher than glass transition temperature of the film. The film can be stretched under dry condition, and this fact is advantageous particularly in the case where the solvent remains in the film. For stretching the film longitudinally, rollers conveying the film are, for example, controlled so that the speed of peeling the film may be slower than that of winding the film. On the other hand, for stretching the film laterally, the film may be conveyed while tensed laterally with a tenter to widen gradually. Further, it is also possible to stretch the film with a stretching machine (preferably, uniaxially with a long stretching machine). The stretching ratio (ratio of gained length per original length) is preferably in the range of 5 to 50%, more preferably in the range of 10 to 40%, most preferably in the range of 15 to 35%.

The steps of casting to post-drying may be carried out under air atmosphere or inert gas (e.g., nitrogen gas) atmosphere. The cellulose acetate film of the invention can be wound up by means of a generally used winding machine according to the constant tension method, the constant torque method, the taper tension method or the programmed tension control method with constant internal stress.

(Moisture Expansion Coefficient)

When humidity is changed with the temperature not changed, the film generally expands. A moisture expansion coefficient indicates the gained length of the expanded film.

In order to prevent the transmittance at the peripheral part of the screen from increasing, the moisture expansion coefficient is preferably $30\times10^{-5}$/% RH or less, more preferably $15\times10^{-5}$/% RH or less, most preferably $10\times10^{-5}$/% RH or less. The moisture expansion coefficient is preferably as small as possible, but is normally $1.0\times10^{-5}$/% RH or more.

The moisture expansion coefficient is measured in the following manner.

The prepared polymer film (phase retarder) is cut into ten pieces (5 mm×20 mm). One end of each piece was fixed, and a weight of 0.5 g is suspended from the other end. The hanging piece is left under the conditions of the temperature of 25° C. and the relative humidity of 20% RH ($R_0$) for 10 minutes, and then the length ($L_0$) is measured. The humidity is then changed to 80% RH ($R_1$) while the temperature is kept 25° C., and the length ($L_1$) is measured. From the obtained date, the moisture expansion coefficient is calculated according to the following formula. With respect to the ten pieces, the measurement is repeated and the obtained values are averaged.

Moisture expansion coefficient $[/\% \ RH]=\{(L_1-L_0)/L_0\}/(R_1-R_0)$

The less free volume a polymer film has, the less its dimension changes. The free volume greatly depends upon the amount of remaining solvent used in forming the film. The less the solvent remains, the less the dimension changes.

For reducing the remaining solvent, the film is generally dried at a high temperature for a long time. However, if the drying time is too long, the productivity is naturally impaired. Accordingly, the amount of the remaining solvent is preferably in the range of 0.01 to 1 wt. %, more preferably in the range of 0.02 to 0.07 wt. %, most preferably in the range of 0.03 to 0.05 wt. %.

If the amount of remaining solvent is properly controlled, a polarizing plate having optical compensatory function can be produced at small cost with high productivity.

Further, a compound having hydrophobic groups is preferably incorporated to reduce the dimensional change. The compound having hydrophobic groups is not particularly restricted as long as it contains hydrophobic groups such as alkyl group and phenyl group, but is preferably selected from the materials described above as the plasticizer and the deterioration inhibitor added into cellulose acetate. Preferred examples of the compound include triphenyl phosphate (TPP) and tribenzylamine (TBA).

The amount of the compound having hydrophobic groups is preferably in the range of 0.01 to 10 wt. %, more preferably in the range of 0.1 to 5 wt. %, most preferably in the range of 1 to 3 wt. %, base on the amount of the prepared solution (dope).

The amount of remaining solvent is measured in the following manner. First, a certain amount of the sample is dissolved in chloroform. The prepared solution is then measured through a gas chromatography (GC18A, Shimadzu Seisakusho Ltd.).

In the solvent cast method, a film is formed from a solution (dope) containing polymer material dissolved in solvent. The film is then dried while it is on the drum (or band) and while it is conveyed, as described below. The film on the drum (or band) is preferably dried slowly at a temperature below the boiling point of the solvent (if it is above the boiling point, bubbles are formed). The film being conveyed is dried at a temperature preferably in the range of the glass transition point ±30° C., more preferably in the range of the glass transition point ±20° C.

(Surface Treatment of Cellulose Acetate Film)

The cellulose acetate film is preferably subjected to surface treatment. Examples of the surface treatment include saponification treatment, plasma treatment, flame treatment and ultraviolet (UV) treatment. The saponification treatment includes acid saponification treatment and alkali saponification treatment. The plasma treatment includes glow discharge treatment and corona discharge treatment. Further, an undercoating layer is preferably provided as described in Japanese Patent Provisional Publication No. 7(1995)-333433.

The film after the surface treatment has a surface energy of preferably 55 mN/m or more, more preferably in the range of 60 to 75 mN/m. If such cellulose acetate film is used as the transparent protective film of the polarizing plate, the adhesion between the film and the polarizing membrane is improved. In the case where an optically anisotropic layer is formed on the cellulose acetate film, it has been hitherto necessary to provide a gelatin undercoating layer for ensuring the adhesion between the cellulose acetate film and the orientation layer. However, if the cellulose acetate film having a surface energy of 55 to 75 mN/m is used, the gelatin undercoating layer can be omitted. In order to keep the planeness of the film, the film is preferably kept at a temperature below the glass transition point (Tg), namely at a temperature of not more than 150° C.

In the case where the optical compensatory sheet is used as the transparent protective film of the polarizing plate, the cellulose acetate film is preferably subjected to acid or alkali saponification treatment for improving adhesion to the polarizing membrane.

The surface energy can be measured by the contact angle method, the wet heating method or the adsorption method, which are described in "The basic theory and application of wetting (written in Japanese)", published by Realize Co., Ltd, 1989. The contact angle method is preferred. In that method, two solutions having known surface energies are dropped onto the cellulose acetate film. The contact angle of each drop is measured, and the surface energy of the film is calculated from the measured contact angles. The contact angle is, by definition, an angle (including the drop) between the film surface and the tangent of the drop surface at the crossing point. The alkaline saponification treatment preferably comprises the steps of immersing the cellulose acetate film in an alkaline solution, neutralizing the film with an acidic solution, washing with water and drying. Examples of the alkaline solution include aqueous solutions of potassium hydroxide and sodium hydroxide. The normality of hydroxyl ion in the alkali solution is preferably in the range of 0.1 to 3.0 N, more preferably in the range of 0.5 to 2.0 N.

The alkaline solution is kept at a temperature preferably in the range of room temperature to 90° C., more preferably in the range of 40 to 70° C.

The alkali is preferably an alkali metal hydroxide such as potassium hydroxide and sodium hydroxide. The alkaline solution preferably has a pH value of 10 or more. It is preferred to immerse only the film surface facing to the polarizing membrane, but both surfaces of the cellulose acetate film may be immersed. The time for immersing is preferably in the range of 1 to 300 seconds, more preferably in the range of 5 to 240 seconds. The temperature for the saponification reaction is preferably in the range of 25 to 70° C., more preferably in the range of 35 to 60° C. After immersed in the alkaline solution, the film is preferably washed with water.

In the case where only one surface is subjected to the alkaline saponification treatment, it is preferably washed with water after the alkaline solution is applied. In this case, the solvent of the alkaline solution preferably does not swell the cellulose acetate film, and hence is preferably an alcohol (e.g., isopropanol, butanol). Further, a mixture containing other solvents (such as propylene glycol and water) for improving coating characters and alkali solubility may be used as the solvent.

The Re550 of the thus treated cellulose acetate film is changed through the above saponification by 3 nm or less. Further, the above saponification does not yellow the alkaline solution.

The corona discharge treatment comprises the steps of applying high voltage between a roll of dielectrics and an electrode connecting to a high voltage generator, and placing or moving the cellulose acetate film in corona discharge generated between the roll and the electrode. In the present specification, the frequency of the high voltage applied between the roll and the electrode is referred to as "discharge frequency". The corona discharge treatment is easily carried out under air atmosphere, but it may be done in a processing container filled with gas other than air or filled with air-contaminated gas while the container is sealed or semi-sealed. Examples of the gas include nitrogen gas, argon gas and oxygen gas.

The discharge frequency is normally in the range of 50 Hz to 5,000 kHz, preferably in the range of 5 to several hundreds kHz. If it is too low, the discharge is so unstable that the resultant film has many pinholes. On the other hand, if it is too high, the treatment costs a lot because an apparatus for impedance matching must be used additionally.

For normally improving the wettability, the cellulose acetate film is subjected to corona discharge treatment preferably in an amount of 0.001 to 5 kV·A·minute/m$^2$, more preferably in an amount of 0.01 to 1 kV·A·minute/m$^2$. The gap between the roll and the electrode is preferably in the range of 0.5 to 2.5 mm, more preferably in the range of 1.0 to 2.0 mm.

The glow discharge treatment comprises the steps of applying high voltage between a pair of (or more) electrodes under low-pressured gas atmosphere, and placing or moving the cellulose acetate film in glow discharge generated between the electrodes.

The gas pressure is normally in the range of 0.005 to 20 Torr, preferably in the range of 0.02 to 2 Torr. If it is too low, the surface treatment cannot give an effect. On the other hand, if it is too high, excess current flows to spark or to destroy the film. For causing the discharge, the voltage is applied between a pair of (or more) metal plates or rods in a vacuum tank. The voltage depends upon the gas and its pressure, but is normally in the range of 500 to 5,000 V to cause stable stationary glow discharge in the above pressure range. In order to improve the adhesion, it is preferably in the range of 2,000 to 4,000 V. The discharge frequency is generally in the range of 0 (direct current) to several thousands MHz, preferably in the range of 50 Hz to 20 MHz. The cellulose acetate film is subjected to glow discharge treatment preferably in an amount of 0.01 to 5 kV·A·minute/m$^2$, more preferably in an amount of 0.15 to 1 kV·A·minute/m$^2$, to obtain desired adhesion strength.

In the ultraviolet (UV) treatment, the cellulose acetate film is exposed to ultraviolet rays. If the film surface may be heated to about 150° C. in consideration of film characters, a high pressure mercury lamp (main wavelength: 365 nm) is usable as a light source. If the film must be treated at a low temperature, a low pressure mercury lamp (main wavelength: 254 nm) is preferably used. Other light sources such as high and low pressure mercury lamps of ozone-less type may be used. The more amount of UV light the film is exposed to, the more the adhesion is improved. However, if exposed to too much amount of UV light, the film is colored and mechanically weakened. Accordingly, if the high pressure mercury lamp (main wavelength: 365 nm) is used, the exposed amount is preferably in the range of 20 to 10,000 mJ/cm$^2$, more preferably in the range of 50 to 2,000 mJ/cm$^2$. If the low pressure mercury lamp (main wavelength: 254 nm) is used, it is preferably in the range of 100 to 10,000 mJ/cm$^2$, more preferably in the range of 300 to 1,500 mJ/cm$^2$.

(Optical Compensatory Sheet Comprising Optically Anisotropic Layer)

An optically anisotropic layer prepared from a liquid crystal compound is provided on the cellulose acetate film to produce the optical compensatory sheet of the invention. Preferably, an orientation layer is provided between the cellulose acetate film and the optically anisotropic layer provided thereon. The orientation layer aligns molecules of the liquid crystal compound in a certain direction, and hence it is indispensable for the invention. After the molecules are aligned with the orientation layer, they may be fixed with the alignment maintained. If so, since the orientation layer already accomplished its work, the optical compensatory sheet does not need to comprise the orientation layer. In fact, the optically anisotropic layer containing the aligned and fixed liquid crystal molecules can be alone transferred (without the orientation layer) onto the cellulose acetate film, to prepare an optical compensatory sheet, (Orientation Layer)

The orientation layer has a function of giving an orientation direction of the liquid crystal molecules. Preferred examples of the orientation layer include a layer of an organic compound (preferably polymer) subjected to rubbing treatment, an obliquely deposited layer of an inorganic compound, and a layer having micro grooves. Further, a built-up film formed according to Langmuir-Blodgett technique (LB technique) from ω-tricosanoic acid, dioctadecyldimethylammoniumchloride or methyl stearate can be used as the orientation layer. In addition, a layer prepared by orienting dielectric materials by application of electric field or magnetic field can be employed as the orientation layer.

The orientation layer is preferably made of a polymer subjected to rubbing treatment. As the polymer, polyvinyl alcohol is preferred. Particularly, denatured polyvinyl alcohol having hydrophobic groups is preferred. The orientation layer can be prepared from only one polymer. However, for preparing the orientation layer, a layer made of two crosslinked polymers is subjected to rubbing treatment. At least one of the two polymers is preferably crosslinkable by itself or with a crosslinking agent. The polymers which originally have functional groups or to which functional groups are introduced are reacted with light, heat or pH variation to form the orientation layer; or otherwise linking groups are introduced by a reactive crosslinking agent into the polymers so that the polymers can be crosslinked to form the orientation layer.

In a normal process, a coating liquid containing the polymers and, if needed, the crosslinking agent is applied on the cellulose acetate film, and then heated to induce the crosslinking reaction. The reaction may be caused at any stage from the step of coating the film with the coating liquid to the step of producing the resultant sheet.

In consideration of orientation of the liquid crystal molecules (in the optically anisotropic layer) on the orientation layer, the crosslinking reaction is preferably caused sufficiently after the molecules are aligned.

Generally, the coating liquid is applied, heated and dried to form the orientation layer on the cellulose acetate film. In that process, the liquid is preferably heated at such a low temperature that the molecules are fully crosslinked at stage of heating.

Polymers crosslinkable either by itself or with crosslinking agents can be used. Some polymers are crosslinkable both by itself and with crosslinking agents. Examples of the polymers include polymethyl methacrylate, acrylic acid/ methacrylic acid copolymer, styrene/maleinimide copolymer, polyvinyl alcohol and denatured polyvinyl alcohol, poly(N-methylolacrylamide), styrene/vinyltoluene copolymer, chlorosulfonated polyethylene, nitrocellulose, polyvinyl chloride, chlorinated polyolefin, polyester, polyimide, vinyl acetate/vinyl chloride copolymer, ethylene/vinyl acetate copolymer, carboxymethyl cellulose, polyethylene, polypropylene, polycarbonate, and organic substances such as silan coupling agents.

Preferred examples are water-soluble polymers such as poly(N-methylolacrylamide), carboxymethylcellulose, gelatin, polyvinyl alcohol and denatured polyvinyl alcohol. Gelatin, polyvinyl alcohol and denatured polyvinyl alcohol are particularly preferred, and polyvinyl alcohol and denatured polyvinyl alcohol are further preferred.

It is most preferred to use two kinds of polyvinyl alcohols or denatured polyvinyl alcohols having different polymerization degrees.

The saponification degree of the polyvinyl alcohol is in the range of 70 to 100%, preferably in the range of 80 to 100%, more preferably in the range of 85 to 95%. The polymerization degree is preferably in the range of 100 to 3,000.

Examples of the denatured polyvinyl alcohol include polyvinyl alcohols denatured by copolymerization, by chain transfer and by block polymerization. Examples of the denaturing group in the copolymerization include COONa, $Si(OX)_3$, $N(CH_3)_3 \cdot Cl$, $C_9H_{19}COO$, $SO_3Na$ and $C_{12}H_{25}$. Examples of the denaturing group in the chain transfer include COONa, SH and $C_{12}H_{25}$. Examples of the denaturing group in the block polymerization include COOH, $CONH_2$, COOR and $C_6H_5$.

Non-denatured or denatured polyvinyl alcohols having saponification degrees of 80 to 100% are preferred, and those having saponification degrees of 85 to 95% are further preferred.

The denatured polyvinyl alcohol is preferably a product of reaction between polyvinyl alcohol and the compound represented by the following formula. Hereinafter, such denatured polyvinyl alcohol is referred to as "the particular denatured polyvinyl alcohol".

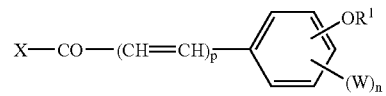

in which $R^1$ is an alkyl group, an acryloylalkyl group, a methacryloylalkyl group or an epoxyalkyl group; W is a halogen atom, an alkyl group or an alkoxy group; X is an atomic group required to form an active ester, an acid anhydride or a acid halide; p is 0 or 1; and n is an integer of 0 to 4.

The denatured polyvinyl alcohol is more preferably a product of reaction between polyvinyl alcohol and the compound represented by the following formula:

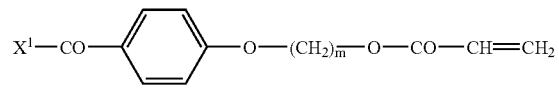

in which $X^1$ is an atomic group required to form an active ester, an acid anhydride or a acid halide; and m is an integer of 2 to 24.

The polyvinyl alcohol reacted with the compound represented by the above formulas are the aforementioned non-denatured polyvinyl alcohols or polyvinyl alcohols denatured by copolymerization, by chain transfer or by block polymerization. Preferred examples of the particular denatured polyvinyl alcohol are described in Japanese Patent Provisional Publication No. 9(1997)-152509.

With respect to the polyvinyl alcohol, Japanese Patent Provisional Publication No. 8(1996)-338913 describes the synthesis, the measurement of visible absorption spectrum and how to determine the amount of introduced denaturing groups.

Examples of the crosslinking agent include aldehydes, (e.g., formaldehyde, glyoxal, glutaraldehyde), N-methylol compounds (e.g., dimethylol urea, methyloldimethylhydantoin), dioxane derivatives (e.g., 2,3-dihydroxydioxane), compounds that works when the carboxylic group is activated (e.g., carbenium, 2-naphthalenesulfonate, 1,1-bispyrrolidino-1-chloropyridinium, 1-morpholinocarbonyl-3-(sulfonatoaminomethyl), active vinyl compounds (e.g., 1,3,5-triacryloyl-hexahydro-s-triazine, bis-(vinylsulfone) methane, N,N'-methylenebis-[β-vinylsulfonyl] propionamide), active halogen compounds (e.g., 2,4-dichloro-6-hydroxy-s-triazine), isooxazoles and dialdehyde starch. Two or more crosslinking agents may be used in combination.

They are used together with preferably water-soluble polymer, more preferably polyvinyl alcohol or denatured polyvinyl alcohol (including the above particular polyvinyl alcohol). Reactive aldehydes are preferred, and glutaraldehyde is particularly preferred in consideration of productivity.

The amount of the crosslinking agent is not particularly restricted. The more the crosslinking agent is added, the more the durability against moisture is improved. However, if the amount of crosslinking agent is 50 wt. % or more per the amount of the polymer, the resultant orientation layer poorly aligns the molecules. Accordingly, the amount of crosslinking agent is preferably in the range of 0.1 to 20 wt. %, more preferably in the range of 0.5 to 15 wt. % based on the amount of the polymer. Even after the crosslinking reaction is completed, the obtained orientation layer contains non-reacted crosslinking agent a little. The amount of the non-reacted crosslinking agent remaining in the orientation layer is preferably not more than 1.0 wt. %, more preferably not more than 0.5 wt. % based on the amount of the orientation layer. If the layer contains the non-reacted agent in an amount of more than 1.0 wt. %, the layer has poor durability. A liquid crystal display comprising such orientation layer often suffers troubles of reticulation if used for a long time or left under hot and humid condition.

The orientation layer can be formed by the steps of coating the cellulose acetate film with a coating liquid containing the above polymer and (if needed) the crosslinking agent, heating to dry and crosslink the applied polymer, and subjecting the formed layer to rubbing treatment. The crosslinking reaction may be caused at any step after applying the coating liquid.

In the case where a water-soluble polymer such as polyvinyl alcohol is used, the coating solution is preferably prepared from a mixed solvent of water and an organic solvent having defoaming character (e.g., methanol). The ratio of water/methanol is normally in the range of 0:100 to 99:1, preferably in the range of 0:100 to 91:9. Because of defoaming character of the organic solvent, defects on the orientation layer are remarkably decreased, and accordingly the optically anisotropic layer has an improved surface.

As the coating method, known methods such as spin coating, dip coating, curtain coating, extrusion coating, bar coating and E type coating can be adopted. The E type-coating method is particularly preferred.

The thickness of the layer is preferably in the range of 0.1 to 10 μm. The applied layer can be dried at a temperature of 20 to 110° C. For ensuring sufficient crosslinking, the temperature is preferably in the range of 60 to 100° C., more preferably in the range of 80 to 100° C. The time for drying is in the range of 1 minute to 36 hours, preferably in the range of 5 minute to 30 minutes. The pH is also preferably adjusted at an optimal value according to the used crosslinking agent. If glutaraldehyde is used as the crosslinking agent, the pH is preferably in the range of 4.5 to 5.5, more preferably at 5.0.

The orientation layer is provided on the cellulose acetate film or an undercoating layer. After the above-described polymer layer is crosslinked, the surface of the layer is subjected to rubbing treatment to form the orientation layer.

The rubbing treatment can be conducted in the manner adopted widely for aligning liquid crystal molecules of LCD. The surface of the layer is rubbed with paper, cloth (gauze, felt, nylon, polyester) or rubber along a certain direction, to give the aligning function. Generally, the layer is rubbed several times with cloth on which fibers having the same length and thickness are provided. The orientation layer determines the aligning direction of liquid crystal molecules provided thereon.

(Optically Anisotropic Layer)

In the invention, an optically anisotropic layer prepared from a liquid crystal compound is provided on the orientation layer formed on the cellulose acetate film.

The-liquid crystal compound composing the optically anisotropic layer may be a rod-like liquid crystal compound or a discotic one. The rod-like or discotic liquid crystal compound may have a low molecular weight or a high molecular weight. Further, a low molecular weight liquid crystal compound is crosslinked to become a compound that does not behave as liquid crystal. Such compound is also usable.

For preparing the optically anisotropic layer, a solution containing the liquid crystal compound and other optional components (such as polymerization initiator) is applied on the orientation layer.

A solvent for the preparation of the solution preferably is an organic solvent. Examples of the organic solvents include amides (e.g., N,N-dimethylformamide), sulfoxides (e.g., dimethylsulfoxide), heterocyclic compounds (e.g., pyridine), hydrocarbons (e.g., benzene, hexane), alkyl halides (e.g., chloroform, dichloromethane), esters (e.g., methyl acetate, butyl acetate), ketones (e.g., acetone, methyl ethyl ketone) and ethers (e.g., tetrahydrofuran, 1,2-dimethoxyethane). Alkyl halides and ketones are preferred. Two or more organic solvents can be used in combination.

The solution can be coated according to a conventional coating method such as a wire-bar coating method, an extrusion coating method, a direct gravure coating method, a reverse gravure coating method or a die coating method.

The thickness of the optically anisotropic layer is preferably in the range of 0.1 to 20 μm, more preferably in the range of 0.5 to 15 μm, most preferably in the range of 1 to 10 μm.

As the liquid crystal compound used in the invention, a discotic liquid crystal compound is preferably used.

(Rod-like Liquid Crystal Compound)

Examples of the rod-like liquid crystal compound include azomethines, azoxys, cyanobiphenyls, cyanophenyl esters, benzoic esters, phenyl esters of cyclohexanecarboxylates, cyanophenylcyclohexanes, cyano-substituted phenylpyrimidines, alkoxy-substituted phenylpyrimidines, phenyldioxanes, tolanes, and alkenylcyclohexylbenzonitriles.

Metal complexes are also included in the rod-like liquid crystal compounds. Further, a liquid crystal polymer in which the repeating unit comprises a rod-like liquid crystal moiety is also usable as the rod-like liquid crystal compound. On other words, the rod-like liquid crystal compound may be combined with a (liquid crystal) polymer.

Descriptions of the rod-like liquid crystal compounds are found in "Kagaku-Sosetsu, Ekisho no Kageku" (written in Japanese), vol. 22(1994), Chapters 4, 7 and 11; and "Ekisho Devise Handbook" (written in Japanese), chapter 3.

The rod-like liquid crystal molecule preferably has a birefringent index of 0.001 to 0.7.

The rod-like liquid crystal molecule preferably has a polymerizable group (Q) to fix the alignment.

Examples of the polymerizable group (Q) are shown below.

 (Q1)

 (Q2)

 (Q3)

 (Q4)

 (Q5)

-continued

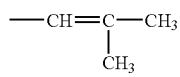 (Q6)

—C≡CH (Q7)

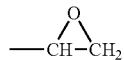 (Q8)

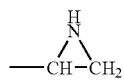 (Q9)

—SH (Q10)

—CHO (Q11)

—OH (Q12)

—CO₂H (Q13)

—N═C═O (Q14)

—NH₂ (Q15)

—SO₃H (Q16)

—N═C═S (Q17)

The polymerizable group (Q) preferably is an unsaturated polymerizable group (Q1 to Q7), an epoxy group (Q8) or an aziridinyl group (Q9), more preferably is an unsaturated polymerizable group, and most preferably is an ethylenically unsaturated group (Q1 to Q6).

The rod-like liquid crystal molecule preferably has an almost symmetrical structure, and accordingly preferably has a polymerizable group at each end.

Examples of the rod-like liquid crystal molecule are shown below.

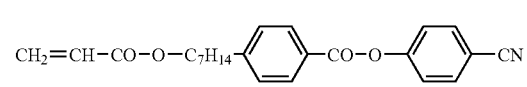 (N1)

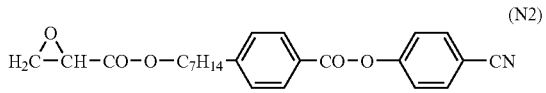 (N2)

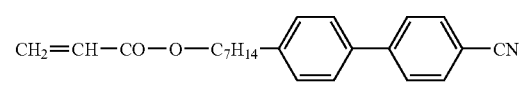 (N3)

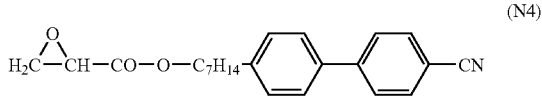 (N4)

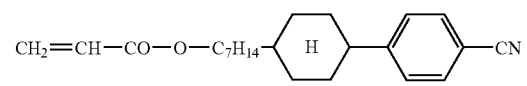 (N5)

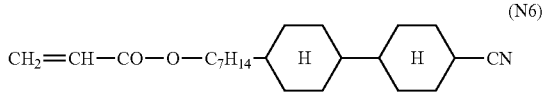 (N6)

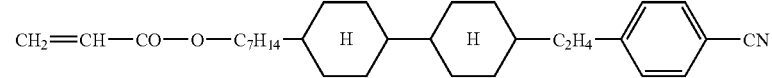 (N7)

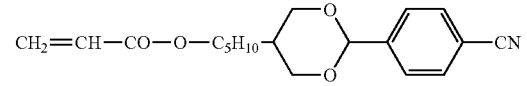 (N8)

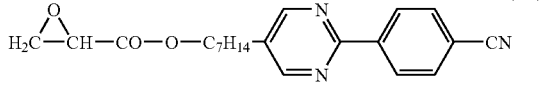 (N9)

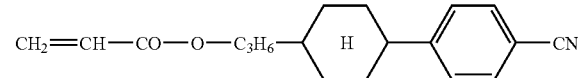 (N10)

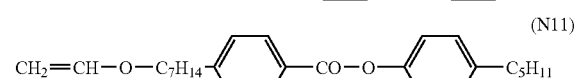 (N11)

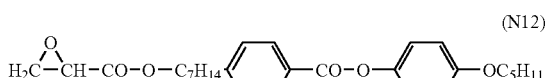 (N12)

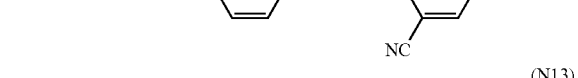 (N13)

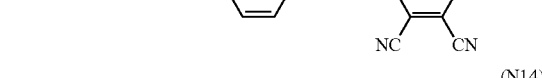 (N14)

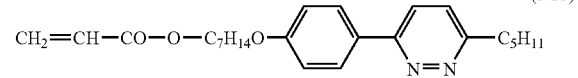 (N15)

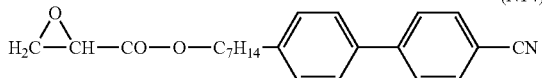 (N16)

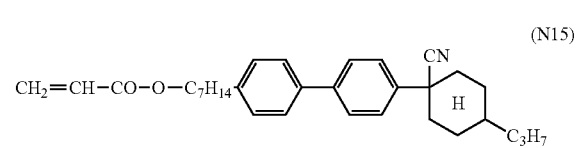

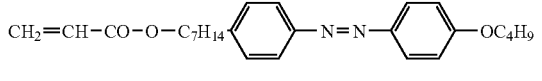

-continued
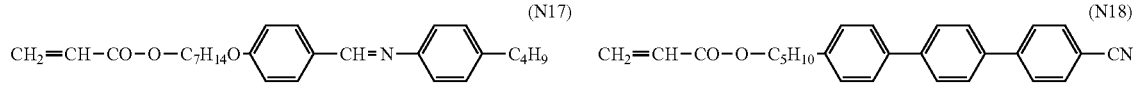
(N17)
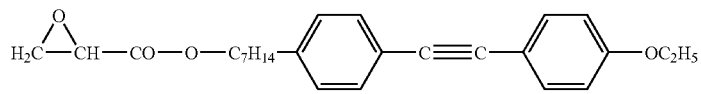
(N18)
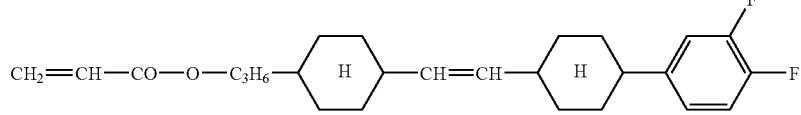
(N19)
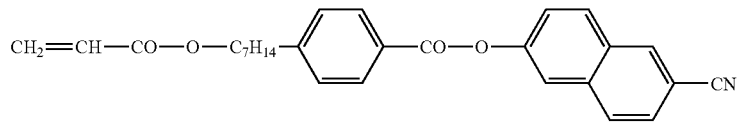
(N20)
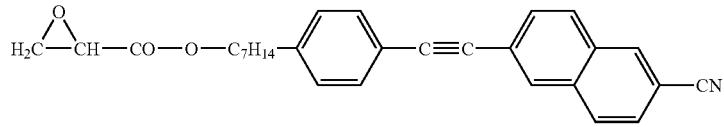
(N21)
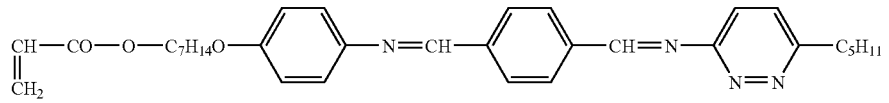
(N22)
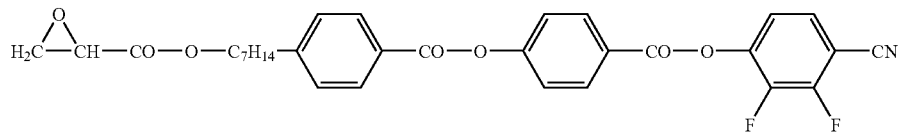
(N23)
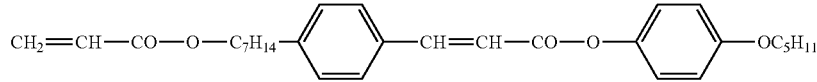
(N24)
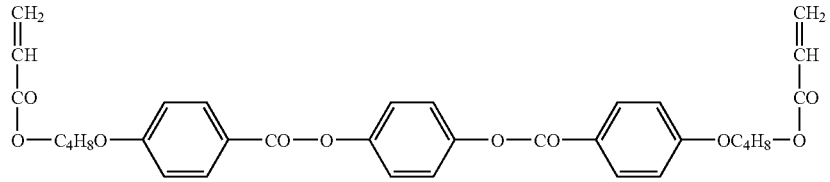
(N25)
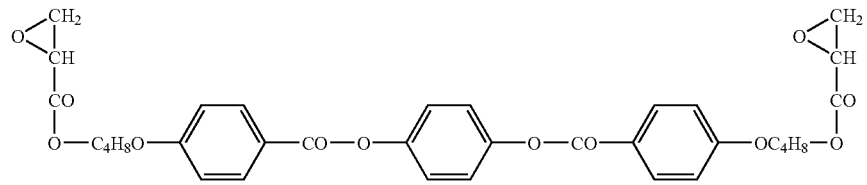
(N26)
(N27)
(N28)
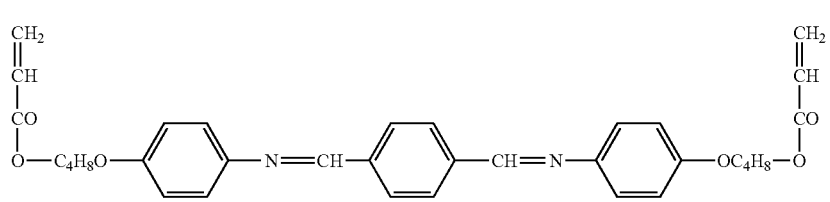

-continued
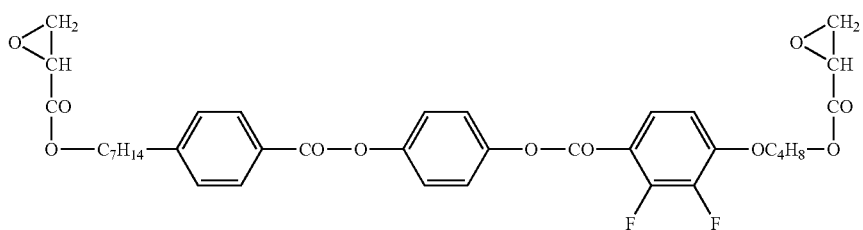
(N29)
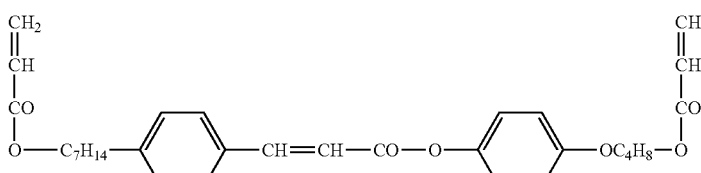
(N30)
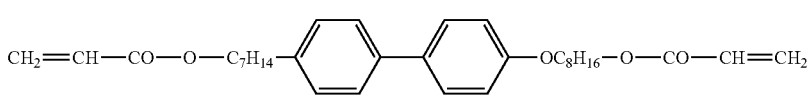
(N31)
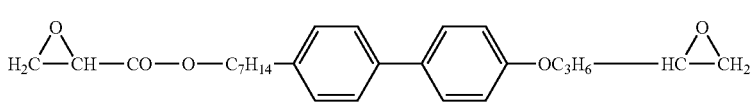
(N32)
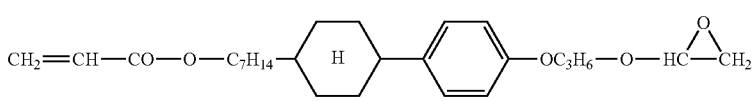
(N33)
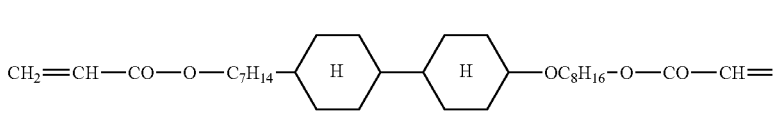
(N34)
(N35)
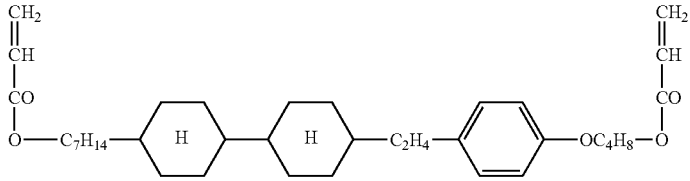
(N36)
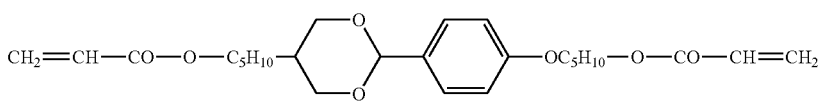
(N37)
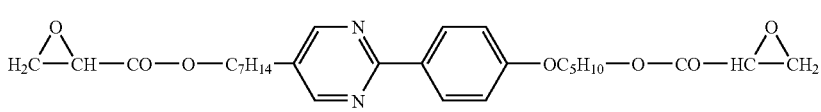
(N38)
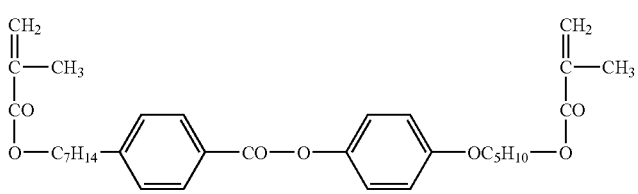

-continued
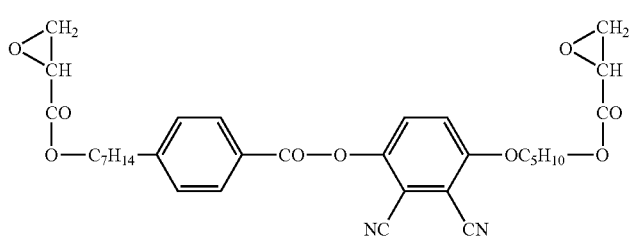
(N39)
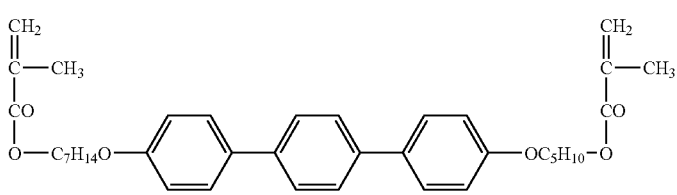
(N40)
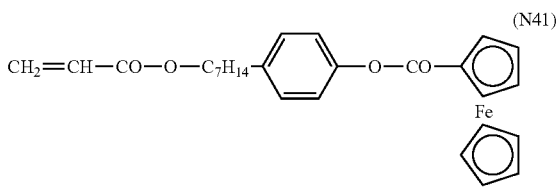
(N41)
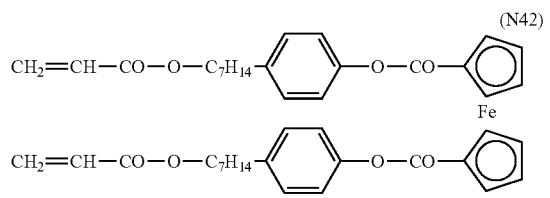
(N42)
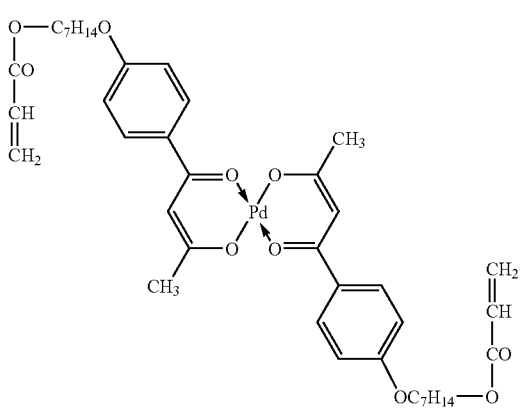
(N43)
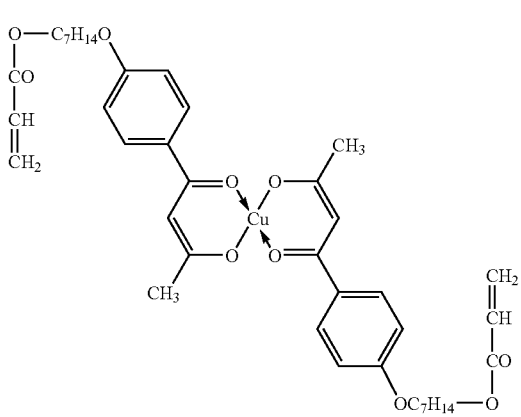
(N44)

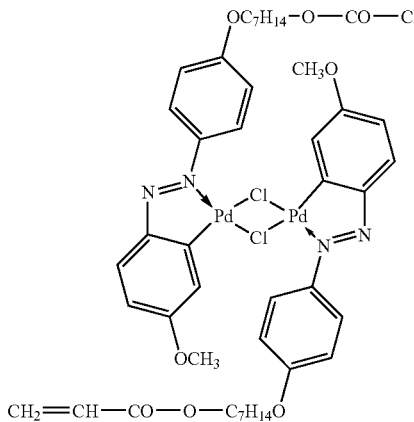 (N45)

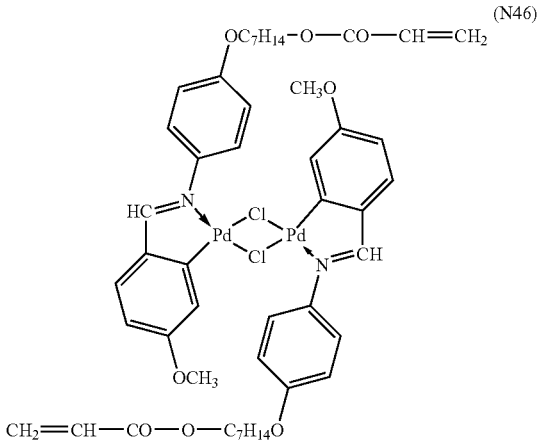 (N46)

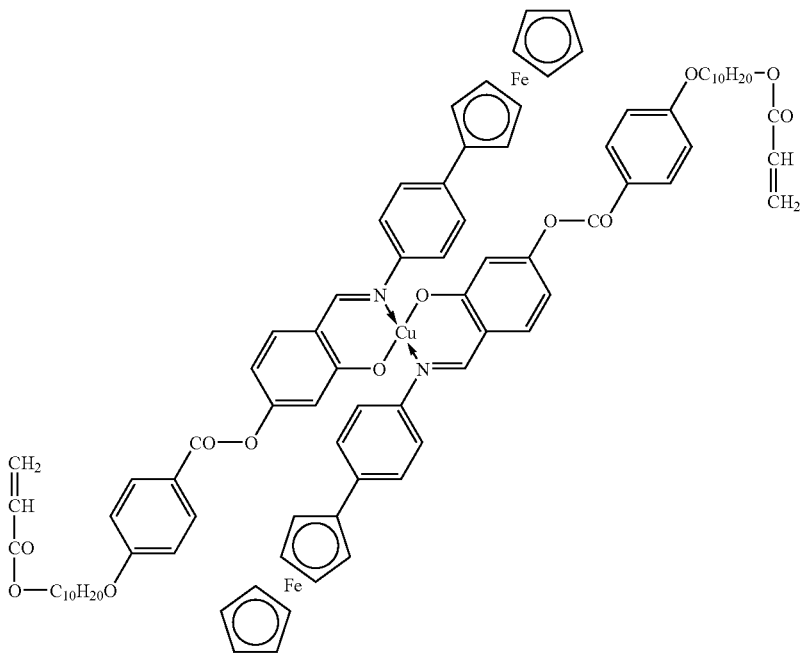 (N47)

The optically anisotropic layer is prepared by coating the orientation layer with a liquid crystal composition (coating solution) containing the rod-like liquid crystal compound and other optional components such as polymerization initiator and additives (e.g., plasticizer, monomer, surface active agent, cellulose acetate, 1,3,5-triazine, chiral agent).

(Discotic Liquid Crystal Compound)

The discotic molecules give large birefringence and have various alignment forms, and accordingly an optical compensatory sheet obtained from the discotic molecules has a specific optical characteristic that cannot be obtained from the conventional stretched birefringent film. The optical compensatory sheet comprising discotic molecules is described in Japanese Patent Provisional Publication No. 6(1994)-214116, U.S. Pat. Nos. 5,583,679, 5,646,703 and German Patent Publication No. 3,911,620A1.

Examples of the discotic liquid crystal compound include benzene derivatives described in C. Destrade et al., Mol. Cryst. vol. 71, pp. 111, (1981); truxene derivatives described in C. Destrade et al., Mol Cryst. vol. 122, pp. 141. (1985), Physics lett. A, vol. 78, pp. 82, (1990); cyclohexane derivatives described in B. Kohn et al., Angew. Chem. vol. 96, pp. 70, (1984); and macrocyclic compounds of azacrown-type or phenylacetylene-type described in J. M. Lehn et al., J. Chem. Commun. pp. 1794, (1985), and J. Zhang et al., J. Am. Chem. Soc. vol. 116, pp. 2655, (1994).

The discotic compound has a structure in which the discotic structure unit is located at the center as a parent core and further straight chain groups such as alkyl, alkoxy and substituted benzoyl are radially substituted. The discotic compound generally has the properties of liquid crystal, and hence includes a compound generally called discotic liquid crystal. As the discotic liquid compounds, any compound can be used so long as it has negative uniaxial property and orientation property. Substance derived from the discotic compound is not always the above-described compound. For example, the low molecular weight discotic liquid crystal compound having a thermo- or photo-reactive group is polymerized by heat or light to form a polymer that does not behave as liquid crystal. Such polymer can be also used in the invention. Preferred examples of the discotic liquid crystal compound are described in Japanese Patent Provisional Publication No. 8(1996)-50206. Japanese Patent Provisional Publication No. 8(1996)-27284 describes polymerization of the discotic liquid crystal compound.

A polymerizable group should be bound to a discotic core of the discotic compound to cause the polymerization reaction of the compound. However, if the polymerizable group is directly bound to the discotic core, it is difficult to keep the alignment at the polymerization reaction. Therefore, a linking group is introduced between the discotic core and the polymerizable group. Accordingly, the discotic compound having a polymerizable group preferably is a compound represented by the following formula (III).

$$D(-L-P)_n \quad (III)$$

in which D is a discotic core; L is a divalent linking group; P is a polymerizable group; and n is an integer of 4 to 12.

Examples of the discotic cores (D) are shown below. In the examples, LP (or PL) means the combination of the divalent linking group (L) and the polymerizable group (P).

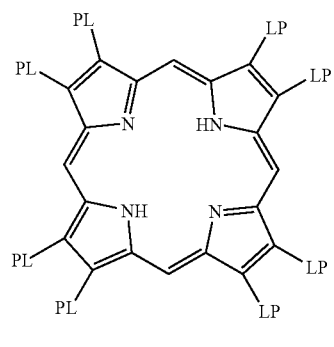
(D1)

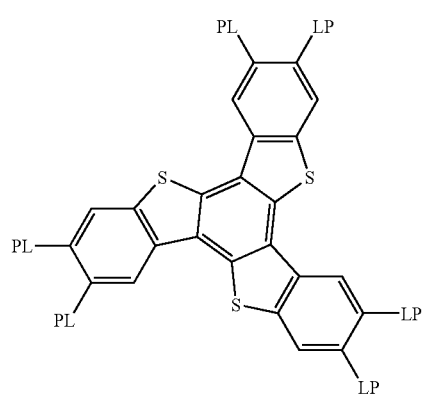
(D2)

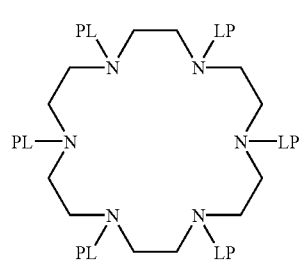
(D3)

-continued

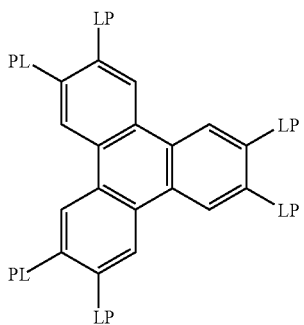
(D4)

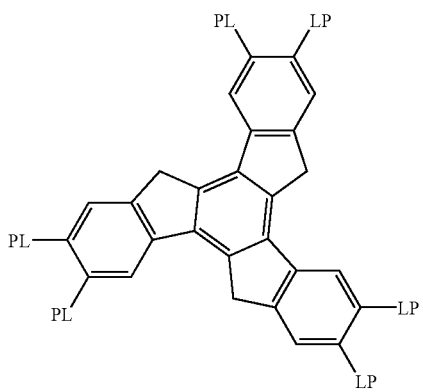
(D5)

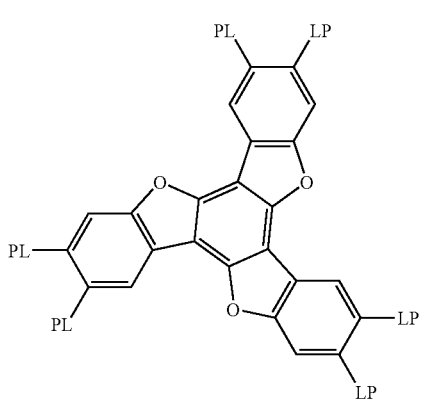
(D6)

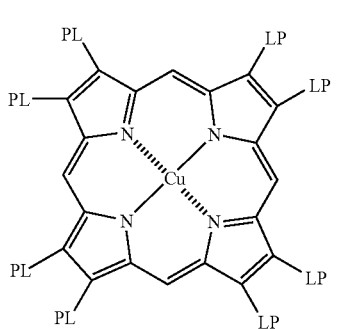
(D7)

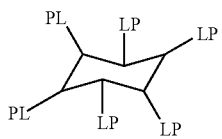
(D8)

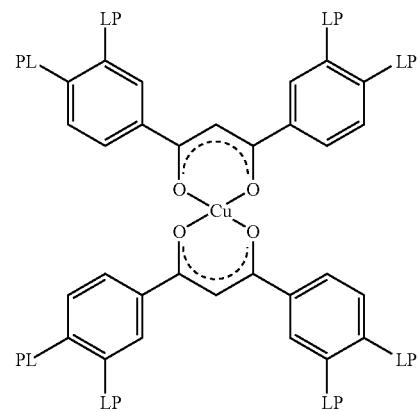
(D9)
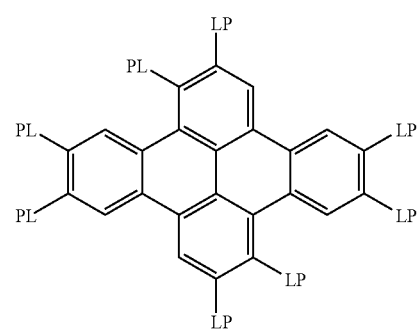
(D10)
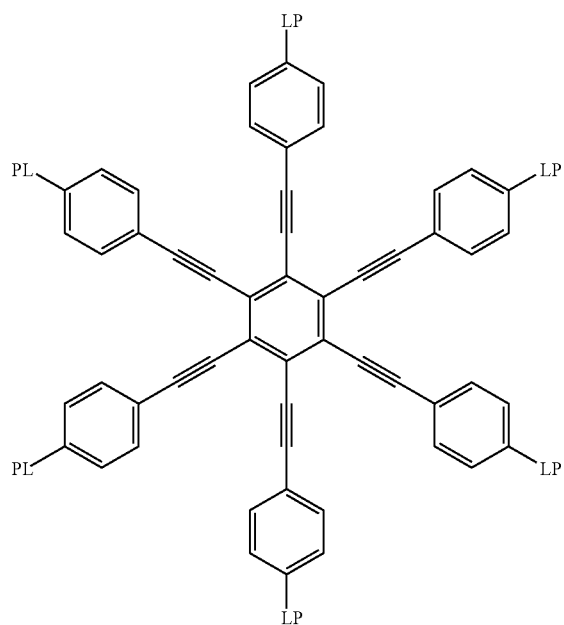
(D11)
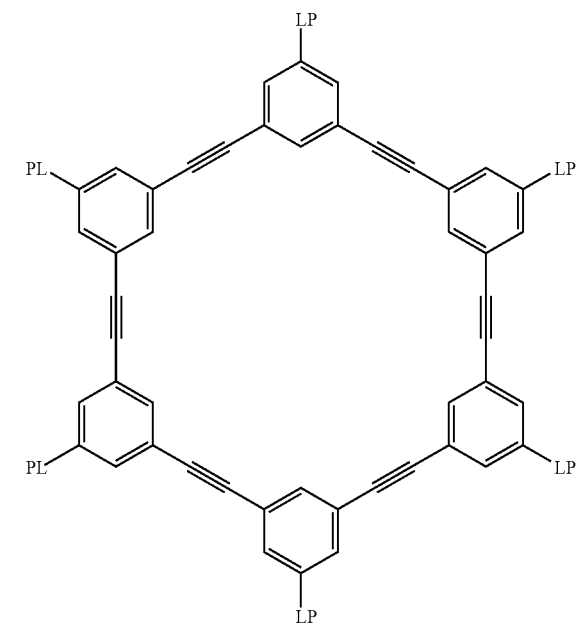
(D12)
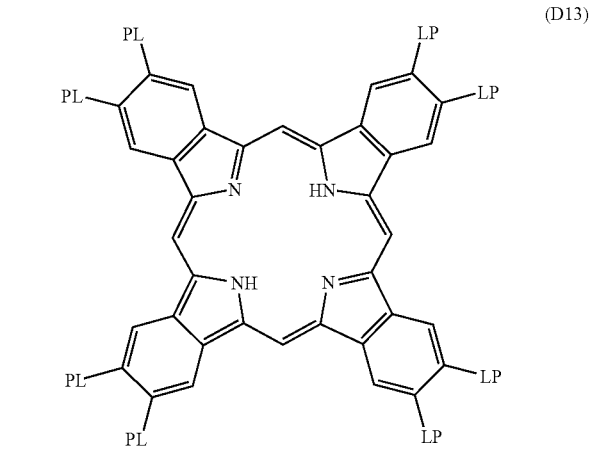
(D13)
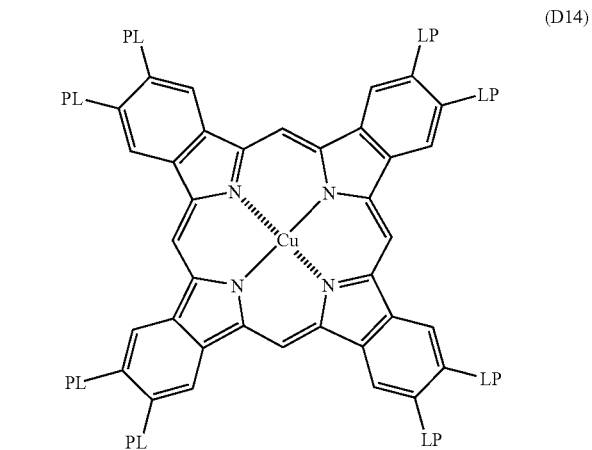
(D14)

-continued

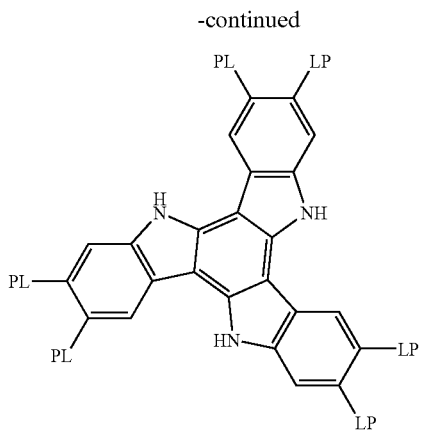
(D15)

In the formula (III), the divalent linking group (L) preferably is selected from the group consisting of an alkylene group, an alkenylene group, an arylene group, —CO, —NH—, —O—, —S— and combinations thereof. L more preferably is a divalent linking group comprising at least two divalent groups selected from the group consisting of an alkylene group, an arylene group, —CO—, —NH—, —O— and —S—. L more preferably is a divalent linking group comprising at least two divalent groups selected from the group consisting of an alkylene group, an arylene group, —CO— and —O—. The alkylene group preferably has 1 to 12 carbon atoms. The alkenylene group preferably has 2 to 12 carbon atoms. The arylene group preferably has 6 to 10 carbon atoms.

Examples of the divalent linking groups (L) are shown below. In the examples, the left side is attached to the discotic core (D), and the right side is attached to the polymerizable group (P). The AL means an alkylene group or an alkenylene group. The AR means an arylene group. The alkylene group, the alkenylene group and the arylene group may have a substituent group (e.g., an alkyl group).

L1: -AL-CO—O-AL-
L2: -AL-CO—O-AL-O—
L3: -AL-CO—O-AL-O-AL
L4: -AL-CO—O-AL-O—CO—
L5: —CO-AR-O-AL-
L6: —CO-AR-O-AL-O—
L7: —CO-AR-O-AL-O—CO—
L8: —CO—NH-AL-
L9: —NH-AL-O—
L10: —NH-AL-O—CO—
L11: —O-AL-
L12: —O-AL-O—
L13: —O-AL-O—CO—
L14: —O-AL-O—CO—NH-AL-
L15: —O-AL-S-AL-
L16: —O—CO-AR-O-AL-CO—
L17: —O—CO-AR-O-AL-O—CO—
L18: —O—CO-AR-O-AL-O-AL-O—CO—
L19: —O—CO-AR-O-AL-O-AL-O-AL-O—CO—
L20: —S-AL-
L21: —S-AL-O—
L22: —S-AL-O—CO—
L23: —S-AL-S-AL-
L24: —S-AR-AL-

The polymerizable group (P) is determined according to the polymerization reaction. Examples of the polymerizable groups (P) are shown below.

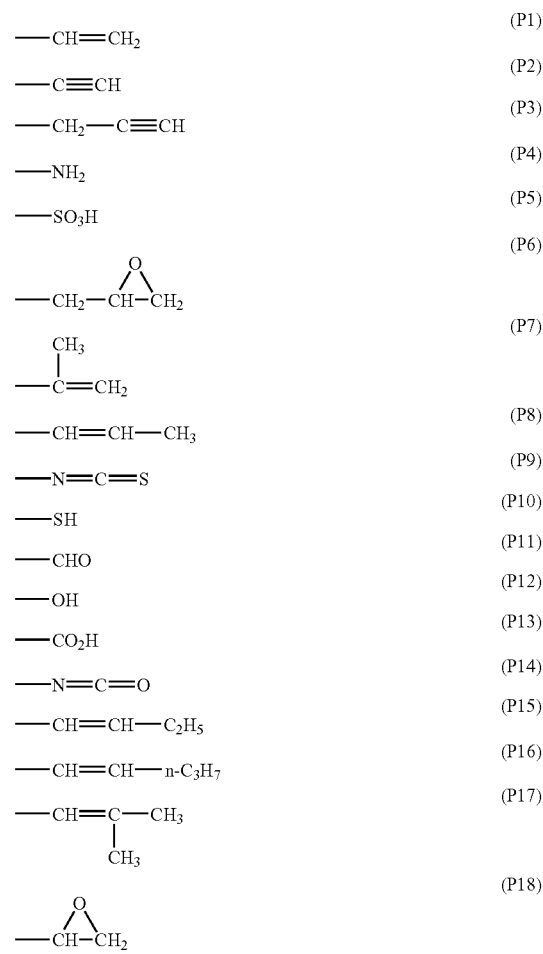

The polymerizable group (P) preferably is an unsaturated polymerizable group (P1, P2, P3, P7, P8, P15, P16, P17) or an epoxy group (P6, P18), more preferably is an unsaturated polymerizable group, and most preferably is an ethylenically unsaturated group (P1, P7, P8, P15, P16, P17). In the formula (I), n is an integer of 4 to 12, which is determined according to the chemical structure of the discotic core (D). The 4 to 12 combinations of L and P can be different from each other. However, the combinations are preferably identical. The discotic liquid crystal compound is described in Japanese Patent Provisional Publication Nos. 7(1995)-281028, 7(1995)-306317, 8(1996)-50206, 9(1997)-104656, 9(1997)-104866 and 9(1997)-11240.

If the discotic compound is used, the optically anisotropic layer is a negative birefringent layer. In the optically anisotropic layer, discotic structure units of the discotic compound preferably have planes inclined from a plane of the cellulose acetate film at an angle varying in (along) the direction of depth of the layer.

The above-described angle (inclined angle) of the plane of discotic structure unit generally increases or decreases with increase of distance in the direction of depth from the bottom of the optically anisotropic layer. The inclined angle preferably increases with increase of the distance. Further, examples of variation of the inclined angle include continuous increase, continuous decrease, intermittent increase, intermittent decrease, variation containing continuous increase and decrease, and intermittent variation containing increase or decrease. The intermittent variation contains an area where the inclined angle does not vary in the course of the thickness direction of the layer. The inclined angle preferably totally increases or decreases in the layer, even if it does not vary in the course. The inclined angle more preferably increases totally, and it is particularly preferred to increase continuously. The inclined angle of the discotic unit on the support side can be generally controlled by selecting the discotic compound or materials of the orientation layer, or by selecting methods for the rubbing treatment. The discotic compound or other compounds used together with the discotic compound can be selected to control the inclined angle of the discotic unit on the surface side (air side). Examples of the compounds used together with the discotic compound include a plasticizer, a surface active agent, a polymerizable monomer and a polymer. Further, the extent of variation of the inclined angle can be also controlled by the above selection.

Any compound can be employed as the plasticizer, the surface active agent and the polymerizable monomer, so long as it is compatible with the discotic compound and it gives variation of the inclined angle or dose not inhibit the discotic compound molecules from aligning. Preferred is polymerizable monomer (e.g., compounds having a vinyl, vinyloxy, acryloyl or methacryloyl group). Those compounds are preferably used in the amount of 1 to 50 wt. % (especially 5 to 30 wt. %) based on the amount of the discotic compound.

Any polymer can be used together with the discotic liquid crystal compound, so long as it is compatible with the discotic compound and it gives variation of the inclined angle. The polymer is, for example, cellulose ester. Preferred examples of the cellulose acetate include cellulose acetate, cellulose acetatepropionate, hydrocypropyl-cellulose, and cellulose acetatebutylate. In order not to prevent molecules of the discotic compound from aligning, the amount of the polymer is generally in the range of 0.1 to 10 wt. %, preferably in the range of 0.1 to 8 wt. %, more preferably in the range of 0.1 to 5 wt. % based on the amount of the discotic compound.

The optically anisotropic layer can be generally prepared by the steps of coating the orientation layer with a solution of the discotic compound and other compounds dissolved in a solvent, drying, heating to a temperature for forming a discotic nematic phase, and cooling with the oriented condition (discotic nematic phase) kept. Otherwise, the layer can be prepared by the steps of coating the orientation layer with a solution of the discotic compound and other compounds (e.g., polymerizable monomer, photopolymerization initiator) dissolved in a solvent, drying, heating to a temperature for forming a discotic nematic phase, polymerizing the heated layer (e.g., by radiation of UV light) and cooling. The transition temperature from discotic nematic phase to solid phase is preferably in the range of 70 to 300° C., especially 70 to 170° C.

(Fixation of Alignment of Liquid Crystal Compound)

Any polymer can be used together with the discotic liquid crystal compound, so long as it is compatible with the discotic compound and it gives variation of the inclined angle. The polymer is, for example, cellulose ester. Preferred examples of the cellulose ester include cellulose acetate, cellulose acetatepropionate, hydroxypropyl-cellulose, and cellulose acetate butyrate. In order not to prevent molecules of the discotic compound from aligning, the amount of the polymer is generally in the range of 0.1 to 10 wt. %, preferably in the range of 0.1 to 8 wt. %, more preferably in the range of 0.1 to 5 wt. % based on the amount of the discotic compound.

Examples of the photo polymerization initiators include α-carbonyl compounds (described in U.S. Pat. Nos. 2,367,661, 2,367,670), acyloin ethers (described in U.S. Pat. No. 2,448,828), α-hydrocarbon substituted acyloin compounds (described in U.S. Pat. No. 2,722,512), polycyclic quinone compounds (described in U.S. Pat. Nos. 2,951,758, 3,046,127), combinations of triarylimidazoles and p-aminophenyl ketones (described in U.S. Pat. No. 3,549,367), acridine or phenazine compounds (described in Japanese Patent Provisional Publication No. 60(1985)-105667 and U.S. Pat. No. 4,239,850) and oxadiazole compounds (described in U.S. Pat. No. 4,212,970).

The amount of the photo polymerization initiator is preferably in the range of 0.01 to 20 wt. %, and more preferably in the range of 0.5 to 5 wt. % based on the solid content of the coating solution.

The light irradiation for the photo polymerization is preferably conducted with ultraviolet rays.

The exposure energy is preferably in the range of 20 to 50,000 mJ/cm$^2$, more preferably in the range of 20 to 5,000 mJ/cm$^2$, most preferably in the range of 100 to 800 mJ/cm$^2$. The light irradiation can be conducted while the layer is heated to accelerate the photo polymerization reaction. The protective layer may be provided on the optically anisotropic layer.

(Polarizing Plate)

The polarizing plate comprises two transparent protective films and a polarizing membrane provided between the films. The optical compensatory sheet comprising the cellulose acetate film or the cellulose acetate film having the optically anisotropic layer provided thereon can be used as one of the protective films. A normal cellulose acetate film can be used as the other protective film.

Examples of the polarizing membrane include an iodine polarizing membrane, a polyene polarizing membrane and a dichromatic dye polarizing membrane. The iodine polarizing membrane and the dye polarizing membrane are generally prepared from polyvinyl alcohol films. The transmission axis of the polarizing membrane is placed perpendicularly to the stretching direction of the film.

The slow axis of the cellulose acetate film may be essentially parallel or perpendicularly to the transmission axis of the polarizing membrane.

It has been found that the moisture-permeability of the protective film is important for production of the polarizing plate. In producing the polarizing plate, the polarizing membrane and the protective film are laminated with an aqueous adhesive, and then the solvent of the adhesive is diffused into the film to dry. The higher permeability the film has, the more rapidly it is dried. Accordingly, the productivity of the polarizing plate is improved. However, if the permeability is too high, the outer moisture is liable to come into the membrane to impair polarizability if the liquid crystal display is used under humid condition.

The moisture-permeability depends upon various conditions such as thickness, free volume, and hydrophilicity (hydrophobicity) of the polymer film (and the polymerizable liquid crystal compound).

In the case where the optical compensatory sheet is used as the protective film of the polarizing plate, the compensatory sheet has a moisture-permeability preferably in the range of 100 to 1,000 (g/m$^2$)/24 hours, more preferably in the range of 300 to 700 (g/m$^2$)/24 hours.

In the film forming process, conditions and procedures such as rip flow, line speed, stretching and/or compressing are adequately selected to control the thickness of the compensatory sheet. Since the moisture-permeability depends upon the materials, the thickness is controlled so that the preferred permeability can be obtained.

Also in the film forming process, drying conditions such as time and temperature are suitably determined to control the free volume of the optical compensatory sheet. Since the moisture-permeability depends upon the materials, the free volume is controlled so that the preferred permeability can be obtained.

The hydrophilicity (hydrophobicity) of the transparent base film can be controlled with additives. If hydrophilic additives are contained in the free volume, the permeability is increased. If hydrophobic additives are added, the permeability is decreased.

The moisture-permeability can be thus controlled, and thereby the polarizing plate having optical compensatory function can be produced at small cost with high productivity.

(Circularly Polarizing Plate)

The $\lambda/4$ plate of the invention (optical compensatory sheet comprising the cellulose acetate film) and the polarizing membrane are laminated so that the slow axis in the plane of the $\lambda/4$ plate may be placed essentially at the angle of 45° to the transmission axis of the membrane, to produce a circularly polarizing plate. The term "placed essentially at the angle of 45°" means that the angle between the slow axis of $\lambda/4$ plate and the transmission axis of membrane is in the range of 40° to 50°. The angle is preferably in the range of 41° to 490, more preferably in the range of 420 to 48°, further preferably in the range of 43° to 47°, most preferably in the range of 440 to 460. On the back surface of the polarizing membrane (surface not facing to the $\lambda/4$ plate), a transparent protective film is preferably provided. As the transparent protective film, a conventional cellulose acetate film may be used.

(Liquid Crystal Display)

The aforementioned optical compensatory sheet or the polarizing plate in which the compensatory sheet and the polarizing membrane are laminated is particularly advantageously used in a liquid crystal display of transmission type or reflection type. The retardation values of the optically anisotropic cellulose acetate film are determined according to the aimed characters of liquid crystal display.

(Liquid Crystal Display of Transmission Type)

A liquid crystal display of transmission type comprises a pair of polarizing plates and a liquid crystal cell placed between them. The polarizing plate comprises a pair of transparent protective films and a polarizing membrane placed between them. The liquid crystal cell comprises a pair of substrates and liquid crystal provided between them.

In the case where the optical compensatory sheet of the invention is used in the liquid crystal display, the compensatory sheet is placed between the cell and one or each of the polarizing plates.

In the case where the polarizing plate of the invention is used in the liquid crystal display, it may be used as one of the two plates. The plates on both sides of the cell may be the polarizing plates of the invention. The polarizing plate of the invention is placed so that the optical compensatory sheet (which serves as a protective film of the polarizing plate) may face to the liquid crystal cell.

The liquid crystal cell works preferably according to VA mode (including MVA), OCB mode or TN mode.

The liquid crystal cell of OCB mode is a liquid crystal cell of bend alignment mode in which rod-like liquid crystal molecules in upper part and ones in lower part are aligned essentially in reverse (symmetrically). A liquid crystal display having the liquid crystal cell of bend alignment mode is disclosed in U.S. Pat. Nos. 4,583,825 and 5,410,422. Since rod-like liquid crystal molecules in upper part and ones in lower part are symmetrically aligned, the liquid crystal cell of bend alignment mode has self-optical compensatory function. Therefore, this mode is referred to as OCB (optically compensatory bend) mode. The liquid crystal display of bend alignment mode has an advantage of responding rapidly.

In a liquid crystal cell of VA mode, rod-like liquid crystal molecules are essentially vertically aligned while voltage is not applied. The liquid crystal cell of VA mode include some types: (1) a liquid crystal cell of VA mode in a narrow sense (described in Japanese Patent Provisional Publication No. 2(1990)-176625 and Japanese Patent Publication No. 7(1995)-69536), in which rod-like liquid crystal molecules are essentially vertically aligned while voltage is not applied, and the molecules are essentially horizontally aligned while voltage is applied; (2) a liquid crystal cell of MVA mode (described in SID97, Digest of tech. Papers, 28(1997), 845; SID99, Digest of tech. Papers, 30(1999), 206; and Japanese Patent Provisional Publication No. 11(1999)-258605), in which the VA mode is modified to be multi-domain type so as to enlarge the viewing angle), a cell of SURVAIVAL mode (described in "monthly Display (written in Japanese)", 6(1999), No. 3, pp. 14), a cell of PVA mode (described in Asia Display 98, Proc. of the 18$^{th}$ Inter. Display res. Conf., Papers, (1998), pp. 383), a cell of Para-A mode (presented in LCD/PDP International '99), a cell of DDVA mode (described in SID98, Digest of tech. Papers, 29(1998), 838), a cell of EOC mode (described in SID98, Digest of tech. Papers, 29(1998), 319), a cell of PSHA mode (described in SID98, Digest of tech. Papers, 29(1998), 1081), a cell of RFFMH mode (described in Asia Display 98, Proc. of the 18$^{th}$ Inter. Display res. Conf., Papers, (1998), pp. 375), and a cell of HMD mode (described in SID98, Digest of tech. Papers, 29(1998), 702); and (3) a liquid crystal cell of n-ASM mode (described in IWD '98, Proc. of the 5$^{th}$ Inter. Display Workshop Papers, (1998), pp. 143), in which rod-like liquid crystal molecules are essentially vertically aligned while voltage is not applied, and the molecules are essentially oriented in twisted multi-domain alignment while voltage is applied.

In a liquid crystal cell of TN mode, rod-like liquid crystal molecules are essentially horizontally aligned while voltage is not applied, and oriented in a twisted alignment with a twisted angle of 60 to 120°. The liquid crystal cell of TN mode is widely used in color TFT liquid crystal displays, and hence is described in many publications.

(Liquid Crystal Display of Reflection Type)

FIG. 1 schematically shows the basic structure of a liquid crystal display of reflection type.

The display shown in FIG. 1 comprises a lower substrate (1), a reflective electrode (2), a lower orientation layer (3), a liquid crystal layer (4), an upper orientation layer (5), a transparent electrode (6), an upper substrate (7), a $\lambda/4$ plate (8) and a polarizing membrane (9), piled up in this order.

A combination of the lower substrate (1) and the reflective electrode (2) constitutes a reflection board. A combination of the lower orientation layer (3) to the upper orientation layer (5) constitutes a liquid crystal cell. The λ/4 plate (8) may be placed at any position between the reflection board and the polarizing membrane (9).

For displaying a color image, a color filter layer is additionally provided. The color filter is preferably placed between the reflective electrode (2) and the lower orientation layer (3), or between the upper orientation layer (5) and the transparent electrode (6).

In place of the reflective electrode (2), a transparent electrode may be used in combination with a reflection board. The reflection board is preferably a metal board or a semi-transparent reflection board. If the reflection board has a smooth surface, rays parallel to the normal of the surface are often predominantly reflected to give a small viewing angle. Therefore, the surface of the reflection board may be made rugged (as described in Japanese Patent No. 276,620). Otherwise, a light-diffusing film may be provided on one surface (cell side or air side) of the polarizing membrane.

The liquid crystal cell is preferably TN (twisted nematic) mode, STN (supper twisted nematic) mode, or HAN (hybrid aligned nematic) mode.

The liquid crystal cell of TN mode has a twist angle preferably in the range of 40 to 100°, more preferably in the range of 50 to 90°, most preferably in the range of 60 to 80°. The product (Δn·d) of refractive anisotropy (Δn) and thickness (d) of the liquid crystal layer is preferably in the range of 0.1 to 0.5 µm, more preferably in the range of 0.2 to 0.4 µm.

The liquid crystal cell of STN mode has a twist angle preferably in the range of 180 to 360°, more preferably in the range of 220 to 2700. The product (Δn·d) of refractive anisotropy (Δn) and thickness (d) of the liquid crystal layer is preferably in the range of 0.3 to 1.2 µm, more preferably in the range of 0.5 to 1.0 µm.

In the liquid crystal cell of HAN mode, it is preferred that liquid crystal molecules be essentially vertically aligned on one substrate and that the pre-tilt angle on the other substrate be in the range of 0 to 45°. The product (Δn·d) of refractive anisotropy (Δn) and thickness (d) of the liquid crystal layer is preferably in the range of 0.1 to 1.0 µm, more preferably in the range of 0.3 to 0.8 µm. The substrate on which the liquid crystal molecules are vertically aligned may be on the transparent electrode side or on the opposite side.

The liquid crystal display of reflection type may be designed normally white mode (in which a bright or dark image is displayed when the applied voltage is low or high, respectively) or normally black mode (in which a dark or bright image is displayed when the applied voltage is low or high, respectively). The normally white mode is preferred.

(Guest-host Liquid Crystal Display of Reflection Type)

Figure 2:
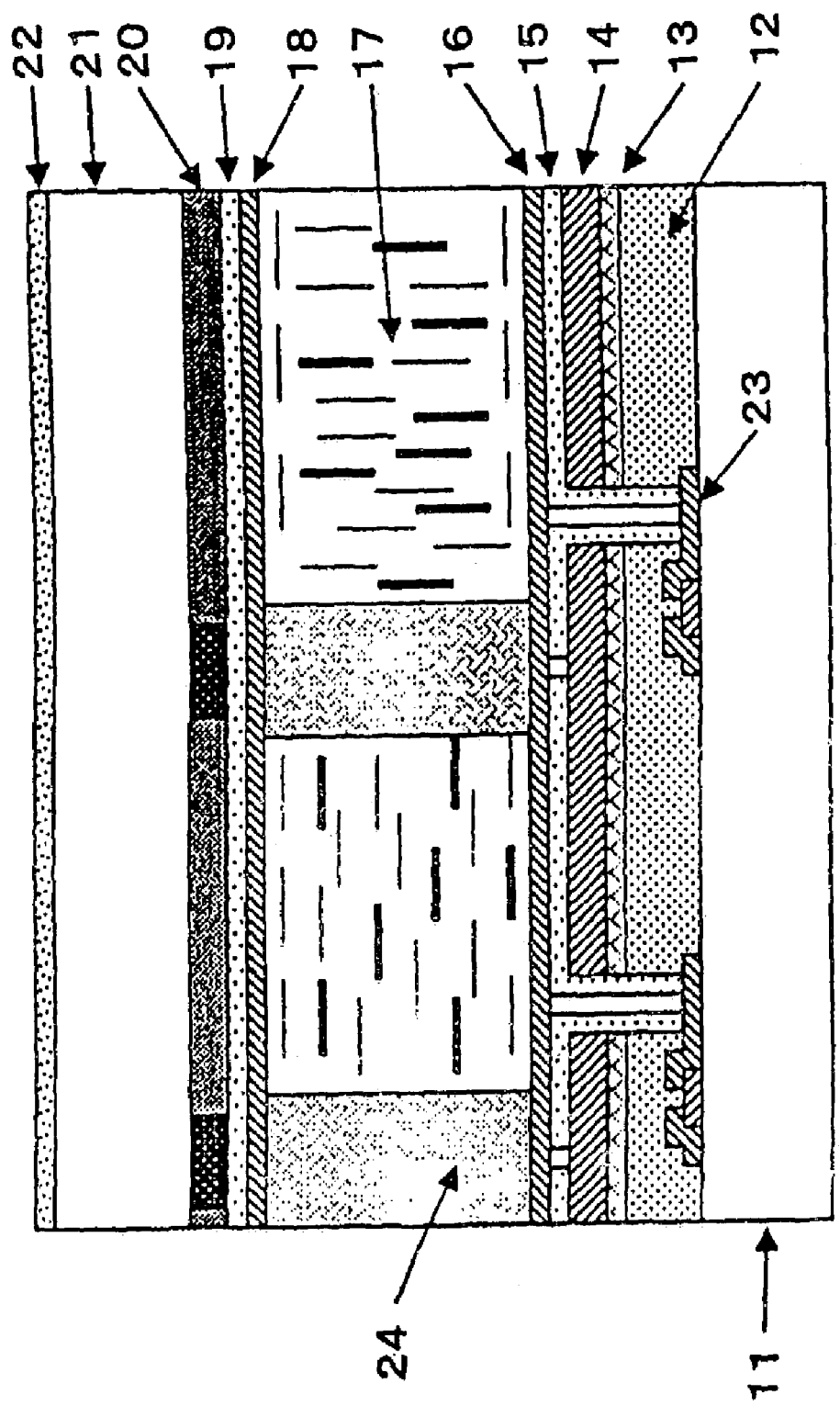
FIG. 2 is a sectional view illustrating a representative embodiment of the guest-host liquid crystal display of reflection type.

FIG. 2 is a sectional view illustrating a representative embodiment of the guest-host liquid crystal display of reflection type.

The display shown in FIG. 2 comprises a lower substrate (11), an organic insulating layer (12), a metal reflection board (13), a λ/4 plate (14), a lower transparent electrode (15), a lower orientation layer (16), a liquid crystal layer (17), an upper orientation layer (18), an upper transparent electrode (19), a light-diffusing layer (20), an upper substrate (21) and an anti-reflection layer (22), piled up in this order.

The lower substrate (11) and the upper substrate (21) are made of glass or plastics. A TFT (23) is provided between the lower substrate (11) and the organic insulating layer (12).

The liquid crystal layer (17) contains a mixture of liquid crystal and dichromatic dye. For forming the liquid crystal layer, the mixture is injected into the cell gap formed with spacers (24).

Instead of providing the light-diffusing layer (20), the metal reflection board (13) may be made rugged so that the board (13) can serve as the diffusing layer.

The anti-reflection layer (22) preferably has an ant-glare function as well as the anti-reflection function.

Figure 3:
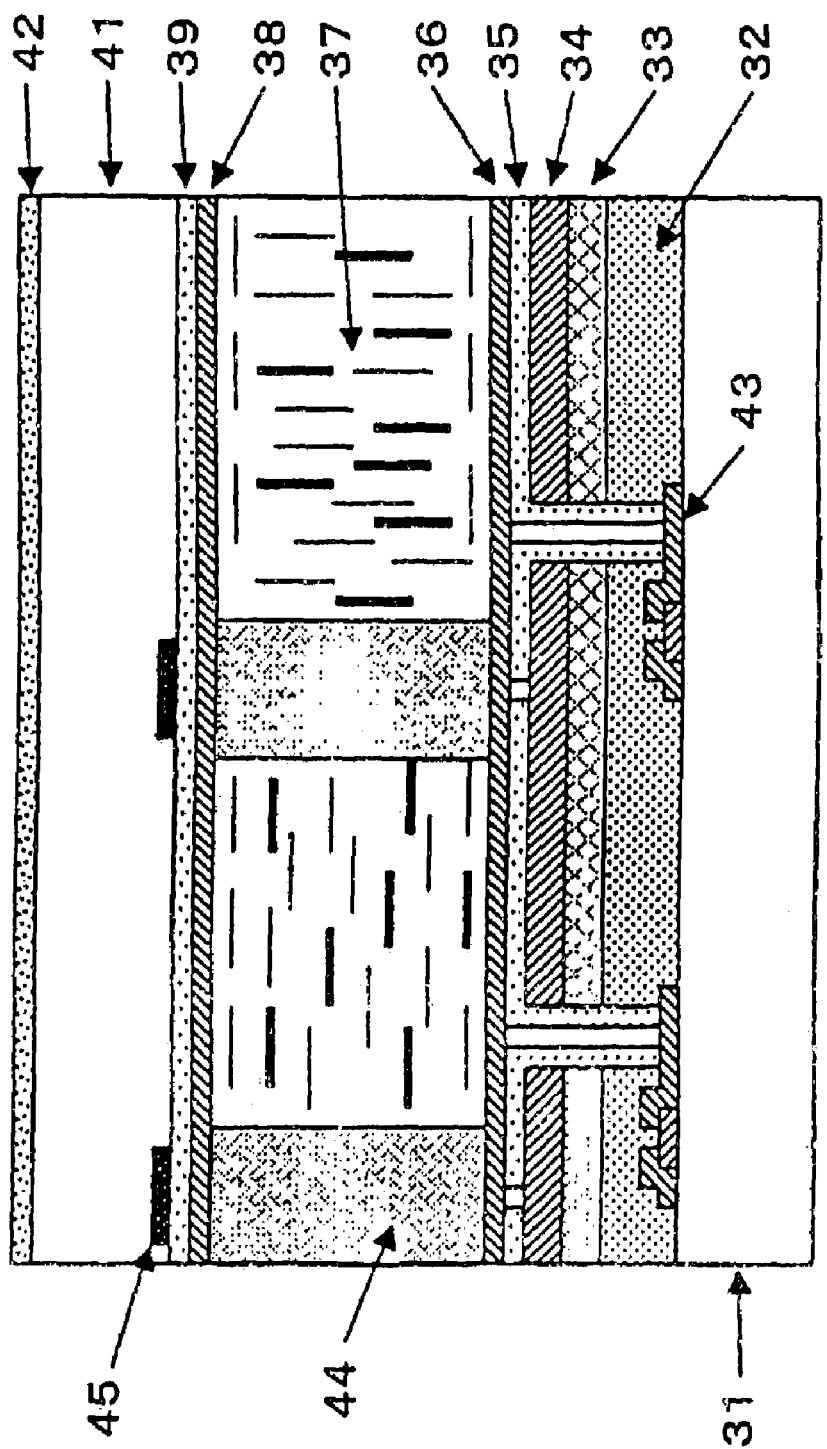
FIG. 3 is a sectional view illustrating another representative embodiment of the guest-host liquid crystal display of reflection type.

FIG. 3 is a sectional view illustrating another representative embodiment of the guest-host liquid crystal display of reflection type.

The display shown in FIG. 3 comprises a lower substrate (31), an organic insulating layer (32), a cholesteric color reflection board (33), a λ/4 plate (34), a lower transparent electrode (35), a lower orientation layer (36), a liquid crystal layer (37), an upper orientation layer (38), an upper transparent electrode (39), an upper substrate (41) and an anti-reflection layer (42), piled up in this order.

The lower substrate (31) and the upper substrate (41) are made of glass or plastics. A TFT (43) is provided between the lower substrate (31) and the organic insulating layer (32).

The λ/4 plate (34) may serve as the diffusing layer.

The liquid crystal layer (37) contains a mixture of liquid crystal and dichromatic dye. For forming the liquid crystal layer, the mixture is injected into the cell gap formed with spacers (44).

A black matrix is provided between the upper transparent electrode (39) and the upper substrate (41).

The anti-reflection layer (42) preferably has an ant-glare function as well as the anti-reflection function.

The λ/4 plate according to the invention can be used as the λ/4 plate (8) in the display of reflection type shown in FIG. 1, that (24) in the guest-host display of reflection type shown in FIG. 2, or that (34) in the guest-host display of reflection type shown in FIG. 3.

The guest-host liquid crystal display of reflection type equipped with the λ/4 plate is described in Japanese Patent Provisional Publication Nos. 6(1994)-222350, 8(1996)-36174, 10(1998)-268300, 10(1998)-292175, 10(1998)-293301, 10(1998)-311976, 10(1998)-319442, 10(1998)-325953, 10(1998)-333138 and 11(1999)-38410.

The λ/4 plate of the invention can be used in the guest-host liquid crystal displays of reflection type described in the above publications.

(Liquid Crystal Display of Bend Alignment Mode)

The optical compensatory sheet having the optically anisotropic layer of the invention is preferably used in a liquid crystal display of bend alignment mode. The display of bend alignment mode equipped with the compensatory sheet is described below in detail.

Figure 4:
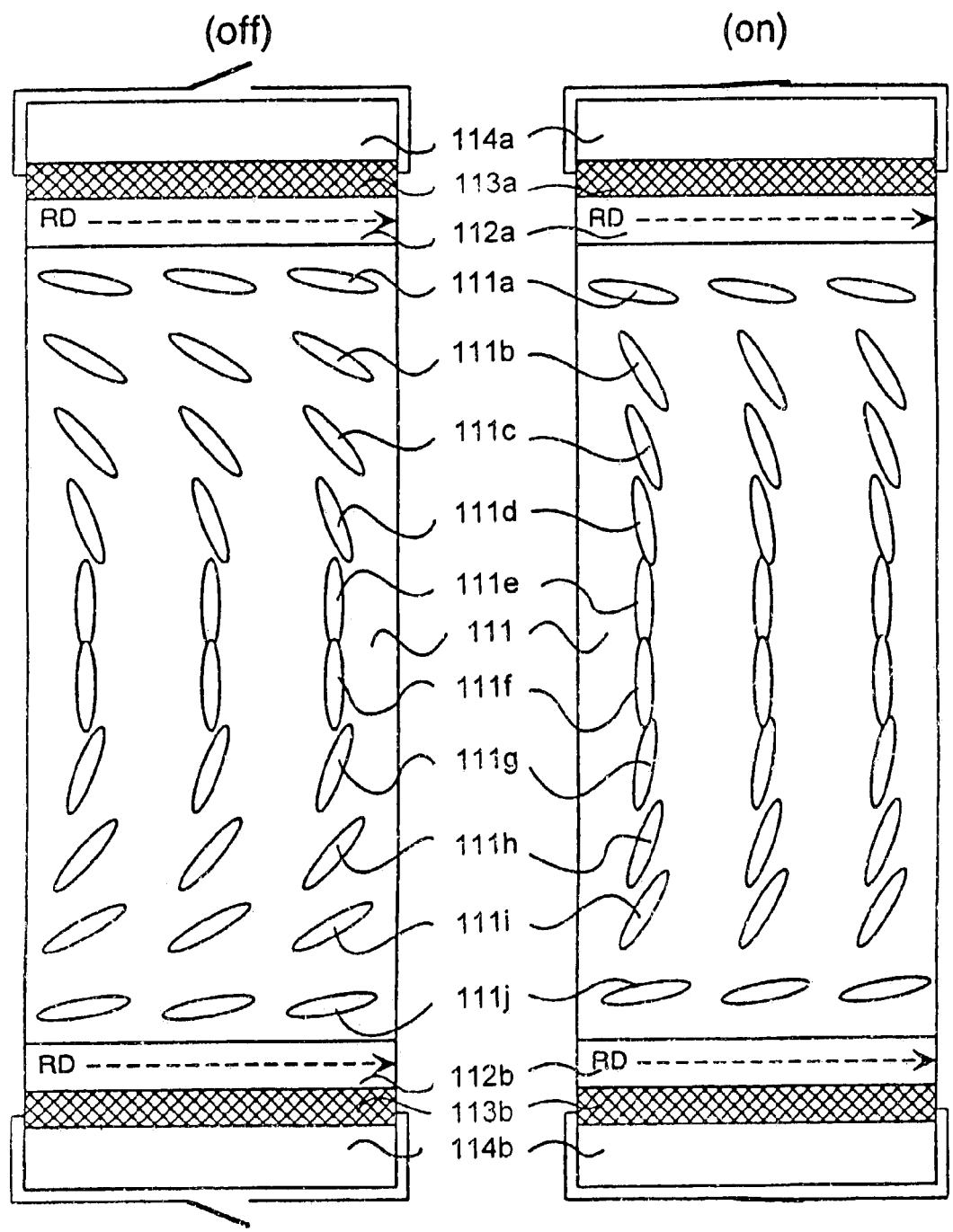
FIG. 4 is a sectional view schematically illustrating alignment of liquid crystal molecules in a liquid crystal cell of bend alignment mode.

FIG. 4 is a sectional view schematically illustrating alignment of liquid crystal molecules in a liquid crystal cell of bend alignment mode.

As shown in FIG. 4, the cell of bend alignment mode comprises an upper substrate (114a), a lower substrate (114b), and a liquid crystal compound (111) provided between them. The liquid crystal compound (111) used in the cell of bend alignment mode generally has a positive dielectric anisotropy. The upper and lower substrates (114a, 114b) have orientation layers (112a, 112b) and electrode layers (113a, 113b), respectively. The orientation layers align rod-like liquid crystal molecules (111a to 111j). The direction indicated by RD is the rubbing direction of orientation layer. The electrode layers have a function of applying a voltage to the rod-like liquid crystal molecules (111*a* to 111*j*).

FIG. 4 (off) shows the alignment of rod-like liquid crystal molecules when a low voltage is applied to the liquid crystal cell of bend alignment mode. In that cell, the rod-like liquid crystal molecules (111*a* to 111*e*) on the side of the upper substrate (114*a*) and those (111*f* to 111*j*) on the side of the lower substrate (114*b*) are aligned essentially in reverse (symmetrically). The molecules (111*a*, 111*b*, 111*i*, 111*j*) near the substrates (114*a*, 114*b*) are almost horizontally aligned, and those (111*d* to 111*g*) at the central part in the cell are almost vertically aligned.

FIG. 4 (on) shows the alignment of rod-like liquid crystal molecules when a high voltage is applied. In that cell, the molecules (111*a*, 111*j*) near the substrates (114*a*, 114*b*) are still almost horizontally aligned, and those (111*e*, 111*f*) at the central part are also. still almost vertically aligned. In contrast, the molecules (111*b*, 111*c*, 111*d*, 111*g*, 111*h*, 111*i*) in the area between the substrate and the center of the cell are raised as compared with those when a low voltage is applied (off-state). However, even in on-state, the molecules (111*a* to 111*e*) on the side of the upper substrate (114*a*) and those (111*f* to 111*j*) on the side of the lower substrate (114*b*) are still aligned essentially in reverse (symmetrically).

Figure 5:
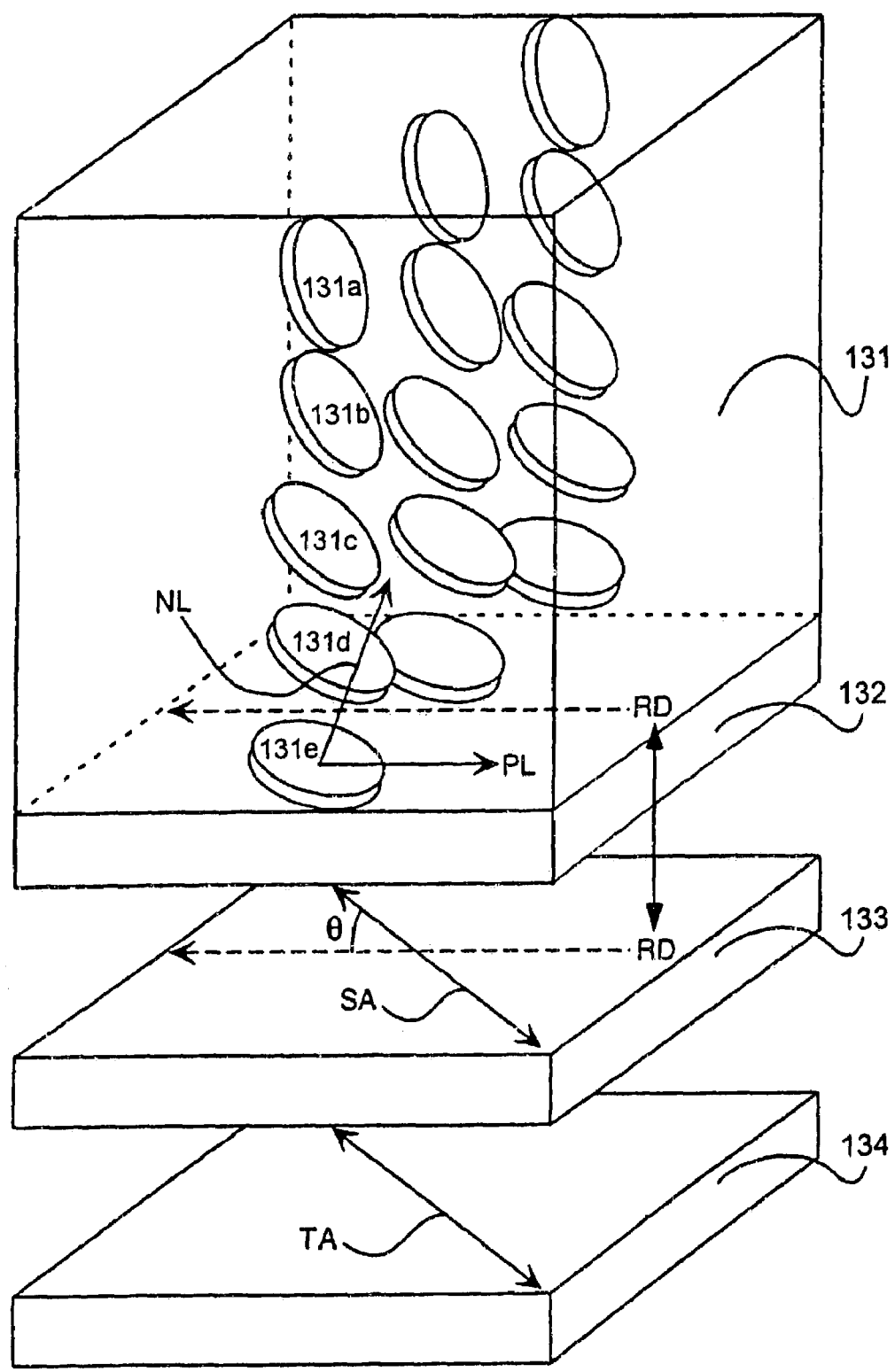
FIG. 5 schematically shows an elliptically polarizing plate according to the invention.

FIG. 5 schematically shows an elliptically polarizing plate according to the invention.

As shown in FIG. 5, an elliptically polarizing plate is a layered composition comprising a first optically anisotropic layer (131) containing discotic compound (131*a* to 131*e*), a second optically anisotropic layer (133) having at least one cellulose acetate film, and a polarizing membrane (134). The elliptically polarizing plate in FIG. 5 further comprises an orientation layer (132) between the first optically anisotropic layer (131) and the second optically anisotropic layer (133).

The discotic compound (131*a* to 131*e*) in the first optically anisotropic layer (131) is a planar molecule. Each molecule of the discotic compound has only one plane, namely a disc plane. The disc plane is inclined from the surface of the second optically anisotropic layer (133). The angle between the disc plane and the second optically anisotropic layer (the inclined angle) increases with increase of distance between the molecule and the orientation layer. The average inclined angle is preferably in the range of 15 to 50°. The elliptically polarizing plate (shown in FIG. 5) in which the molecules have varying inclined angles can remarkably improve the viewing angle. In addition, it can prevent the displayed image from tone inversion, tone fluctuation and undesired coloring.

The average direction (PL) obtained by projecting normal (NL) of the disc plane of the discotic molecule (131*a* to 131*e*) onto the second optically anisotropic layer (133) is anti-parallel to the rubbing direction (RD) of the orientation layer (132).

In the invention, the average direction (PL) obtained by projecting normal of the disc plane of the discotic molecule onto the transparent support is positioned essentially at the angle of 45° to the slow axis (SA) in the plane of the second optically anisotropic layer (133). In order to produce such elliptically polarizing plate, the rubbing direction (RD) of the orientation layer (132) is made to be essentially at the angle of 45° to the slow axis (SA) of the second optically anisotropic layer (133).

Further, in the invention, the transparent support and the polarizing membrane are placed so that the transmission axis (TA) in the plane of the polarizing membrane (134) may be essentially parallel or perpendicular to the slow axis (SA) in the plane of the second optically anisotropic layer (133). In the elliptically polarizing plate shown in FIG. 5, a transparent support is placed so that the SA may be parallel to the TA. In principle, the slow axis (SA) in the plane of the transparent support (133) corresponds to the stretching direction of the second optically anisotropic layer. Further, in principle, the transmission axis (TA) in the plane of the polarizing membrane (134) is perpendicular to the stretching direction of the polarizing membrane.

Figure 6:
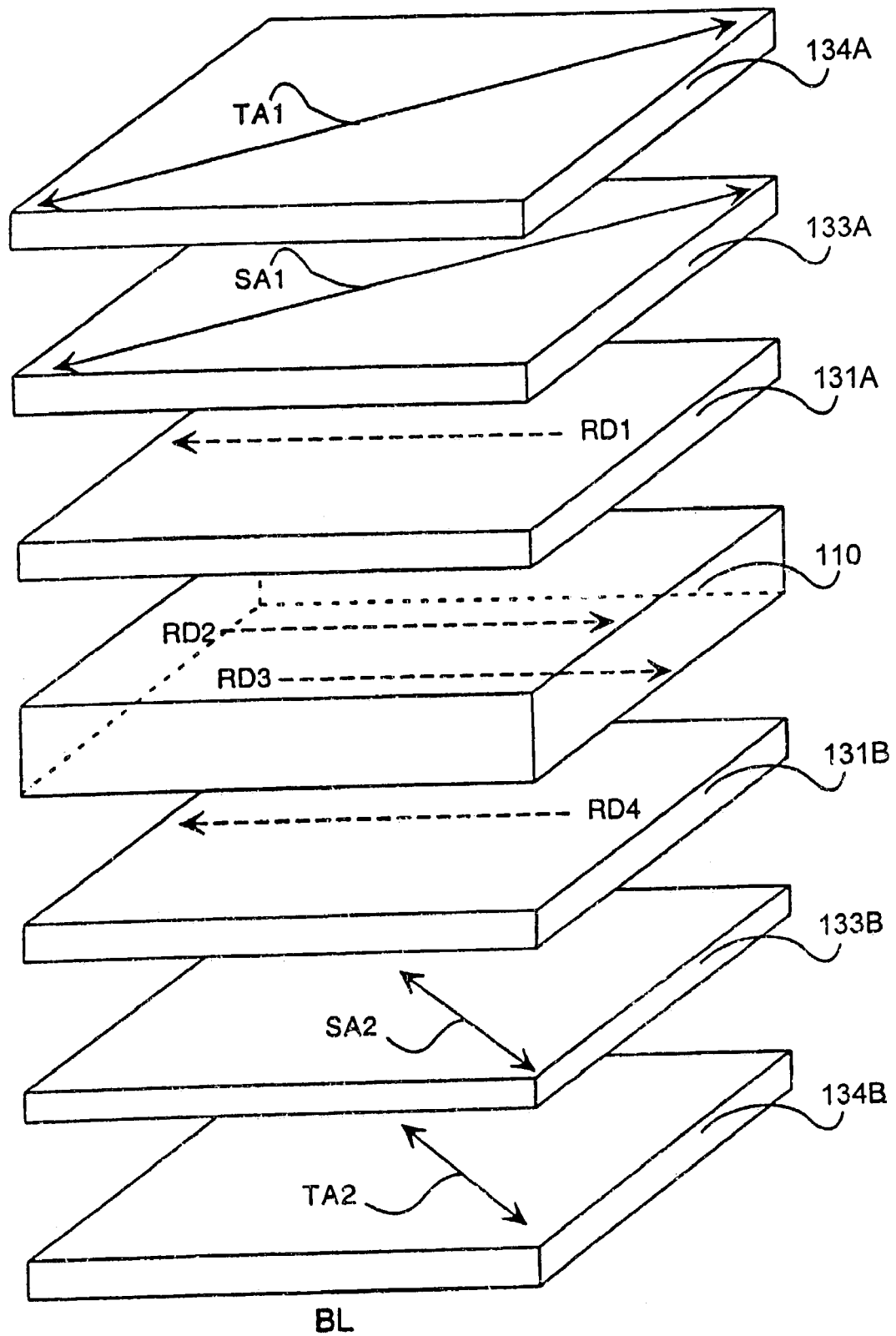
FIG. 6 schematically shows a liquid crystal display of bend alignment mode according to the invention.

FIG. 6 schematically shows a liquid crystal display of bend alignment mode according to the invention.

The liquid crystal display shown in FIG. 6 comprises a pair of elliptically polarizing plates (131A to 134A, and 131B to 134B), a liquid crystal cell of bend alignment mode (110) provided between the plates, and backlight (BL).

The cell of bend alignment mode (110) corresponds to the liquid crystal cell shown in FIG. 4. The directions (RD2, RD3) of rubbing treatment applied on the upper and lower substrates of the cell (110), respectively, are the same (parallel to each other).

Each elliptically polarizing plate consists of a first optically anisotropic layer (131A, 131B), a second optically anisotropic layer (133A, 133B) and a polarizing membrane (134A, 134B), piled up in this order from the liquid crystal cell (110) side. Each rubbing direction (RD1, RD4) for aligning the discotic compound in the first optically anisotropic layer (131A, 131B) is anti-parallel to the rubbing direction (RD2, RD3) of the cell substrate opposite to the layer. The rubbing direction (RD1, RD4) is also anti-parallel to the average direction obtained by projecting normal of the disc plane of the discotic compound onto the transparent support. The slow axis (SA1, SA2) in the plane of the second optically anisotropic layer (133A, 133B) and the transmission axis (TA1, TA2) in the plane of the polarizing membrane are essentially at the angle of 45° to the rubbing direction (RD1, RD4) in the same plane. The two polarizing membranes (134A, 134B) are placed so that the transmission axis (TA1, TA2) in the plane may be perpendicularly crossed (may be in cross-Nicol position).

Figure 7:
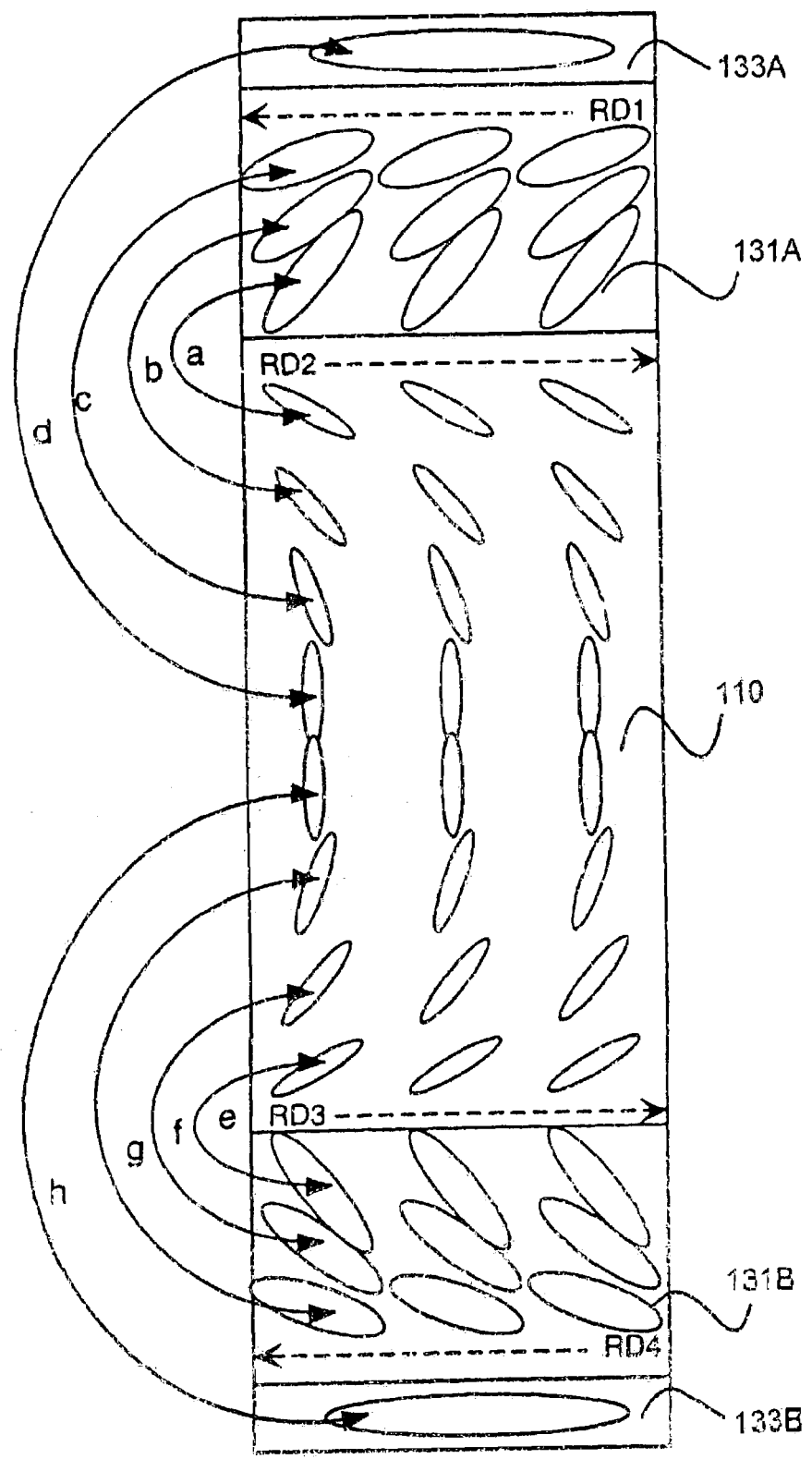
FIG. 7 schematically shows mechanism of optical compensation in a liquid crystal display of bend alignment mode.

FIG. 7 schematically shows mechanism of optical compensation in a liquid crystal display of bend alignment mode.

As shown in FIG. 7, in the liquid crystal display of the invention, the liquid crystal cell of bend alignment mode (110) is optically compensated with the optically anisotropic layers 1 (131A, 131B) and the optically anisotropic layers 2 (133A, 133B) in combination.

The rubbing direction (RD1, RD4) for aligning the discotic compound in the first optically anisotropic layer (131A, 131B) is anti-parallel to the rubbing direction (RD2, RD3) of the cell, and hence each discotic molecule in the optically anisotropic layers 1 (131A, 131B) can correspond to each liquid crystal molecule in the cell (110) of bend alignment mode. (The correspondences are schematically indicated by a to c, and e to g in FIG. 7.) The optically anisotropic layers 2 (133A, 133B) also correspond to the liquid crystal molecules essentially vertically aligned in the central area of the cell (110). (These correspondences are schematically indicated by d and h in FIG. 7.) In FIG. 7, the-ellipse in each second optically anisotropic layer (133A, 133B) represents a refractive ellipsoid derived from the optical anisotropy.

Figure 8:
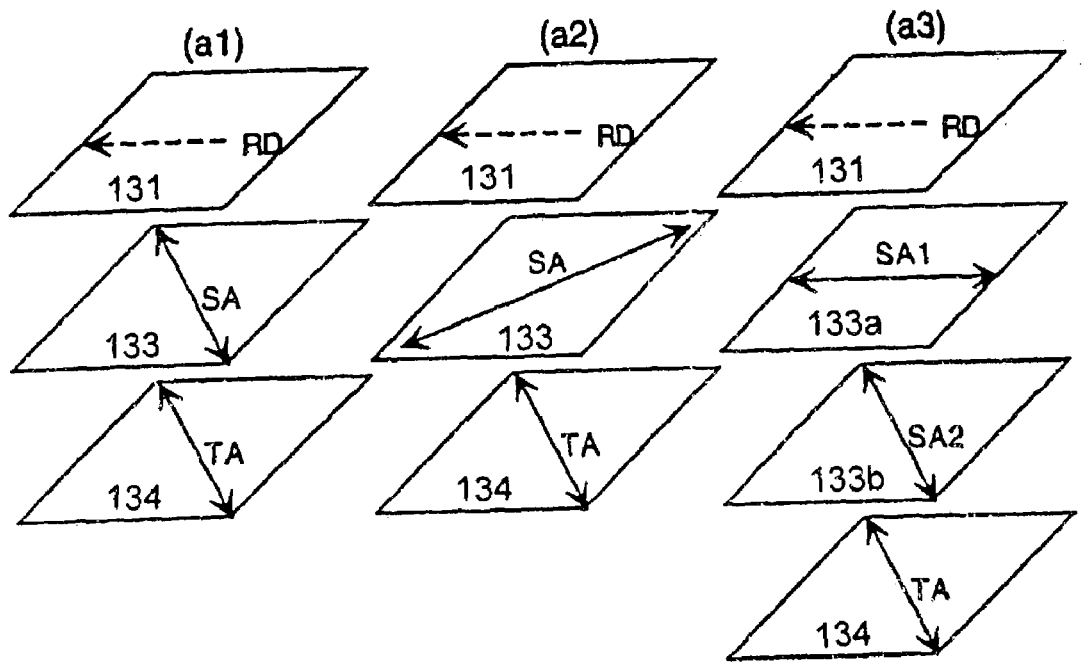
FIG. 8 schematically shows various embodiments of the elliptically polarizing plate.
Figure 8:
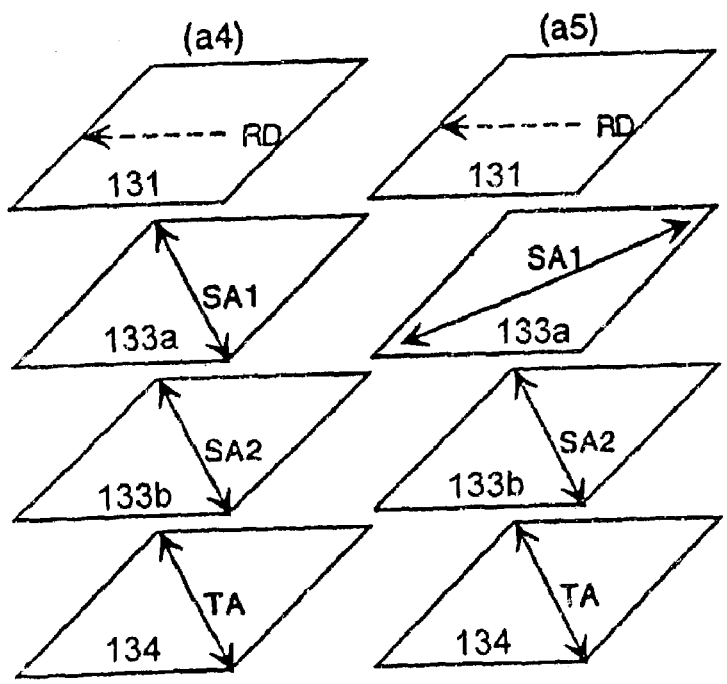

FIG. 8 schematically shows various embodiments of the elliptically polarizing plate.

FIG. 8(*a*1) shows the simplest elliptically polarizing plate shown in FIG. 5. The embodiment of FIG. 8(*a*1) comprises a first optically anisotropic layer (131), a second optically anisotropic layer (133) and a polarizing membrane (134), piled up in this order. The rubbing direction (RD) for aligning the discotic compound is essentially at the angle of 45° to the slow axis (SA) of the second optically anisotropic layer (133), and the slow axis (SA) of the second optically anisotropic layer (133) is essentially parallel to the transmission axis (TA) of the polarizing membrane (134).

The embodiment of FIG. 8(*a*2) also comprises a first optically anisotropic layer (131), a second optically anisotropic layer (133) and a polarizing membrane (134), piled up in this order. The rubbing direction (RD) for aligning the discotic compound is essentially at the angle of 45° to the slow axis (SA) of the second optically anisotropic layer (133), and the slow axis (SA) of the second optically anisotropic layer (133) is essentially perpendicular to the transmission axis (TA) of the polarizing membrane (134).

The embodiment of FIG. 8(*a*3) has a second optically anisotropic layer consisting of two sub-layers (133*a*, 133*b*). In that embodiment, at least one anisotropic sub-layer 2 (133*b*, in FIG. 8*a*3) is placed at the position satisfying the aforementioned condition. Namely, the rubbing direction (RD) for aligning the discotic compound is essentially at the angle of 45° to the slow axis (SA2) of the above optically anisotropic sub-layer 2 (133*b*), and that slow axis (SA2) is essentially parallel to the transmission axis (TA) of the polarizing membrane (134). The other anisotropic sub-layer 2 (133*a*) is, as a conventional one, placed so that the slow axis (SA1) may be essentially parallel to the rubbing direction (RD).

The embodiment of FIG. 8(*a*4) has a second optically anisotropic layer consisting of two sub-layers (133*a*, 133*b*) placed at the positions satisfying the aforementioned condition with the first optically anisotropic layer (131) and the polarizing membrane (134). Namely, the rubbing direction (RD) for aligning the discotic compound is essentially at the angle of 45° to each of the slow axes (SA1, SA2) of the optically anisotropic sub-layers 2 (133*a*, 133*b*), and each of the slow axes (SA1, SA2) is essentially parallel to the transmission axis (TA) of the polarizing membrane (134).

The embodiment of FIG. 8(*a*5) also has a second optically anisotropic layer consisting of two sub-layers (133*a*, 133*b*) placed at the positions satisfying the aforementioned condition with the first optically anisotropic layer (131) and the polarizing membrane (134). Namely, the rubbing direction (RD) for aligning the discotic compound is essentially at the angle of 45° to each of the slow axes (SA1, SA2) of the optically anisotropic sub-layers 2 (133*a*, 133*b*). The slow axis (SA1) of the optically anisotropic sub-layer 2 (133*a*) near the first optically anisotropic layer (131) is essentially perpendicular to the transmission axis (TA) of the polarizing membrane (134). The slow axis (SA2) of the optically anisotropic sub-layer 2 (133*b*) near the polarizing membrane (134) is essentially parallel to the transmission axis (TA) of the polarizing membrane (134).

Figure 9:
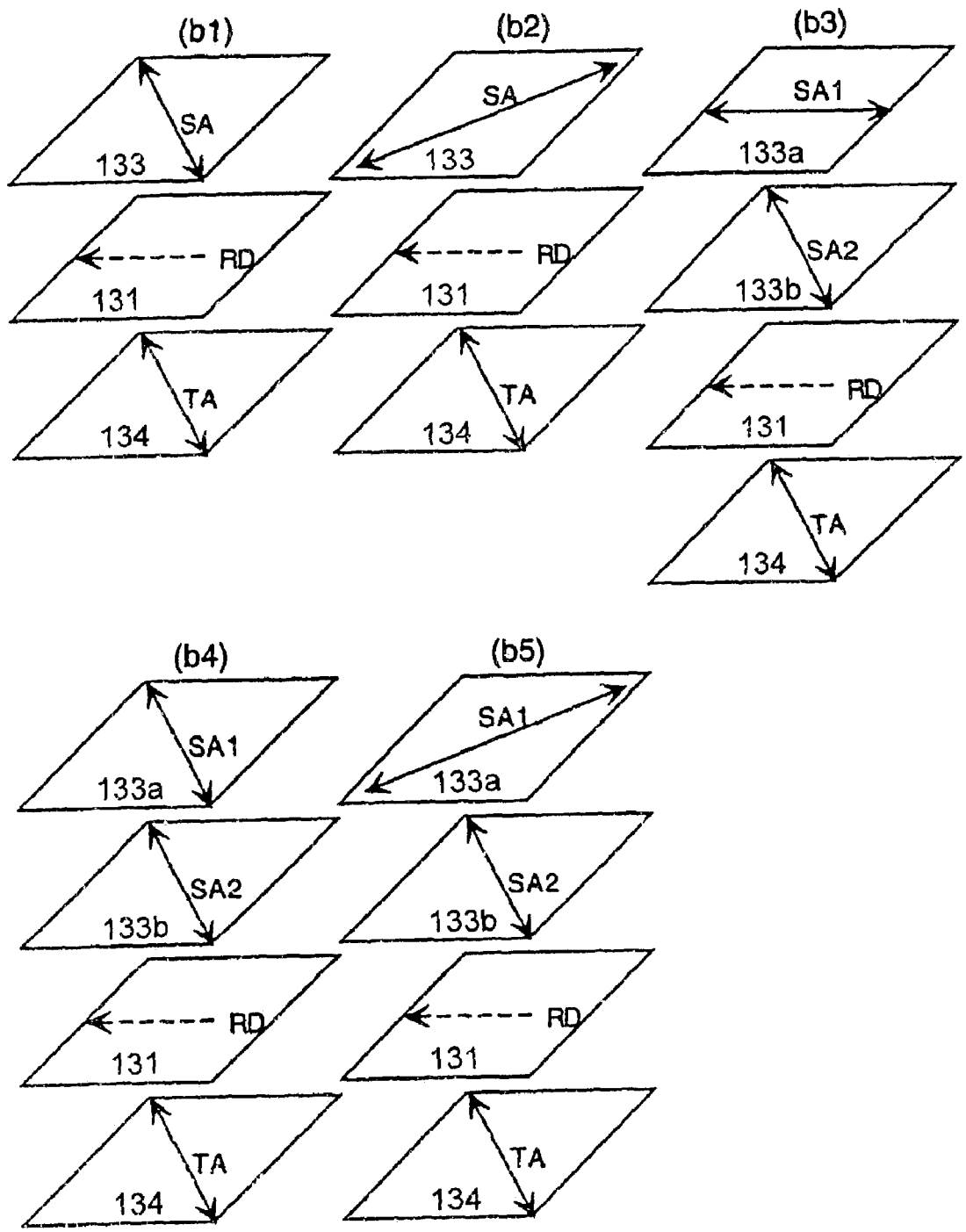
FIG. 9 schematically shows other embodiments of the elliptically polarizing plate.

FIG. 9 schematically shows various other embodiments of the elliptically polarizing plate.

The embodiment of FIG. 9(*b*1) comprises a second optically anisotropic layer (133), a first optically anisotropic layer (131) and a polarizing membrane (134), piled up in this order. The rubbing direction (RD) for aligning the discotic compound is essentially at the angle of 45° to the slow axis (SA) of the second optically anisotropic layer (133), and the slow axis (SA) of the second optically anisotropic layer (133) is essentially parallel to the transmission axis (TA) of the polarizing membrane (134).

The embodiment of FIG. 9(*b*2) also comprises a second optically anisotropic layer (133), a first optically anisotropic layer (131) and a polarizing membrane (134), piled up in this order. The rubbing direction (RD) for aligning the discotic compound is essentially at the angle of 45° to the slow axis (SA) of the second optically anisotropic layer (133), and the slow axis (SA) of the second optically anisotropic layer (133) is essentially perpendicular to the transmission axis (TA) of the polarizing membrane (134).

The embodiment of FIG. 9(*b*3) has a second optically anisotropic layer consisting of two sub-layers (133*a*, 133*b*). In that embodiment, at least one anisotropic sub-layer 2 (133*b*, in FIG. 9*b*3) is placed at the position satisfying the aforementioned condition with the first optically anisotropic layer (131) and the polarizing membrane (134). Namely, the rubbing direction (RD) for aligning the discotic compound is essentially at the angle of 45° to the slow axis (SA2) of the above optically anisotropic sub-layer 2 (133*b*), and that slow axis (SA2) is essentially parallel to the transmission axis (TA) of the polarizing membrane (134). The other anisotropic sub-layer 2 (133*a*) is, as a conventional one, placed so that the slow axis (SA1) may be essentially parallel to the rubbing direction (RD).

The embodiment of FIG. 9(*b*4) has a second optically anisotropic layer consisting of two sub-layers (133*a*, 133*b*) each of which is placed at the positions satisfying the aforementioned condition with the first optically anisotropic layer (131) and the polarizing membrane (134). Namely, the rubbing direction (RD) for aligning the discotic compound is essentially at the angle of 45° to each of the slow axes (SA1, SA2) of the optically anisotropic sub-layers 2 (133*a*, 133*b*), and each of the slow axes (SA1, SA2) is essentially parallel to the transmission axis (TA) of the polarizing membrane (134).

The embodiment of FIG. 9(*b*5) also has a second optically anisotropic layer consisting of two sub-layers (133*a*, 133*b*) both of which are placed at the positions where they totally satisfy the aforementioned condition with the first optically anisotropic layer (131) and the polarizing membrane (134). Namely, the rubbing direction (RD) for aligning the discotic compound is essentially at the angle of 45° to each of the slow axes (SA1, SA2) of the optically anisotropic sub-layers 2 (133*a*, 133*b*). The slow axis (SA1) of the optically anisotropic sub-layer 2 (133*a*) far-off from both of the first optically anisotropic layer (131) and the polarizing membrane (134) is essentially perpendicular to the transmission axis (TA) of the polarizing membrane (134). The slow axis (SA2) of the optically anisotropic sub-layer 2 (133*b*) near both of the first optically anisotropic layer (131) and the polarizing membrane (134) is essentially parallel to the transmission axis (TA) of the polarizing membrane (134).

The elliptically polarizing plate comprises a first optically anisotropic layer containing discotic molecules oriented in hybrid alignment, another second optically anisotropic layer having the optically anisotropic cellulose acetate film, and a polarizing membrane.

If the liquid crystal cell of OCB mode is used, the first optically anisotropic layer containing discotic compound preferably has no optical axis giving the retardation value of 0. Further, the direction giving the minimum absolute retardation value of the first optically anisotropic layer is preferably neither in the layer plane nor along the normal of the layer plane.

As the optical characters of the optically anisotropic layers 1 and 2, the Re retardation value defined by the following formula (9) and the Rth retardation value defined by the following formula (10a) or (10b) should be noticed.

$$Re = (nx - ny) \times d \quad (9)$$

$$Rth[\{(n2+n3)/2\} - n1] \times d \quad (10a)$$

$$Rth = [\{(nx+ny)/2\} - nz] \times d \quad (10b)$$

In the formulas, nx is a refractive index in the plane along the slow axis of the first or second optically anisotropic layer; ny is a refractive index in the plane along the traveling axis of the first and second optically anisotropic layer; n1 is the minimum principal value of refractive index of the first optically anisotropic layer; n2 and n3 are other principal values of refractive index of the first optically anisotropic layer; nz is a refractive index along the thickness direction of the second optically anisotropic layer; and d is a thickness of the first or second optically anisotropic layer.

The Re retardation value of the first optically anisotropic layer measured at 550 nm (Re550) is preferably in the range of 10 to 100 nm. The Rth retardation value of the first optically anisotropic layer measured at 550 nm (Rth550) is preferably in the range of 40 to 200 nm. The angle (β) between the normal of the film and the direction giving the minimum principal value of refractive index of the first optically anisotropic layer is preferably in the range of 20 to 50°.

The Rth retardation value of the second optically anisotropic layer measured at 550 nm (Rth550) is preferably in the range of 150 to 300 nm, more preferably in the range of 180 to 280 nm. A preferred Re retardation value of the second-optically anisotropic layer measured at 550 nm (Re550) depends upon the arrangement of the layer and the transmission axis of the polarizing membrane. If the slow axis in the plane of the second optically anisotropic layer is essentially perpendicular to the transmission axis, the Re550 of the second optically anisotropic layer is preferably in the range of 1 to 20 nm, more preferably in the range of 1 to 15 nm. If the slow axis of the second optically anisotropic layer is essentially parallel to the transmission axis, the Re550 is preferably in the range of 20 to 100 nm, more preferably in the range of 30 to 60 nm.

In the case where the plate has a second optically anisotropic layer consisting of two sub-layers, two cellulose acetate films may be used. Otherwise, liquid crystal molecules may be aligned on a cellulose acetate film.

The liquid crystal display of the invention has an optical compensatory function with small wavelength dependence. The term "small wavelength dependence" means that the difference between the Re retardation value of liquid crystal cell and the total Re retardation value of the two optically anisotropic layers 1 and 2 (total Re retardation value of all optically anisotropic layers 1 if two elliptically polarizing plates are used) is not larger than 10 nm in the wavelength region of 400 to 700 nm. The elliptically polarizing plate in which the optically anisotropic layers 1 and 2 and the polarizing membrane are arranged according to the invention can easily realize that condition.

In the first optically anisotropic layer, the molecules of discotic compound are preferably aligned so that the angle between the disc plane and the transparent support may be changed along the thickness (namely, the molecules are preferably oriented in hybrid alignment). The optical axis of the discotic molecule is parallel to the normal of the disc plane. The discotic compound has birefringence, and hence the refractive index in the disc plane is lager than that along the normal of the disc plane.

The first optically anisotropic layer is preferably formed through the steps of aligning the molecules of discotic compound with the orientation layer described below, and fixing the aligned molecules. The aligned discotic molecules are preferably polymerized to fix.

There is no direction giving the retardation value 0 of the first optically anisotropic layer. In other words, the minimum retardation value of the first optically anisotropic layer is more than 0.

The orientation layer has a function of giving an orientation direction of the discotic molecules in the first optically anisotropic layer. Preferred examples of the orientation layer include a layer of an organic compound (preferably polymer) subjected to rubbing treatment, an obliquely deposited layer of an inorganic compound, and a layer having micro grooves. Further, a built-up film formed according to Langmuir-Blodgett technique (LB technique) from ω-tricosanoic acid, dioctadecyldimethylammoniumchloride or methyl stearate can be used as the orientation layer. In addition, a layer prepared by orienting dielectric materials by application of electric field or magnetic field can be employed as the orientation layer.

The orientation layer is preferably made of a polymer subjected to rubbing treatment. As the polymer, polyvinyl alcohol is preferred. Particularly, denatured polyvinyl alcohol having hydrophobic groups is preferred. Since hydrophobic group has affinity with the discotic compound in the first optically anisotropic layer, the discotic compound can be uniformly aligned with the hydrophobic groups introduced into polyvinyl alcohol. The hydrophobic group is attached to the side chain or the end of the main chain of polyvinyl alcohol.

The hydrophobic group preferably is an aliphatic group (more preferably an alkyl group or an alkenyl group) having 6 or more carbon atoms or an aromatic group.

In the case where the hydrophobic group is attached to the end of the main chain, a linking group is preferably introduced between the hydrophobic group and the end of the main chain. Examples of the linking group include —S—, —C(CN)$R^1$—, —N$R^2$—, —CS— and combinations thereof. Each of $R^1$ and $R^2$ is hydrogen or an alkyl group having 1 to 6 carbon atoms (preferably is an alkyl group having 1 to 6 carbon atoms).

In the case where the hydrophobic group is attached to the side chain, the acetyl group (—CO—$CH_3$) of the vinyl acetate units in polyvinyl alcohol is partially replaced with an acyl group (—CO—$R^3$) having 7 or more carbon atoms. $R^3$ is an aliphatic group having 6 or more carbon atoms or an aromatic group. Commercially available denatured polyvinyl alcohols (e.g., MP103, MP203, R1130, Kuraray Co., Ltd.) can be used.

The (denatured) polyvinyl alcohol has a saponification degree preferably of 80% or more. The (denatured) polyvinyl alcohol has a polymerization degree preferably of 200 or more.

The rubbing treatment can be conducted by rubbing the layer with paper or cloth several times along a certain direction. Cloth on which fibers having the same length and thickness are provided is preferably used.

After the discotic molecules in the first optically anisotropic layer are aligned with the orientation layer, they can keep the alignment even if the orientation layer is removed. Therefore, the orientation layer is not essential in a prepared elliptically polarizing plate though it is essential in the preparation of the plate.

In the case where the orientation layer is provided between the optically anisotropic layers 1 and 2, an undercoating layer (an adhesive layer) is preferably provided between the orientation layer and the second optically anisotropic layer.

The second optically anisotropic layer comprises at least one cellulose acetate film. The thickness of the cellulose acetate film is preferably in the range of 10 to 70 μm. In the invention, the aimed optical characters are preferably realized with a single cellulose acetate film, two cellulose acetate films or a layered composition of cellulose acetate film and polymerizable liquid crystal compound. If the second optically anisotropic layer comprises two sub-layers (for example, two cellulose acetate films), an intermediate layer (e.g., adhesive layer) may be provided between them. In the second optically anisotropic layer consisting of two or more sub-layers, the sub-layers cooperatively realize the aimed optical characters.

The Re retardation value of the cellulose acetate film can be increased by stretching the film. On the other hand, the Rth retardation value can be increased by (1) adding a retardation increasing agent, (2) adjusting the average acetic acid content of the cellulose acetate, and (3) forming the film according to the cooling dissolution method.

The cellulose acetate film may be used as a support, and a polymerizable liquid crystal layer containing horizontally aligned liquid crystal molecules may be provided thereon.

As the polymerizable liquid crystal compound, rod-like or discotic liquid crystal compounds are preferred. In consideration of controlling the Rth retardation value, a discotic liquid crystal compound is preferred.

The elliptically polarizing plate can be continuously produced in the following manner.

First, an orientation layer is formed on a cellulose acetate film (second optically anisotropic layer) before-hand controlled to have desired Re and Rth retardation values. While the film is being conveyed in the direction parallel to the slow axis, the formed orientation layer is then rubbed (rubbing treatment) at the angle of 45° to the conveying direction (which correspond to the slow axis). Nest, a layer of discotic compound (first optically anisotropic layer) is formed on the orientation layer, and then the film is wound up. The cellulose acetate surface of the film is saponified, and laminated on a polarizing membrane with an adhesive. (On the other surface of the film, a saponified commercially available triacetyl cellulose film is laminated with an adhesive.)

In the case where the second optically anisotropic layer comprises two cellulose acetate films, the discotic compound is applied on one cellulose acetate film to form a first optically anisotropic layer in the above manner. A thin film is then laminated on the first optically anisotropic layer to protect the layer from scratching and dust, and then the layered film is wound up.

Independently, the other cellulose acetate film is saponified, and laminated on a polarizing membrane with an adhesive. (On the other surface of the film, a saponified commercially available triacetyl cellulose film is laminated with an adhesive.)

The layered film having the polarizing membrane and the wounded layered film having the thin film are then laminated so that the cellulose acetate surface of each layered film may be in contact.

In the case where the second optically anisotropic layer comprises a cellulose acetate film and a polymerizable liquid crystal, the discotic compound is applied on a cellulose acetate film to form a first optically anisotropic layer in the above manner. A thin film is then laminated on the first optically anisotropic layer to protect the layer from scratching and dust, and then the layered film is wound up.

Independently, an orientation film made of cellulose acetate is prepared. A layer containing horizontally aligned discotic molecules is formed on the orientation film, and the film is then saponified. The film is laminated on a polarizing membrane with an adhesive. (On the other surface of the film, a saponified commercially available triacetyl cellulose film is laminated with an adhesive.)

The film having the polarizing membrane and the wounded layered film having the thin film are then laminated so that the cellulose acetate surface of each layered film may be in contact.

The elliptically polarizing plate of the invention is advantageously combined with a liquid crystal cell of bend alignment mode or horizontal alignment mode, to prepare a liquid crystal display.

In the liquid crystal cell of bend alignment mode, liquid crystal molecules in the central area of the cell may be oriented in twisted alignment.

For ensuring both brightness and a wide viewing angle, the liquid crystal cell of bend alignment mode has a product (Δn·d) of refractive anisotropy (Δn) and thickness (d) of the cell preferably in the range of 100 to 2,000 nm, more preferably in the range of 150 to 17,000 nm, most preferably in the range of 500 to 15,000 nm.

For ensuring both brightness and a wide viewing angle, the liquid crystal cell of bend alignment mode has a product (Δn·d) of refractive anisotropy (Δn) and thickness (d) of the cell preferably in the range of 100 to 2,000 nm, more preferably in the range of 150 to 1,700 nm, most preferably in the range of 500 to 1,500 nm.

EXAMPLE 1

The following components were placed in a mixing tank, heated and stirred to dissolve, to prepare a cellulose acetate solution.

| Cellulose acetate solution | |
|---|---|
| Cellulose acetate (acetic acid content: 60.9%) | 100 weight parts |
| Triphenyl phosphate (plasticizer) | 7.8 weight parts |
| Biphenyldiphenyl phosphate (plasticizer) | 3.9 weight parts |
| Methylene chloride (first solvent) | 300 weight parts |
| Methanol (second solvent) | 54 weight parts |
| 1-Butanol (third solvent) | 11 weight parts |

In another mixing tank, 16 weight parts of the following retardation increasing agent, 80 weight parts of methylene chloride and 20 weight parts of methanol were placed, heated and stirred, to prepare a retardation increasing agent solution.

The cellulose acetate solution (474 weight parts) and the retardation increasing agent solution (25 weight parts) were mixed and stirred well to prepare a dope. The prepared dope contained the retardation increasing agent in the amount of 5.5 weight parts based on 100 weight parts of cellulose acetate.

(Retardation Increasing Agent)

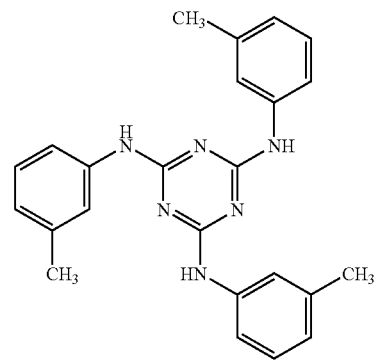

The dope was cast on a band to form a film in which the solvent remained in the amount of 15 wt. %. The film was laterally stretched by 25% at 130° C. by means of a tenter. Thus, a cellulose acetate film (optical compensatory sheet: KH-01) was prepared.

The Re and Rth retardation values of the prepared cellulose acetate film were measured at 550 nm by means of an ellipsometer [M-150, JASCO], to obtain the values of Re550 and Rth550. The results are set forth in Table 1.

The thickness of the prepared film was measured at 100 points in an area of 1 m×1 m by means of a digital film thickness gauge (K-402B, Anristu Co., Ltd.), and thereby it was found that the average thickness was 52.0 μm and that the standard deviation was 1.5 μm.

EXAMPLE 2

The procedure of Example 1 was repeated except that 474 weight parts of the cellulose acetate solution and 56 weight parts of the retardation increasing agent solution were mixed (7.8 weight parts of the retardation increasing agent was used based on 100 weight parts of cellulose acetate) to prepare a dope, and except that the formed film was laterally stretched by 12%. Thus, a cellulose acetate film (optical compensatory sheet: KH-02) was prepared and evaluated. The results are set forth in Table 1.

The obtained film was immersed in a 1.5 N aqueous KOH solution for 5 minutes (40° C.), neutralized with sulfuric acid, washed with pure water, and dried. The surface energy of the thus-treated film was measured according to the contact angle method, to find 68 mN/m.

The thickness of the prepared film was measured at 100 points in an area of 1 m×1 m by means of a digital film thickness gauge (K-402B, Anristu Co., Ltd.), and thereby it was found that the average thickness was 40.0 μm and that the standard deviation was 1.8 μm.

On the cellulose acetate film, a coating solution of the following composition was then applied in the amount of 28 ml/m² by means of a wire bar coater of #16. The applied solution was dried with hot air at 60° C. for 60 seconds, and then further dried with hot air at 90° C. for 150 seconds.

| Coating solution for orientation film | |
|---|---|
| The following denatured polyvinyl alcohol | 10 weight parts |
| Water | 371 weight parts |
| Methanol | 119 weight parts |
| Glutaric aldehyde (crosslinking agent) | 0.5 weight part |

(Denatured polyvinyl alcohol)

The formed orientation layer was subjected to the rubbing treatment in which the rubbing direction was at the angle of 45° to the slow axis (measured at 632.8 nm) of the cellulose acetate film.

(Formation of Optically Anisotropic Layer)

To prepare a coating solution, 41.01 g of the following discotic (liquid crystal) compound, 4.06 g of trimethylolpropane triacrylate denatured with ethylene oxide (V#360, Osaka Organic Chemicals Co., Ltd.), 0.90 g of cellulose acetate butyrate (CAB-551-0.2, Eastman Chemical), 0.23 g of cellulose acetate butyrate (CAB-531-1, Eastman Chemical), 1.35 g of a photopolymerization initiator (Irgacure 907, Ciba-Geigy) and 0.45 g of a sensitizer (Kayacure DETX, Nippon Kayaku Co., Ltd.) were dissolved in 102 g of methyl ethyl ketone. The coating solution was then applied on the orientation film by means of a wire bar coater of #3. The thus-treated film was fixed on a metal frame, and maintained in a thermostat at 130° C. for 2 minutes to align the molecules of the discotic compound. The film was then irradiated at 130° C. for 1 minute with ultraviolet rays emitted from a high pressure mercury lamp of 120 W/cm, to polymerize the discotic compound. The film was cooled to room temperature. Thus, an optical compensatory sheet (KH-12) having an optically anisotropic layer was formed.

The Re retardation value was measured at 550 nm, and found 38 nm. The average angle (inclined angle) between the disc plane and the cellulose acetate film was 40°.

(Discotic Liquid Crystal Compound)

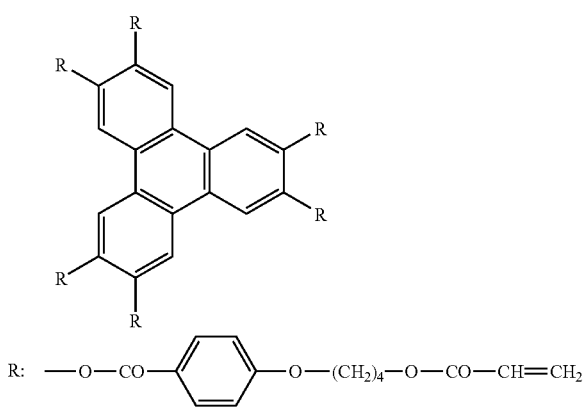

EXAMPLE 3

The procedure of Example 1 was repeated except that 6.0 weight parts of the retardation increasing agent was used based on 100 weight parts of cellulose acetate to prepare a dope, and except that the formed film was laterally stretched by 30%. Thus, a cellulose acetate film (optical compensatory sheet: KH-03) was prepared and evaluated. The results are set forth in Table 1.

The obtained film was immersed in a 2.0 N aqueous KOH solution for 2 minutes (25° C.), neutralized with sulfuric acid, washed with pure water, and dried. The surface energy of the thus-treated film was measured according to the contact angle method, to find 63 mN/m.

The thickness of the prepared film was measured at 100 points in an area of 1 m×1 m by means of a digital film thickness gauge (K-402B, Anristu Co., Ltd.), and thereby it was found that the average thickness was 38.5 μm and that the standard deviation was 1.4 μm.

COMPARATIVE EXAMPLE 1

The procedure of Example 1 was repeated except that the cellulose acetate solution was directly used as a dope and that the film was not stretched, to form and evaluate a cellulose acetate film (optical compensatory sheet: KH-H1). The results are set forth in Table 1.

The thickness of the prepared film was measured at 100 points in an area of 1 m×1 m by means of a digital film thickness gauge (K-402B, Anristu Co., Ltd.), and thereby it was found that the average thickness was 80.5 μm and that the standard deviation was 1.7 μm.

TABLE 1

| | Film | Retardation increasing agent | Stretching ratio | Re550 | Rth550 |
|---|---|---|---|---|---|
| Example 1 | KH-01 | 5.5 weight parts | 25% | 40 nm | 130 nm |
| Example 2 | KH-02 | 7.8 weight parts | 12% | 20 nm | 110 nm |
| Example 3 | KH-03 | 6.0 weight parts | 30% | 50 nm | 130 nm |
| Comp. Ex. 1 | KH-H1 | — | — | 4 nm | 48 nm |

EXAMPLE 4

Iodine was adsorbed on a stretched polyvinyl alcohol film to prepare a polarizing membrane. The optical compensatory sheet (KH-01) prepared in Example 1 was then laminated on one surface of the polarizing membrane with a polyvinyl alcohol adhesive.

On the other surface of the membrane, a commercially available cellulose triacetate film [Fujitac TD80UF, Fuji Photo Film Co., Ltd.] was saponified and laminated with a polyvinyl alcohol adhesive.

The transmission axis of the polarizing membrane was placed parallel to the slow axis of the optical compensatory sheet (KH-01) prepared in Example 1, and perpendicular to the slow axis of the commercially available cellulose triacetate film. Thus, a polarizing plate was prepared.

EXAMPLE 5

Iodine was adsorbed on a stretched polyvinyl alcohol film to prepare a polarizing membrane. The optical compensatory sheet (KH-02) prepared in Example 2 was then laminated on one surface of the polarizing membrane with a polyvinyl alcohol adhesive so that the slow axis of the sheet might be parallel to the transmission axis of the membrane.

On the other surface of the membrane, a commercially available cellulose triacetate film [Fujitac TD80UF, Fuji Photo Film Co., Ltd.] was saponified and laminated with a polyvinyl alcohol adhesive.

Further, the optical compensatory sheet (KH-12) prepared in Example 2 was laminated on the KH-02 side with an adhesive so that the slow axis of KH-12 might be parallel to that of KH-02. Thus, a polarizing plate was prepared.

EXAMPLE 6

The procedure of Example 4 was repeated except that the optical compensatory sheet (KH-03) prepared in Example 3 was used, to prepare a polarizing plate.

EXAMPLE 7

A pair of polarizing plates and a pair of optical compensatory sheets were removed from a commercially available liquid crystal display (VL-1530S, Fujitsu, Ltd.), which has a liquid crystal cell comprising vertically aligned liquid crystal molecules. In place of the removed members, the polarizing plate prepared in Example 4 was laminated on the observer side of the cell with an adhesive so that the KH-01 (optical compensatory sheet prepared in Example 1) might be on the liquid crystal cell side. On the other side (backlight side) of the cell, a commercially available polarizing plate (HLC2-5618HCS, Sunritz Co., Ltd.) was laminated. The polarizing plate on the observer side was placed so that the transmission axis might be in the up-down direction, while the plate on the backlight side was placed so that the transmission axis might be in the left-right direction. Thus, the polarizing plates were arranged in cross-Nicol position.

The viewing angle of the prepared liquid crystal display was measured by means of a measuring apparatus (EZ-Contrast 160D, ELDIM) when each of eight tones of black (L1) to white (L8) was displayed. The results are set forth in Table 2.

COMPARATIVE EXAMPLE 2

The viewing angle of the commercially available liquid crystal display (VL-1530S, Fujitsu, Ltd.), which has a liquid crystal cell comprising vertically aligned liquid crystal molecules, was measured by means of a measuring apparatus (EZ-Contrast 160D, ELDIM) when each of eight tones of black (L1) to white (L8) was displayed. The results are set forth in Table 2.

TABLE 2

| Liquid crystal display | Viewing angle* | |
|---|---|---|
| | along the transmission axis | at 45° to the transmission axis |
| Example 7 | >80° | >80° |
| Comp. Ex. 2 | >80° | 44° |

Remarks:
*Viewing angle:
Angle range giving a contrast ratio of 10 or more without reversing black tones (between L1 and L2).

(Evaluation of Increase of Transmittance at the Peripheral Part of the Screen)

A pair of polarizing plates were removed from a commercially available liquid crystal display of 15 inches type (VL-1530S, Fujitsu, Ltd.), which has a liquid crystal cell comprising vertically aligned liquid crystal molecules. In place of the removed members, the polarizing plate prepared in Example 4 was laminated on each side (each of the backlight side and the observer side) of the cell with an adhesive so that the optical compensatory sheet might be on the liquid crystal cell side. The polarizing plates were placed so that the transmission axis of the plate on the observer side might be perpendicular to that on the backlight side.

The backlight of the prepared display had been kept on for 5 hours under the conditions of 25° C. and 60% RH. After that, while a black image was displayed on the whole screen, it was observed with the eyes in a dark room whether light leaked or not. As a result, it was confirmed that the display of 15 inches type equipped with the polarizing plate of Example 4 did not leak light at the peripheral part of the screen.

EXAMPLE 8

(Preparation of Liquid Crystal Cell of Bend Alignment Mode)

On a glass plate having an ITO electrode, an orientation film of polyimide was provided and subjected to a rubbing treatment. This procedure was repeated to prepare two substrates, and the substrates were arranged face-to-face so that the rubbing directions might be parallel and that the cell gap might be 6 μm. Between them, a liquid crystal having An of 0.1396 (ZLI1132, Merck & Co., Inc.) was introduced to prepare a liquid crystal cell of bend alignment.

Two elliptically polarizing plates prepared in Example 5 were laminated on the liquid crystal cell so that the cell might be between the plates. The plates were arranged so that the optically anisotropic layer in each plate might face to the cell substrate and that the rubbing directions of the cell and the optically anisotropic layer might be ant-parallel.

Voltage of a square wave (55 Hz) was applied to the liquid crystal cell. An image was displayed according to normally white mode (white: 2V, black: 5V). A ratio of the transmittance (white/black) was measured as a contrast ratio by means of a meter (EZ-Contrast 160D, ELDIM) at eight displaying states of L1 (full black) to L8 (full white). From the obtained contrast ratio, the viewing angle of the prepared liquid crystal display was measured. The results are set forth in Table 3.

TABLE 3

| LCD | Viewing angle* | | |
|---|---|---|---|
| | Upward | Downward | Left-rightward |
| Example 8 | 80° | 80° | 80° |

Remark:
*Viewing angle:
Angle range giving a contrast ratio of 10 or more without reversing black tones (between L1 and L2).

(Evaluation of Increase of Transmittance at the Peripheral Part of the Screen)

A 17 inches type liquid crystal cell of bend alignment mode equipped with two polarizing plates of Example 5 was prepared in the above manner.

A backlight was attached on the prepared cell, and had been kept on for 5 hours under the conditions of 25° C. and 60% RH. After that, while a black image was displayed on the whole screen, it was observed with the eyes in a dark room whether light leaked or not. As a result, it was confirmed that the cell equipped with the polarizing plates of Example 5 did not leak light at the peripheral part of the screen.

EXAMPLE 9

A pair of polarizing plates were removed from a commercially available liquid crystal display (6E-A3, Sharp Corporation), which had a liquid crystal cell of TN mode. In place of the removed members, the polarizing plate prepared in Example 6 was laminated on each side (each of the backlight side and the observer side) of the cell with an adhesive so that the KH-03 (optical compensatory sheet prepared in Example 3) might be on the liquid crystal cell side. The polarizing plates were arranged so that the transmission axes might be in O-mode position (be perpendicularly crossed).

The viewing angle of the prepared liquid crystal display was measured by means of a measuring apparatus (EZ-Contrast 160D, ELDIM) when each of eight tones of black (L1) to white (L8) was displayed. The results are set forth in Table 4.

COMPARATIVE EXAMPLE 3

The viewing angle of the commercially available liquid crystal display (6E-A3, Sharp Corporation), which has a liquid crystal cell of TN mode, was measured by means of a measuring apparatus (EZ-Contrast 160D, ELDIM) when each of eight tones of black (L1) to white (L8) was displayed. The results are set forth in Table 4.

TABLE 4

| LCD | Viewing angle* | | |
|---|---|---|---|
| | Upward | Downward | Left-rightward |
| Example 9 | 18° | 23° | 77° |
| Comp. Ex. 3 | 15° | 25° | 37° |

Remark:
*Viewing angle:
Angle range giving a contrast ratio of 10 or more without reversing black tones (between L1 and L2).

(Evaluation of Increase of Transmittance at the Peripheral Part of the Screen)

A pair of polarizing plates were removed from a commercially available liquid crystal display of 20 inches type (LC-20V1, Sharp Corporation), which had a liquid crystal cell of TN mode. In place of the removed members, the polarizing plate prepared in Example 6 was laminated on each side (each of the backlight side and the observer side) of the cell with an adhesive so that the optical compensatory sheet might be on the liquid crystal cell side. The polarizing plates were placed so that the transmission axis of the plate on the observer side might be perpendicular to that on the backlight side.

The backlight of the prepared display had been kept on for 5 hours under the conditions of 25° C. and 60% RH. After that, while a black image was displayed on the whole screen, it was observed with the eyes in a dark room whether light leaked or not. As a result, it was confirmed that the display of 20 inches type equipped with the polarizing plate of Example 6 did not leak light at the peripheral part of the screen.

EXAMPLE 10

The following components were placed in a mixing tank, heated and stirred to dissolve, to prepare a cellulose acetate solution.

| Cellulose acetate solution | |
|---|---|
| Cellulose acetate (acetic acid content: 60.9%) | 100 weight parts |
| Triphenyl phosphate (plasticizer) | 7.8 weight parts |
| Biphenyldiphenyl phosphate (plasticizer) | 3.9 weight parts |
| Methylene chloride (first solvent) | 300 weight parts |
| Methanol (second solvent) | 54 weight parts |
| 1-Butanol (third solvent) | 11 weight parts |

In another mixing tank, 16 weight parts of the retardation increasing agent used in Example 1, 80 weight parts of methylene chloride and 20 weight parts of methanol were placed, heated and stirred, to prepare a retardation increasing agent solution.

The cellulose acetate solution (468 weight parts) and the retardation increasing agent solution (32 weight parts) were mixed and stirred well to prepare a dope. The prepared dope contained the retardation increasing agent in the amount of 4.5 weight parts based on 100 weight parts of cellulose acetate.

The prepared dope was cast on a band by means of a band casting machine. When the temperature of the dope on the band reached 40° C., the formed film was dried for 1 minute. After peeled from the band, the film was uniaxially (laterally) stretched by 35% with a tenter while exposed to drying air at 130° C. The film was then uniaxially (longitudinally) stretched by 10% in the conveying direction while exposed to drying air at 140° C. The thus stretched film was further dried with air at 130° C. for about 15 minutes, to prepare a cellulose acetate film (thickness: 50 μm) in which the solvent remained in the amount of 0.3 wt. %.

The Re and Rth retardation values of the prepared cellulose acetate film (KH-04) were measured at 550 nm by means of an ellipsometer [M-150, JASCO], to obtain the values of Re550 and Rth550. The results are set forth in Table 5.

EXAMPLE 11

The dope prepared in Example 10 was cast on a band by means of a band casting machine. When the temperature of the dope on the band reached 40° C., the formed film was dried for 1 minute. After peeled from the band, the film was uniaxially (laterally) stretched by 20% with a tenter while exposed to drying air at 130° C. The film was then uniaxially (longitudinally) stretched by 8% in the conveying direction while exposed to drying air at 140° C. The thus stretched film was further dried with air at 130° C. for about 15 minutes, to prepare a cellulose acetate film (thickness: 58 μm) in which the solvent remained in the amount of 0.3 wt. %.

The Re and Rth retardation values of the prepared cellulose acetate film (KH-05) were measured at 550 nm by means of an ellipsometer [M-150, JASCO], to obtain the values of Re550 and Rth550. The results are set forth in Table 5.

The obtained film was immersed in a 2.0 N aqueous KOH solution for 2 minutes (25° C.), neutralized with sulfuric acid, washed with pure water, and dried. The surface energy of the thus-saponified film was measured according to the contact angle method, to find 63 mN/m.

On the cellulose acetate film, the coating solution used in Example 2 was then applied in the amount of 28 ml/m$^2$ by means of a wire bar coater of #16. The applied solution was dried with hot air at 60° C. for 60 seconds, and then further dried with hot air at 90° C. for 150 seconds.

The formed layer was subjected to the rubbing treatment in which the rubbing direction was at the angle of 450 to the longitudinal direction of the cellulose acetate film.

(Formation of Optically Anisotropic Layer.)

To prepare a coating solution, 41.01 g of the discotic (liquid crystal) compound used in Example 2, 4.06 g of trimethylolpropane triacrylate denatured with ethylene oxide (v#360, Osaka Organic Chemicals Co., Ltd.), 0.90 g of cellulose acetate butyrate (CAB-551-0.2, Eastman Chemical), 0.23 g of cellulose acetate butyrate (CAB-531-1, Eastman Chemical), 1.35 g of a photopolymerization initiator (Irgacure 907, Ciba-Geigy) and 0.45 g of a sensitizer (Kayacure DETX, Nippon Kayaku Co., Ltd.) were dissolved in 102 g of methyl ethyl ketone. The coating solution was then applied on the orientation layer by means of a wire bar coater of #3.6. The thus-treated film was heated in a thermostat-at 130° C. for 2 minutes to align the molecules of the discotic compound. The film was then irradiated at 60° C. for 1 minute with ultraviolet rays emitted from a high pressure mercury lamp of 120 W/cm, to polymerize the discotic compound. The film was cooled to room temperature. Thus, an optical compensatory sheet (KH-15) having an optically anisotropic layer was formed.

The Re retardation value was measured at 550 nm, and found 43 nm. The average angle (inclined angle) between the disc plane and the cellulose acetate film was 42°.

EXAMPLE 12

The following components were placed in a mixing tank, heated and stirred to dissolve, to prepare a cellulose acetate solution.

| Cellulose acetate solution | |
|---|---|
| Cellulose acetate (acetic acid content: 60.7%) | 100 weight parts |
| Polyesterurethane (B-326, Sumitomo Bayern Co., Ltd.; Desmocol 176) | 16 weight parts |
| Methylene chloride (first solvent) | 300 weight parts |
| Methanol (second solvent) | 54 weight parts |
| 1-Butanol (third solvent) | 11 weight parts |

In another mixing tank, 16 weight parts of the retardation increasing agent used in Example 1, 80 weight parts of methylene chloride and 20 weight parts of methanol were placed, heated and stirred, to prepare a retardation increasing agent solution.

The cellulose acetate solution (474 weight parts) and the retardation increasing agent solution (26 weight parts) were mixed and stirred well to prepare a dope. The prepared dope contained the retardation increasing agent in the amount of 3.5 weight parts based on 100 weight parts of cellulose acetate.

The prepared dope was cast on a band by means of a band casting machine. When the temperature of the dope on the band reached 40° C., the formed film was dried for 1 minute. After peeled from the band, the film was laterally stretched by 40% with a tenter while the solvent remained in the amount of 15 wt. %. The film was then longitudinally stretched by 28% while exposed to drying air at 130° C. so that the solvent might remain in the amount of 5 wt. %. The thus stretched film was further dried with air at 140° C., to prepare a cellulose acetate film (thickness: 40 μm) in which the solvent remained in the amount of 0.3 wt. %.

The Re and Rth retardation values of the prepared cellulose acetate film (KH-06) were measured at 550 nm by means of an ellipsometer [M-150, JASCO], to obtain the values of Re550 and Rth550. The results are set forth in Table 5.

The prepared film was saponified, and an orientation layer and an optically anisotropic layer were provided thereon to produce an optical compensatory sheet (KH-16) in the same manner as Example 11.

EXAMPLE 13

The following components were placed in a mixing tank, heated and stirred to dissolve, to prepare a cellulose acetate solution.

| Cellulose acetate solution | |
|---|---|
| Cellulose acetate (acetic acid content: 60.7%) | 100 weight parts |
| Methylene chloride (first solvent) | 300 weight parts |
| Methanol (second solvent) | 54 weight parts |
| 1-Butanol (third solvent) | 11 weight parts |
| Boron nitride powder (highly thermo-conductive particles) | 30 weight parts |

In another mixing tank, 16 weight parts of the retardation increasing agent used in Example 1, 80 weight parts of methylene chloride and 20 weight parts of methanol were placed, heated and stirred, to prepare a retardation increasing agent solution.

The cellulose acetate solution (474 weight parts) and the retardation increasing agent solution (25 weight parts) were mixed and stirred well to prepare a dope. The prepared dope contained the retardation increasing agent in the amount of 3.5 weight parts based on 100 weight parts of cellulose acetate.

The prepared dope was cast on a band by means of a band casting machine. When the temperature of the dope on the band reached 40° C., the formed film was dried for 1 minute. After peeled from the band, the film was uniaxially (laterally) stretched by 38% with a tenter while exposed to drying air at 140° C. The thus stretched film was dried with air at 135° C. for about 20 minutes, to prepare a cellulose acetate film (thickness: 65 µm) in which the solvent remained in the amount of 0.3 wt. %.

The thermal conductivity of the prepared cellulose acetate film was measured in the following manner, to find 1.2 W/(m·K).

The sample film is placed between a copper heater case and a copper plate in TO-3 type hater, and is pressed by 10%. The film is then kept for 4 minutes while the copper heater case is electrified at 5 W, and the temperature difference between the case and the plate is measured. From the obtained date, the thermal conductivity is calculated according to the formula:

Thermal conductivity {W/(m·K)}={electric power (W)×thickness (m)}/{temperature difference (K)×measured area (m$^2$)}.

The Re and Rth retardation values of the prepared cellulose acetate film (KH-07) were measured at 550 nm by means of an ellipsometer [M-150, JASCO], to obtain the values of Re550 and Rth550. The results are set forth in Table 5.

The obtained cellulose acetate film (KH-07) was immersed in a 1.5 N aqueous KOH solution for 5 minutes (40° C.), neutralized with sulfuric acid, washed with pure water, and dried. The surface energy of the thus-saponified film was measured according to the contact angle method, to find 68 mN/m.

(Formation of Orientation Layer)

On the prepared cellulose acetate film, a coating solution for orientation layer used in Example 2 was applied by means of a wire-bar coater #16 in the amount of 28 ml/m$^2$. The applied solution was dried with hot air at 60° C. for 60 seconds, and then further dried with hot air at 90° C. for 150 seconds.

The formed orientation layer was subjected to the rubbing treatment in which the rubbing direction was at the angle of 450 to the slow axis (measured at 632.8 nm) of the cellulose acetate film.

(Preparation of Liquid Crystal Compound)

A liquid crystal polymer was synthesized, and it was confirmed that the polymer was oriented in homeotropic alignment on a substrate not subjected to orienting treatment.

For synthesizing the polymer, 10 mmol of 4-n-heptyl benzoic acid, 95 mmol of terephthalic acid, 50 mmol of methylhydroquinone diacetate, 50 mmol of catechol diacetate and 100 mg of sodium acetate were used to perform polymerization at 270° C. for 12 hours under nitrogen atmosphere. The reaction product was dissolved in tetrachloroethane, and re-precipitated with methanol to obtain 22.0 g of liquid crystal polyester. The prepared liquid crystal polyester had the logarithmic viscosity of 0.15, and formed a nematic phase as a liquid crystal phase. The phase transition temperature between the isotropic phase and the liquid crystal phase was observed at 240° C., and the glass transition point was found at 75° C.

A 10 wt. % solution of the liquid crystal polyester dissolved in a mixed solvent of phenol/tetrachloroethane (6/4, by weight) was prepared, and applied on a plate of soda glass according to the bar-coat method. After the solvent was removed, the applied polyester was subjected to heat treatment at 190° C. for 30 minutes, and then left at room temperature to cool and fix. As a result, an evenly oriented liquid crystal film having the thickness of 15 µm was prepared. The film was observed through a conoscope, and thereby it was found that the liquid crystal polymer had positive uniaxiality to form homeotropic alignment.

(Formation of Optically Anisotropic Layer)

An 8 wt. % tetrachloroethane solution of the liquid crystal polyester was prepared, and applied on the above orientation layer according to the spin-coat method. After the solvent was removed, the applied polyester was subjected to heat treatment at 190° C. for 20 minutes, and then left at room temperature to cool and fix. The thus-formed optical compensatory sheet (KH-17) was transparent, and had no aligning defect and an even thickness (1.55 µm).

COMPARATIVE EXAMPLE 4

The procedure of Example 10 was repeated except that the cellulose acetate solution was directly used as a dope and that the film was not stretched, to form and evaluatea cellulose acetate film (optical compensatory sheet: KH-H2) containing the remaining solvent in the amount of 3.0 wt. % and the thickness of 80 µm. The results are set forth in Table 5.

TABLE 5

| | Film | Retardation increasing agent | Re550 | Rth550 |
|---|---|---|---|---|
| Example 10 | KH-04 | 4.5 weight parts | 45 nm | 135 nm |
| Example 11 | KH-05 | 4.5 weight parts | 35 nm | 125 nm |
| Example 12 | KH-06 | 3.5 weight parts | 25 nm | 120 nm |
| Example 13 | KH-07 | 3.5 weight parts | 50 nm | 90 nm |
| Comp. Ex. 4 | KH-H2 | — | 4 nm | 48 nm |

EXAMPLE 14

Iodine was adsorbed on a stretched polyvinyl alcohol film to prepare a polarizing membrane. The optical compensatory sheet (KH-04) prepared in Example 10 was then laminated on one surface of the polarizing membrane with a polyvinyl alcohol adhesive.

On the other surface of the membrane, a commercially available cellulose triacetate film [Fujitac TD80UF, Fuji Photo Film Co., Ltd.] was saponified and laminated with a polyvinyl alcohol adhesive.

The transmission axis of the polarizing membrane was placed parallel to the slow axis of the optical compensatory sheet (KH-04). Thus, a polarizing plate was prepared.

EXAMPLE 15

Iodine was adsorbed on a stretched polyvinyl alcohol film to prepare a polarizing membrane. The optical compensatory sheet (KH-15) prepared in Example 11 was then laminated on one surface of the polarizing membrane with a polyvinyl alcohol adhesive so that the cellulose acetate film (KH-05) (support of the compensatory sheet) might be on the polarizing membrane side and so that the slow axis of the sheet might be parallel to the transmission axis of the membrane.

On the other surface of the membrane, a commercially available cellulose triacetate film [Fujitac TD80UF, Fuji Photo Film Co., Ltd.] was saponified and laminated with a polyvinyl alcohol adhesive. Thus, a polarizing plate was prepared.

EXAMPLE 16

Iodine was adsorbed on a stretched polyvinyl alcohol film to prepare a polarizing membrane. The optical compensatory sheet (KH-16) prepared in Example 12 was then laminated on one surface of the polarizing membrane with a polyvinyl alcohol adhesive so that the cellulose acetate film (KH-06) (support of the compensatory sheet) might be on the polarizing membrane side and so that the slow axis of the sheet might be parallel to the transmission axis of the membrane.

On the other surface of the membrane, a commercially available cellulose triacetate film [Fujitac TD80UF, Fuji Photo Film Co., Ltd.] was saponified and laminated with a polyvinyl alcohol adhesive. Thus, a polarizing plate was prepared.

EXAMPLE 17

Iodine was adsorbed on a stretched polyvinyl alcohol film to prepare a polarizing membrane. The optical compensatory sheet (KH-17) prepared in Example 13 was then laminated on one surface of the polarizing membrane with a polyvinyl alcohol adhesive so that the cellulose acetate film (KH-07) (support of the compensatory sheet) might be on the polarizing membrane side and so that the slow axis of the sheet might be parallel to the transmission axis of the membrane.

On the other surface of the membrane, a commercially available cellulose triacetate film [Fujitac TD80UF, Fuji Photo Film Co., Ltd.] was saponified and laminated with a polyvinyl alcohol adhesive. Thus, a polarizing plate was prepared.

COMPARATIVE EXAMPLE 5

Iodine was adsorbed on a stretched polyvinyl alcohol film to prepare a polarizing membrane. The optical compensatory sheet (KH-H2) prepared in Comparative Example 4 was then laminated on one surface of the polarizing membrane with a polyvinyl alcohol adhesive.

On the other surface of the membrane, a commercially available cellulose triacetate film [Fujitac TD80UF, Fuji Photo Film Co., Ltd.] was saponified and laminated with a polyvinyl alcohol adhesive. Thus, a polarizing plate was prepared.

EXAMPLE 18

A pair of polarizing plates and a pair of optical compensatory sheets were removed from a commercially available liquid crystal display (VL-1530S, Fujitsu, Ltd.), which has a liquid crystal cell comprising vertically aligned liquid crystal molecules. In place of the removed members, the polarizing plate prepared in Example 14 was laminated on the observer side of the cell with an adhesive so that the optical compensatory sheet (KH-04) might be on the liquid crystal cell side. On the other side (backlight side) of the cell, a commercially available polarizing plate (HLC2-5618HCS, Sunritz Co., Ltd.) was laminated. The polarizing plate on the observer side was placed so that the transmission axis might be in the up-down direction, while the plate on the backlight side was placed so that the transmission axis might be in the left-right direction. Thus, the polarizing plates were arranged in cross-Nicol position.

The viewing angle of the prepared liquid crystal display was measured by means of a measuring apparatus (EZ-Contrast 160D, ELDIM) when each of eight tones of black (L1) to white (L8) was displayed. The results are set forth in Table 6.

COMPARATIVE EXAMPLE 6

A pair of polarizing plates and a pair of optical compensatory sheets were removed from a commercially available liquid crystal display (VL-1530S, Fujitsu, Ltd.), which has a liquid crystal cell comprising vertically aligned liquid crystal molecules. In place of the removed members, the polarizing plate prepared in Comparative Example 5 was laminated on the observer side of the cell with an adhesive so that the optical compensatory sheet (KH-H2) might be on the liquid crystal cell side. On the other side (backlight side) of the cell, a commercially available polarizing plate (HLC2-5618HCS, Sunritz Co., Ltd.) was laminated. The polarizing plate on the observer side was placed so that the transmission axis might be in the up-down direction, while the plate on the backlight side was placed so that the transmission axis might be in the left-right direction. Thus, the polarizing plates were arranged in cross-Nicol position.

The viewing angle of the prepared liquid crystal display was measured by means of a measuring apparatus (EZ-Contrast 160D, ELDIM) when each of eight tones of black (L1) to white (L8) was displayed. The results are set forth in Table 6.

TABLE 6

| Liquid crystal display | Viewing angle* | |
| --- | --- | --- |
| | along transmission axis | at 45° to the transmission axis |
| Example 18 | >80° | >80° |
| Comp. Ex. 6 | >80° | 44° |

Remarks:
*Viewing angle:
Angle range giving a contrast ratio of 10 or more without reversing black tones (between L1 and L2).

(Evaluation of Increase of Transmittance at the Peripheral Part of the Screen)

A pair of polarizing plates were removed from a commercially available liquid crystal display of 15 inches type (VL-1530S, Fujitsu, Ltd.), which has a liquid crystal cell comprising vertically aligned liquid crystal molecules. In place of the removed members, the polarizing plate prepared in Example 14 was laminated on each side (each of the backlight side and the observer side) of the cell with an adhesive so that the optical compensatory sheet might be on the liquid crystal cell side. The polarizing plates were placed so that the transmission axis of the plate on the observer side might be perpendicular to that on the backlight side. The polarizing plate prepared in Comparative Example 5 was also installed in the liquid crystal display.

The backlight of the prepared display had been kept on for 5 hours under the conditions of 25° C. and 60% RH. After that, while a black image was displayed on the whole screen, it was observed with the eyes in a dark room whether light leaked or not. As a result, it was confirmed that the display of 15 inches type equipped with the polarizing plate of Example 14 did not leak light at the peripheral part of the screen but that the display equipped with the plate of Comparative Example 5 leaked light.

EXAMPLE 19

(Preparation of Liquid Crystal Cell of Bend Alignment Mode)

On a glass plate having an ITO electrode, an orientation film of polyimide was provided and subjected to a rubbing treatment. This procedure was repeated to prepare two substrates, and the substrates were arranged face-to-face so that the rubbing directions might be parallel and that the cell gap might be 6 μm. Between them, a liquid crystal having Δn of 0.1396 (ZLI1132, Merck & Co., Inc.) was introduced to prepare a liquid crystal cell of bend alignment (17 inches type).

(Production of Liquid Crystal Display)

Two elliptically polarizing plates prepared in Example 15 were laminated on the liquid crystal cell so that the cell might be between the plates. The plates were arranged so that the optically anisotropic layer in each plate might face to the cell substrate and that the rubbing directions of the cell and the optically anisotropic layer might be anti-parallel.

Voltage of a square wave (55 Hz) was applied to the liquid crystal cell. An image was displayed according to normally white mode (white: 2V, black: 5V). A ratio of the transmittance (white/black) was measured as a contrast ratio by means of a meter (EZ-Contrast 160D, ELDIM) at eight displaying states of L1 (full black) to L8 (full white). From the obtained contrast ratio, the viewing angle of the prepared liquid crystal display was measured. The results are set forth in Table 7.

EXAMPLE 20

(Preparation of Liquid Crystal Cell of Bend Alignment Mode)

On a glass plate having an ITO electrode, an orientation film of polyimide was provided and subjected to a rubbing treatment. This procedure was repeated to prepare two substrates, and the substrates were arranged face-to-face so that the rubbing directions might be parallel and that the cell gap might be 6 μm. Between them, a liquid crystal having Δn of 0.1396 (ZLI1132, Merck & Co., Inc.) was introduced to prepare a liquid crystal cell of bend alignment (17 inches type).

(Production of Liquid Crystal Display)

Two elliptically polarizing plates prepared in Example 16 were laminated on the liquid crystal cell so that the cell might be between the plates. The plates were arranged so that the optically anisotropic layer in each plate might face to the cell substrate and that the rubbing directions of the cell and the optically anisotropic layer might be anti-parallel.

Voltage of a square wave (55 Hz) was applied to the liquid crystal cell. An image was displayed according to normally white mode (white: 2V, black: 5V). A ratio of the transmittance (white/black) was measured as a contrast ratio by means of a meter (EZ-Contrast 160D, ELDIM) at eight displaying states of L1 (full black) to L8 (full white). From the obtained contrast ratio, the viewing angle of the prepared liquid crystal display was measured. The results are set forth in Table 7.

TABLE 7

| | Viewing angle* | | |
|---|---|---|---|
| LCD | Upward | Downward | Left-rightward |
| Example 19 | 80° | 80° | 80° |
| Example 20 | 80° | 80° | 80° |

Remark:
*Viewing angle:
Angle range giving a contrast ratio of 10 or more without reversing black tones (between L1 and L2).

(Evaluation of Increase of Transmittance at the Peripheral Part of the Screen)

A backlight was attached on the cell prepared in each of Examples 19 and 20, and had been kept on for 5 hours under the conditions of 25° C. and 60% RH. After that, while a black image was displayed on the whole screen, it was observed with the eyes in a dark room whether light leaked or not. As a result, it was confirmed that the cell equipped with the polarizing plates prepared in each of Examples 19 and 20 did not leak light at the peripheral part of the screen.

EXAMPLE 21

A pair of polarizing plates were removed from a commercially available liquid crystal display (6E-A3, Sharp Corporation), which had a liquid crystal cell of TN mode. In place of the removed members, the polarizing plate prepared in Example 17 was laminated on each side (each of the backlight side and the observer side) of the cell with an adhesive so that the KH-07 (optical compensatory sheet prepared in Example 17) might be on the liquid crystal cell side. The polarizing plates were arranged so that the transmission axes might be crossed perpendicularly.

The viewing angle of the prepared liquid crystal display was measured by means of a measuring apparatus (EZ-Contrast 160D, ELDIM) when each of eight tones of black (L1) to white (L8) was displayed. The results are set forth in Table 8.

TABLE 8

| LCD | Viewing angle* | | |
|---|---|---|---|
| | Upward | Downward | Left-rightward |
| Example 21 | 35° | 60° | 80° |

Remark:
*Viewing angle:
Angle range giving a contrast ratio of 10 or more without reversing black tones (between L1 and L2).

(Evaluation of Increase of Transmittance at the Peripheral Part of the Screen)

A pair of polarizing plates were removed from a commercially available liquid crystal display of 20 inches type (LC-20VI, Sharp Corporation), which had a liquid crystal cell of TN mode. In place of the removed members, the polarizing plate prepared in Example 17 was laminated on each side (each of the backlight side and the observer side) of the cell with an adhesive so that the optical compensatory sheet might be on the liquid crystal cell side. The polarizing plates were placed so that the transmission axis of the plate on the observer side might be perpendicular to that on the backlight side.

The backlight of the prepared display had been kept on for 5 hours under the conditions of 25° C. and 60% RH. After that, while a black image was displayed on the whole screen, it was observed with the eyes in a dark room whether light leaked or not. As a result, it was confirmed that the display of 20 inches type equipped with the polarizing plate of Example 17 did not leak light at the peripheral part of the screen.

EXAMPLE 22

The following components were placed in a mixing tank, heated and stirred to dissolve, to prepare a cellulose acetate solution.

| Cellulose acetate solution | |
|---|---|
| Cellulose acetate (acetic acid content: 60.9%) | 100 weight parts |
| Triphenyl phosphate (plasticizer) | 7.8 weight parts |
| Biphenyldiphenyl phosphate (plasticizer) | 3.9 weight parts |
| Methylene chloride (first solvent) | 300 weight parts |
| Methanol (second solvent) | 54 weight parts |
| 1-Butanol (third solvent) | 11 weight parts |

In another mixing tank, 16 weight parts of the retardation increasing agent used in Example 1, 80 weight parts of methylene chloride and 20 weight parts of methanol were placed, heated and stirred, to prepare a retardation increasing agent solution.

The cellulose acetate solution (474 weight parts) and the retardation increasing agent solution (25 weight parts) were mixed and stirred well to prepare a dope. The prepared dope contained the retardation increasing agent in the amount of 3.5 weight parts based on 100 weight parts of cellulose acetate.

The prepared dope was cast on a band by means of a band casting machine. After peeled from the band, the film was laterally stretched by 25% at 130° C. with a tenter while the solvent remained in the amount of 15 wt. %, to prepare a cellulose acetate film (thickness: 70 μm).

The obtained film was immersed in a 1.5 N aqueous KOH solution for 2 minutes (50° C.), and neutralized with sulfuric acid. After taken out of the solution, the film was washed with pure water, and dried. The surface energy of the thus-saponified film was measured according to the contact angle method, to find 60 mN/m.

The Re and Rth retardation values of the prepared cellulose acetate film (optical compensatory sheet) were measured at 550 nm by means of an ellipsometer [M-150, JASCO], to obtain the values of Re550 and Rth550. The results are set forth in Table 9.

EXAMPLE 23

The procedure of Example 22 was repeated except that 474 weight parts of the cellulose acetate solution and 56 weight parts of the retardation increasing agent solution were mixed (7.8 weight parts of the retardation increasing agent was used based on 100 weight parts of cellulose acetate) to prepare a dope, and except that the formed film was stretched by 14%. Thus, a cellulose acetate film (optical compensatory sheet) was prepared.

The obtained film was immersed in a 1.5 N aqueous KOH solution for 5 minutes (40° C.), and neutralized with sulfuric acid. After taken out of the solution, the film was washed with pure water, and dried. The surface energy of the thus-saponified film was measured according to the contact angle method, to find 68 mN/m.

The Re and Rth retardation values of the prepared cellulose acetate film (optical compensatory sheet) were measured at 550 nm by means of an ellipsometer [M-150, JASCO], to obtain the values of Re550 and Rth550. The results are set forth in Table 9.

EXAMPLE 24

The procedure of Example 23 was repeated except that the formed film was stretched by 8%, to prepare a cellulose acetate film.

The obtained film was immersed in a 2.0 N aqueous KOH solution for 2 minutes (25° C.), and neutralized with sulfuric acid. After taken out of the solution, the film was washed with pure water, and dried. The surface energy of the thus-saponified film was measured according to the contact angle method, to find 63 mN/m.

On the prepared cellulose acetate film, a coating solution for orientation layer used in Example 2 was applied by means of a wire-bar coater #16 in the amount of 28 ml/m². The applied solution was dried with hot air at 60° C. for 60 seconds, and then further dried with hot air at 90° C. for 150 seconds.

The formed layer was subjected to the rubbing treatment in which the rubbing direction was at the angle of 450° to the slow axis (measured at 632.8 nm) of the cellulose acetate film.

(Formation of Optically Anisotropic Layer)

To prepare a coating solution, 41.01 g of the discotic (liquid crystal) compound used in Example 2, 4.06 g of trimethylolpropane triacrylate denatured with ethylene oxide (V#360, Osaka Organic Chemicals Co., Ltd.), 0.90 g of cellulose acetate butyrate (CAB-551-0.2, Eastman Chemical), 0.23 g of cellulose acetate butyrate (CAB-531-1, Eastman Chemical), 1.35 g of a photopolymerization initiator (Irgacure 907, Ciba-Geigy) and 0.45 g of a sensitizer (Kayacure DETX, Nippon Kayaku Co., Ltd.) were dissolved in 102 g of methyl ethyl ketone. The coating solution was then applied on the orientation film by means of a wire bar coater of #3. The thus-treated film was fixed on a metal frame, and heated in a thermostat at 130° C. for 2 minutes to align the molecules of the discotic compound. The film was then irradiated at 130° C. for 1 minute with ultraviolet rays emitted from a high pressure mercury lamp of 120 W/cm, to polymerize the discotic compound. The film was cooled to room temperature. Thus, an optically anisotropic layer was formed.

The Re and Rth retardation values (Re550 and Rth550) of the prepared optical compensatory sheet were measured at 550 nm in the same manner as in Example 22. The results are set forth in Table 9.

EXAMPLE 25

The procedure of Example 22 was repeated except that 474 weight parts of the cellulose acetate solution and 56 weight parts of the retardation increasing agent solution were mixed (7.8 weight parts of the retardation increasing agent was used based on 100 weight parts of cellulose acetate) to prepare a dope, and except that the formed film was stretched by 35%. Thus, a cellulose acetate film (optical compensatory sheet) was prepared.

The surface of the obtained film was subjected to corona discharge treatment at the discharge frequency of 100 kHz, and then its surface energy film was measured according to the contact angle method to find 60 mN/m.

The Re and Rth retardation values (Re550 and Rth550) of the prepared cellulose acetate film (optical compensatory sheet) were measured at 550 nm in the same manner as in Example 22. The results are set forth in Table 9.

COMPARATIVE EXAMPLE 7

The procedure of Example 22 was repeated except that the cellulose acetate solution was directly used as a dope and that the film was not stretched, to form and evaluate a cellulose acetate film (optical compensatory sheet). The results are set forth in Table 9.

TABLE 9

|  | Retardation increasing agent | Stretching ratio | Re550 | Rth550 |
| --- | --- | --- | --- | --- |
| Example 22 | 3.5 weight parts | 25% | 40 nm | 130 nm |
| Example 23 | 7.8 weight parts | 14% | 50 nm | 240 nm |
| Example 24 | 7.8 weight parts | 8% | 20 nm | 220 nm |
| Example 25 | 7.8 weight parts | 35% | 120 nm | 250 nm |
| Comp. Ex. 7 | — | — | 4 nm | 48 nm |

EXAMPLE 26

Iodine was adsorbed on a stretched polyvinyl alcohol film to prepare a polarizing membrane. The cellulose acetate film prepared in Example 22 was then laminated on one surface of the polarizing membrane with a polyvinyl alcohol adhesive.

On the other surface of the membrane, a commercially available cellulose triacetate film [Fujitac TD80UF, Fuji Photo Film Co., Ltd.] was saponified and laminated with a polyvinyl alcohol adhesive.

The transmission axis of the polarizing membrane was placed parallel to the slow axis of the film prepared in Example 22. The transmission axis of the polarizing membrane was placed perpendicularly to the slow axis of the commercially available cellulose triacetate film. Thus, a polarizing plate was prepared.

EXAMPLE 27

The procedure of Example 26 was repeated except that the cellulose acetate film prepared in Example 23 was used, to prepare a polarizing plate.

EXAMPLE 28

The procedure of Example 26 was repeated except that the cellulose acetate film prepared in Example 24 was used, to prepare a polarizing plate.

EXAMPLE 29

A pair of polarizing plates and a pair of optical compensatory sheets were removed from a commercially available liquid crystal display (VL-1530S, Fujitsu, Ltd.), which has a liquid crystal cell comprising vertically aligned liquid crystal molecules. In place of the removed members, the polarizing plate prepared in Example 26 was laminated on each side (each of the backlight side and the observer side) of the cell with an adhesive so that the cellulose acetate film prepared in Example 22 might be on the liquid crystal cell side. The polarizing plate on the observer side was placed so that the transmission axis might be in the up-down direction, while the plate on the backlight side was placed so that the transmission axis might be in the left-right direction. Thus, the polarizing plates were arranged in cross-Nicol position.

The viewing angle of the prepared liquid crystal display was measured by means of a measuring apparatus (EZ-Contrast 160D, ELDIM) when each of eight tones of black (L1) to white (L8) was displayed. The results are set forth in Table 10.

EXAMPLE 30

A pair of polarizing plates and a pair of optical compensatory sheets were removed from a commercially available liquid crystal display (VL-1530S, Fujitsu, Ltd.), which has a liquid crystal cell comprising vertically aligned liquid crystal molecules. In place of the removed members, the polarizing plate prepared in Example 27 was laminated on the observer side of the cell with an adhesive so that the cellulose acetate film prepared in Example 23 might be on the liquid crystal cell side. On the other side (backlight side) of the cell, a commercially available polarizing plate (HLC2-5618HCS, Sunritz Co., Ltd.) was laminated. The polarizing plate on the observer side was placed so that the transmission axis might be in the up-down direction, while the plate on the backlight side was placed so that the transmission axis might be in the left-right direction. Thus, the polarizing plates were arranged in cross-Nicol position.

The viewing angle of the prepared liquid crystal display was measured by means of a measuring apparatus (EZ-Contrast 160D, ELDIM) when each of eight tones of black (L1) to white (L8) was displayed. The results are set forth in Table 10.

COMPARATIVE EXAMPLE 8

The viewing angle of the commercially available liquid crystal display (VL-1530S, Fujitsu, Ltd.), which has a liquid crystal cell comprising vertically aligned liquid crystal molecules, was measured by means of a measuring apparatus (EZ-Contrast 160D, ELDIM) when each of eight tones of black (L1) to white (L8) was displayed. The results are set forth in Table 10.

TABLE 10

| Liquid crystal display | Viewing angle* | |
|---|---|---|
| | along transmission axis | at 45° to the transmission axis |
| Example 29 | 80° | 80° |
| Example 30 | 80° | 80° |
| Comp. Ex. 8 | 80° | 44° |

Remarks:
*Viewing angle:
Angle range giving a contrast ratio of 10 or more without reversing black tones (between L1 and L2).

EXAMPLE 31

(Preparation of Liquid Crystal Cell of Bend Alignment Mode)

On a glass plate having an ITO electrode, an orientation film of polyimide was provided and subjected to a rubbing treatment. This procedure was repeated to prepare two substrates, and the substrates were arranged face-to-face so that the rubbing directions might be parallel and that the cell gap might be 6 μm. Between them, a liquid crystal having Δn of 0.1396 (ZLI1132, Merck & Co., Inc.) was introduced to prepare a liquid crystal cell of bend alignment.

Two elliptically polarizing plates prepared in Example 28 were laminated on the liquid crystal cell so that the cell might be between the plates. The plates were arranged so that the optically anisotropic layer in each plate might face to the cell substrate and that the rubbing directions of the cell and the optically anisotropic layer might be anti-parallel.

Voltage of a square wave (55 Hz) was applied to the liquid crystal cell. An image was displayed according to normally white mode (white: 2V, black: 5V). A ratio of the transmittance (white/black) was measured as a contrast ratio by means of a meter (EZ-Contrast 160D, ELDIM) at eight displaying states of L1 (full black) to L8 (full white). From the obtained contrast ratio, the viewing angle of the prepared liquid crystal display was measured. The results are set forth in Table 11.

TABLE 11

| LCD | Viewing angle* | | |
|---|---|---|---|
| | Upward | Downward | Left-rightward |
| Example 31 | 80° | 80° | 80° |

Remark:
*Viewing angle:
Angle range giving a contrast ratio of 10 or more without reversing black tones (between L1 and L2).

EXAMPLE 32

A pair of polarizing plates were removed from a commercially available liquid crystal display (6E-A3, Sharp Corporation), which had a liquid crystal cell of TN mode. In place of the removed members, the polarizing plate prepared in Example 26 was laminated on each side (each of the backlight side and the observer side) of the cell with an adhesive so that the cellulose acetate film prepared in Example 22 might be on the liquid crystal cell side. The polarizing plates were arranged so that the transmission axes might be crossed perpendicularly.

The viewing angle of the prepared liquid crystal display was measured by means of a measuring apparatus (EZ-Contrast 160D, ELDIM) when each of eight tones of black (L1) to white (L8) was displayed. The results are set forth in Table 12.

COMPARATIVE EXAMPLE 9

The viewing angle of the commercially available liquid crystal display (6E-A3, Sharp Corporation), which has a liquid crystal cell of TN mode, was measured by means of a measuring apparatus (EZ-Contrast 160D, ELDIM) when each of eight tones of black (L1) to white (L8) was displayed. The results are set forth in Table 12.

TABLE 12

| LCD | Viewing angle* | | |
|---|---|---|---|
| | Upward | Downward | Left-rightward |
| Example 32 | 18° | 23° | 77° |
| Comp. Ex. 9 | 15° | 25° | 37° |

Remark:
*Viewing angle:
Angle range giving a contrast ratio of 10 or more without reversing black tones (between L1 and L2).

EXAMPLE 33

(Preparation of Cellulose Acetate Film)

The following components were placed in a mixing tank, heated and stirred to dissolve, to prepare a cellulose acetate solution.

| Cellulose acetate solution | |
|---|---|
| Cellulose acetate (acetic acid content: 60.9%) | 100 weight parts |
| Triphenyl phosphate (plasticizer) | 7.8 weight parts |
| Biphenyldiphenyl phosphate (plasiticizer) | 3.9 weight parts |
| Methylene chloride (first solvent) | 300 weight parts |
| Methanol (second solvent) | 54 weight parts |
| 1-Butanol (third solvent) | 11 weight parts |

In another mixing tank, 16 weight parts of the retardation increasing agent used in Example 1, 80 weight parts of methylene chloride and 20 weight parts of methanol were placed, heated and stirred, to prepare a retardation increasing agent solution.

The cellulose acetate solution (474 weight parts) and the retardation increasing agent solution (25 weight parts) were mixed and stirred well to prepare a dope. The prepared dope contained the retardation increasing agent in the amount of 3.5 weight parts based on 100 weight parts of cellulose acetate.

The prepared dope was cast on a band by means of a band casting machine. When the temperature of the dope on the band reached 40° C., the formed film was dried with air at 70° C. for 1 minute. After peeled from the band, the film was dried with air at 140° C. for about 10 minutes, to prepare a cellulose acetate film (thickness: 50 μm) in which the solvent remained in the amount of 0.3 wt. %.

The Re and Rth retardation values of the prepared cellulose acetate film (CAF-01) were measured at 550 nm by means of an ellipsometer [M-150, JASCO], to obtain the values of Re550 and Rth550. The results are set forth in Table 13.

The obtained film was immersed in a 2.0 N aqueous KOH solution for 2 minutes (25° C.), neutralized with sulfuric acid, washed with pure water, and dried. The surface energy of the thus-saponified film was measured according to the contact angle method, to find 63 mN/m.

(Formation of Orientation Layer)

on the prepared cellulose acetate film, the coating solution used in Example 2 was then applied in the amount of 28 ml/m$^2$ by means of a wire bar coater of #16. The applied solution was dried with hot air at 60° C. for 60 seconds, and then further dried with hot air at 90° C. for 150 seconds.

The formed layer was subjected to the rubbing treatment in which the rubbing direction was parallel to the longitudinal direction of the cellulose acetate film.

(Formation of Optically Anisotropic Layer)

To prepare a coating solution, 41.01 g of the discotic (liquid crystal) compound used in Example 2, 4.06 g of trimethylolpropane triacrylate denatured with ethylene oxide (V#360, Osaka Organic Chemicals Co., Ltd.), 0.90 g of cellulose acetate butyrate (CAB-551-0.2, Eastman Chemical), 0.23 g of cellulose acetate butyrate (CAB-531-1, Eastman Chemical), 1.35 g of a photopolymerization initiator (Irgacure 907, Ciba-Geigy) and 0.45 g of a sensitizer (Kayacure DETX, Nippon Kayaku Co., Ltd.) were dissolved in 102 g of methyl ethyl ketone. The coating solution was then applied on the orientation film by means of a wire bar coater of #3.6. The thus-treated film was heated in a thermostat at 130° C. for 2 minutes to align the molecules of the discotic compound. The film was then irradiated at 60° C. for 1 minute with ultraviolet rays emitted from a high pressure mercury lamp of 120 W/cm, to polymerize the discotic compound. The film was cooled to room temperature. Thus, an optical compensatory sheet (KH-A1) was formed.

The Re retardation value was measured at 550 nm, and found 43 nm. The average angle (inclined angle) between the disc plane and the cellulose acetate film was 42°.

EXAMPLE 34

The following components were placed in a mixing tank, heated and stirred to dissolve, to prepare a cellulose acetate solution.

| Cellulose acetate solution | |
|---|---|
| Cellulose acetate (acetic acid content: 60.7%) | 100 weight parts |
| Polyesterurethane (B-326, Sumitomo Bayern Co., Ltd.; Desmocol 176) | 16 weight parts |
| Methylene chloride (first solvent) | 300 weight parts |
| Methanol (second solvent) | 54 weight parts |
| 1-Butanol (third solvent) | 11 weight parts |

In another mixing tank, 16 weight parts of the retardation increasing agent used in Example 1, 80 weight parts of methylene chloride and 20 weight parts of methanol were placed, heated and stirred, to prepare a retardation increasing agent solution.

The cellulose acetate solution (484 weight parts) and the retardation increasing agent solution (15 weight parts) were mixed and stirred well to prepare a dope. The prepared dope contained the retardation increasing agent in the amount of 2.0 weight parts based on 100 weight parts of cellulose acetate.

The prepared dope was cast on a band by means of a band casting machine. When the temperature of the dope on the band reached 40° C., the formed film was dried with air at 65° C. for 1 minute. After peeled from the band, the film was laterally stretched by 20% with a tenter while the solvent remained in the amount of 15 wt. %. The film was dried with air at 130° C. for 5 minutes so that the solvent might remain in the amount of 5 wt. %. The film was then longitudinally stretched by 18%, and further dried with air at 140° C. for 10 minutes to prepare a cellulose acetate film (thickness: 40 μm) in which the solvent remained in the amount of 0.3 wt. %.

The Re and Rth retardation values of the prepared cellulose acetate film (CAF-$_{02}$) were measured at 550 nm by means of an ellipsometer [M-150, JASCO], to obtain the values of Re550 and Rth550. The results are set forth in Table 13.

The prepared film was subjected to the surface treatment in the same manner as Example 33, and an orientation layer and an optically anisotropic layer were provided thereon to produce an optical compensatory sheet (KH-A2).

EXAMPLE 35

The following components were placed in a mixing tank, heated and stirred to dissolve, to prepare a cellulose acetate solution.

| Cellulose acetate solution | |
|---|---|
| Cellulose acetate (acetic acid content: 60.7%) | 100 weight parts |
| Methylene chloride (first solvent) | 300 weight parts |
| Methanol (second solvent) | 54 weight parts |
| 1-Butanol (third solvent) | 11 weight parts |
| Boron nitride powder (highly thermo-conductive particles) | 30 weight parts |

In another mixing tank, 16 weight parts of the retardation increasing agent used in Example 1, 80 weight parts of methylene chloride and 20 weight parts of methanol were placed, heated and stirred, to prepare a retardation increasing agent solution.

The cellulose acetate solution (474 weight parts) and the retardation increasing agent solution (25 weight parts) were mixed and stirred well to prepare a dope. The prepared dope contained the retardation increasing agent in the amount of 3.5 weight parts based on 100 weight parts of cellulose acetate.

The prepared dope was cast on a band by means of a band casting machine. When the temperature of the dope on the band reached 40° C., the formed film was dried with air at 70° C. for 1 minute. After peeled from the band, the film was dried with air at 140° C. for 10 minutes, to prepare a cellulose acetate film (thickness: 50 μm) in which the solvent remained in the amount of 0.3 wt. %.

The thermal conductivity of the prepared cellulose acetate film was measured, to find 1.2 W/(m·K).

The optical characters of the cellulose acetate film (CAF-03) were measured. The results are set forth in Table 13.

The obtained film (CAF-03) was immersed in a 1.5 N aqueous KOH solution for 5 minutes (40° C.), neutralized with sulfuric acid, washed with pure water, and dried. The surface energy of the thus-saponified film (CAF-03) was measured according to the contact angle method, to find 68 mN/m.

(Formation of Orientation Layer)

On the prepared cellulose acetate film, the coating solution used in Example 2 was then applied in the amount of 28 ml/m$^2$ by means of a wire bar coater of #16. The applied solution was dried with hot air at 60° C. for 60 seconds, and then further dried with hot air at 90° C. for 150 seconds.

The formed layer was subjected to the rubbing treatment in which the rubbing direction was parallel to the longitudinal direction of the cellulose acetate film.

(Preparation of Liquid Crystal Compound)

A liquid crystal polymer was synthesized, and it was confirmed that the polymer was oriented in homeotropic alignment on a substrate not subjected to orienting treatment.

For synthesizing the polymer, 10 mmol of 4-n-heptyl benzoic acid, 95 mmol of terephthalic acid, 50 mmol of methylhydroquinone diacetate, 50 mmol of catechol diacetate and 100 mg of sodium acetate were used to perform polymerization at 270° C. for 12 hours under nitrogen atmosphere. The reaction product was dissolved in tetrachloroethane, and re-precipitated with methanol to obtain 22.0 g of liquid crystal polyester. The prepared liquid crystal polyester had the logarithmic viscosity of 0.15, and formed a nematic phase as a liquid crystal phase. The phase transition temperature between the isotropic phase and the liquid crystal phase was observed at 240° C., and the glass transition point was found at 75° C.

A 10 wt. % solution of the liquid crystal polyester dissolved in a mixed solvent of phenol/tetrachloroethane (6/4, by weight) was prepared, and applied on a plate of soda glass according to the bar-coat method. After the solvent was removed, the applied polyester was subjected to heat treatment at 190° C. for 30 minutes, and then left at room temperature to cool and fix. As a result, an evenly oriented liquid crystal film having the thickness of 15 μm was prepared. The film was observed through a conoscope, and thereby it was found that the liquid crystal polymer had positive uniaxiality to form homeotropic alignment.

(Formation of Optically Anisotropic Layer)

An 8 wt. % tetrachloroethane solution of the liquid crystal polyester was prepared, and applied on the above orientation layer according to the spin-coat method. After the solvent was removed, the applied polyester was subjected to heat treatment at 190° C. for 20 minutes, and then left at room temperature to cool and fix. The thus-formed optical compensatory sheet (KH-A3) was transparent, and had no aligning defect and an even thickness (1.55 μm).

COMPARATIVE EXAMPLE 10

The cellulose acetate solution used in Example 33 was directly used as a dope, which cast on a band by means of a band casting machine. When the temperature of the dope on the band reached 40° C., the formed film was dried with air at 40° C. for 1 minute. After peeled from the band, the film was dried with air at 100° C. for 10 minutes, to prepare a cellulose acetate film (thickness: 80 μm) in which the solvent remained in the amount of 3.0 wt. %.

The optical characters of the prepared cellulose acetate film (CAF-H1) were measured. The results are set forth in Table 13.

TABLE 13

|  | Film | Retardation increasing agent | Re550 | Rth550 |
|---|---|---|---|---|
| Example 33 | CAF-01 | 3.5 weight parts | 8 nm | 80 nm |
| Example 34 | CAF-02 | 2.5 weight parts | 4 nm | 90 nm |
| Example 35 | CAF-03 | 3.5 weight parts | 9 nm | 82 nm |
| Comp. Ex. 10 | CAF-H1 | — | 4 nm | 48 nm |

EXAMPLE 36

Iodine was adsorbed on a stretched polyvinyl alcohol film to prepare a polarizing membrane. The optical compensatory sheet (KH-A1) prepared in Example 33 was then laminated on one surface of the polarizing membrane with a polyvinyl alcohol adhesive so that the cellulose acetate film (CAF-01) might be on the polarizing membrane side and so that the slow axis of the sheet (KH-A1) might be parallel to the transmission axis of the membrane.

On the other surface of the membrane, a commercially available cellulose triacetate film [Fujitac TD80UF, Fuji Photo Film Co., Ltd.] was saponified and laminated with a polyvinyl alcohol adhesive. Thus, a polarizing plate was prepared.

EXAMPLE 3.7

Iodine was adsorbed on a stretched polyvinyl alcohol film to prepare a polarizing membrane. The optical compensatory sheet (KH-A2) prepared in Example 34 was then laminated on one surface of the polarizing membrane with a polyvinyl alcohol adhesive so that the cellulose acetate film (CAF-02) might be on the polarizing membrane side and so that the slow axis of the sheet (KH-A2) might be parallel to the transmission axis of the membrane.

On the other surface of the membrane, a commercially available cellulose triacetate film [Fujitac TD80UF, Fuji Photo Film Co., Ltd.] was saponified and laminated with a polyvinyl alcohol adhesive. Thus, a polarizing plate was prepared.

EXAMPLE 38

Iodine was adsorbed on a stretched polyvinyl alcohol film to prepare a polarizing membrane. The optical compensatory sheet (KH-A3) prepared in Example 35 was then laminated on one surface of the polarizing membrane with a polyvinyl alcohol adhesive so that the cellulose acetate film (CAF-03) might be on the polarizing membrane side and so that the slow axis of the sheet (KH-A3) might be perpendicular to the transmission axis of the membrane.

On the other surface of the membrane, a commercially available cellulose triacetate film [Fujitac TD80UF, Fuji Photo Film Co., Ltd.] was saponified and laminated with a polyvinyl alcohol adhesive. Thus, a polarizing plate was prepared.

COMPARATIVE EXAMPLE 11

Iodine was adsorbed on a stretched polyvinyl alcohol film to prepare a polarizing membrane. The cellulose acetate film prepared in Comparative Example 10 was then laminated on one surface of the polarizing membrane with a polyvinyl alcohol adhesive so that the slow axis of the film (CAF-H1) might be perpendicular to the transmission axis of the membrane.

On the other surface of the membrane, a commercially available cellulose triacetate film [Fujitac TD80UF, Fuji Photo Film Co., Ltd.] was saponified and laminated with a polyvinyl alcohol adhesive. Thus, a polarizing plate was prepared.

EXAMPLE 39

A pair of polarizing plates were removed from a commercially available liquid crystal display (6E-A3, Sharp Corporation), which had a liquid crystal cell of TN mode. In place of the removed members, the polarizing plate prepared in Example 36 was laminated on each side (each of the backlight side and the observer side) of the cell with an adhesive so that the optical compensatory sheet (KH-A1) might be on the liquid crystal cell side. The polarizing plates were arranged so that the transmission axes might be crossed perpendicularly.

The viewing angle of the prepared liquid crystal display was measured by means of a measuring apparatus (EZ-Contrast 160D, ELDIM) when each of eight tones of black (L1) to white (L8) was displayed. The results are set forth in Table 14.

EXAMPLE 40

A pair of polarizing plates were removed from a commercially available liquid crystal display (6E-A3, Sharp Corporation), which had a liquid crystal cell of TN mode. In place of the removed members, the polarizing plate prepared in Example 37 was laminated on each side (each of the backlight side and the observer side) of the cell with an adhesive so that the optical compensatory sheet (KH-A2) might be on the liquid crystal cell side. The polarizing plates were arranged so that the transmission axes might be crossed perpendicularly.

The viewing angle of the prepared liquid crystal display was measured by means of a measuring apparatus (EZ-Contrast 160D, ELDIM) when each of eight tones of black (L1) to white (L8) was displayed. The results are set forth in Table 14.

EXAMPLE 41

A pair of polarizing plates were removed from a commercially available liquid crystal display (6E-A3, Sharp Corporation), which had a liquid crystal cell of TN mode. In place of the removed members, the polarizing plate prepared in Example 38 was laminated on each side (each of the backlight side and the observer side) of the cell with an adhesive so that the optical compensatory sheet (KH-A3) might be on the liquid crystal cell side. The polarizing plates were arranged so that the transmission axes might be crossed perpendicularly.

The viewing angle of the prepared liquid crystal display was measured by means of a measuring apparatus (EZ-Contrast 160D, ELDIM) when each of eight tones of black (L1) to white (L8) was displayed. The results are set forth in Table 14.

COMPARATIVE EXAMPLE 12

The viewing angle of the commercially available liquid crystal display (6E-A3, Sharp Corporation), which has a liquid crystal cell of TN mode, was measured by means of a measuring apparatus (EZ-Contrast 160D, ELDIM) when each of eight tones of black (L1) to white (L8) was displayed. The results are set forth in Table 14.

TABLE 14

| LCD | Viewing angle* | | |
| --- | --- | --- | --- |
|  | Upward | Downward | Left-rightward |
| Example 39 | 70° | 45° | 160° |
| Example 40 | 75° | 45° | 160° |
| Example 41 | 30° | 55° | 120° |
| Comp. Ex. 12 | 15° | 25° | 37° |

Remark:
*Viewing angle:
Angle range giving a contrast ratio of 10 or more without reversing black tones (between L1 and L2).

EXAMPLE 42

A pair of polarizing plates were removed from a commercially available liquid crystal display of 20 inches type (LC-20v1, Sharp Corporation), which had a liquid crystal cell of TN mode. In place of the removed members, the polarizing plate prepared in Example 36 was laminated on each side (each of the backlight side and the observer side) of the cell with an adhesive so that the optical compensatory sheet (KH-A1) might be on the liquid crystal cell side. The polarizing plates were arranged so that the transmission axes might be crossed perpendicularly.

The backlight of the prepared display had been kept on for 5 hours under the conditions of 25° C. and 60% RH. After that, while a black image was displayed on the whole screen, it was observed with the eyes in a dark room whether light leaked or not. As a result, it was confirmed that the display did not leak light.

EXAMPLE 43

The procedure of Example 42 was repeated except that the polarizing plate prepared in Example 37 was used, and thereby it was confirmed that the display equipped with the polarizing plate of Example 37 did not leak light.

EXAMPLE 44

The procedure of Example 42 was repeated except that the polarizing plate prepared in Example 38 was used, and thereby it was confirmed that the display equipped with the polarizing plate of Example 38 did not leak light.

COMPARATIVE EXAMPLE 13

The procedure of Example 42 was repeated except that the polarizing plate prepared in Comparative Example 11 was used, and thereby it was confirmed that the display equipped with the polarizing plate of Comparative Example 11 leaked light at the peripheral area of the screen.

EXAMPLE 45

(Preparation of Optical Compensatory Sheet)

The following components were placed in a mixing tank, heated and stirred to dissolve, to prepare a cellulose acetate solution.

| Cellulose acetate solution | |
|---|---|
| Cellulose acetate (acetic acid content: 60.9%) | 100 weight parts |
| Triphenyl phosphate (plasticizer) | 7.8 weight parts |
| Biphenyldiphenyl phosphate (plasticizer) | 3.9 weight parts |
| Methylene chloride (first solvent) | 300 weight parts |
| Methanol (second solvent) | 54 weight parts |
| 1-Butanol (third solvent) | 11 weight parts |

In another mixing tank, 16 weight parts of the retardation increasing agent used in Example 1, 80 weight parts of methylene chloride and 20 weight parts of methanol were placed, heated and stirred, to prepare a retardation increasing agent solution.

The cellulose acetate solution (474 weight parts) and the retardation increasing agent solution (25 weight parts) were mixed and stirred well to prepare a dope. The prepared dope contained the retardation increasing agent in the amount of 3.5 weight parts based on 100 weight parts of cellulose acetate.

The prepared dope was cast on a band by means of a band casting machine. After peeled from the band, the film was laterally stretched by 25% at 130° C. with a tenter while the solvent remained in the amount of 15 wt. %. The film was dried at 50° C. for 30 seconds with the width kept with clips, to prepare a cellulose acetate film (optical compensatory sheet) having the thickness of 70 μm.

The Re and Rth retardation values (Re550 and Rth550) of the prepared cellulose acetate film (TAC-1) were measured at 550 nm by means of an ellipsometer [M-150, JASCO], to find 40 nm and 130 nm, respectively.

(Saponification Treatment)

The obtained film (TAC-1) was immersed in a 1.5 N aqueous NaOH solution (pH: 13) for 2 minutes (55° C.) to saponify, washed with flowing water and dried.

The Re retardation value (Re550) of the saponified film was measured, and thereby the Re retardation difference (ΔRe=Re550 of the saponified film−Re550 of the film before saponification) was obtained. Further, the concentration of eluted retardation increasing agent was measured to determine the ratio of the eluted amount per the original content of the retardation increasing agent. The results are set forth in Table 15.

COMPARATIVE EXAMPLE 14

(Preparation of Transparent Support)

The following components were placed in a mixing tank, heated and stirred to dissolve, to prepare a cellulose acetate solution.

| Cellulose acetate solution | |
|---|---|
| Cellulose acetate (acetic acid content: 60.9%) | 100 weight parts |
| Triphenyl phosphate (plasticizer) | 7.8 weight parts |
| Biphenyldiphenyl phosphate (plasticizer) | 3.9 weight parts |
| Methylene chloride (first solvent) | 300 weight parts |
| Methanol (second solvent) | 54 weight parts |
| 1-Butanol (third solvent) | 11 weight parts |

In another mixing tank, the following components were placed, heated and stirred to prepare to prepare a retardation increasing agent solution.

| Components of retardation increasing agent solution | |
|---|---|
| 2-Hydroxy-4-benzyloxybenzophenone | 12 weight parts |
| 2,4-benzyloxybenzophenone | 4 weight parts |
| Methylene chloride | 80 weight parts |
| Methanol | 20 weight parts |

The cellulose acetate solution (474 weight parts) and the retardation increasing agent solution (22 weight parts) were mixed and stirred well to prepare a dope. The prepared dope contained the retardation increasing agent in the amount of 3 weight parts based on 100 weight parts of cellulose acetate.

The dope was cast on a drum cooled at 0° C. The formed film was peeled when the solvent content was 70 wt. %, and both sides of the film was fixed with a pin tenter. While the film was set up so that the stretching ratio might be 3% in the lateral direction (direction perpendicular to the machine), the film was dried until the solvent content was 3 to 5 wt. %. The film was then transferred and dried in a heating apparatus equipped with many rollers. The stretching ratio along the tenter was essentially 0% at a temperature higher than 120° C., which is the glass transition temperature. In order to stretch the film along the machine by 4% when the film was peeled, the stretching ratio in the direction perpendicular to the machine (in the lateral direction) was 0.75 times as much as the stretching ratio along the machine (in the longitudinal direction). Thus, a cellulose acetate film having 107 μm thickness is produced.

The Re and Rth retardation values (Re550 and Rth550) of the prepared cellulose acetate film (TAC-3) were measured at 550 nm by means of an ellipsometer [M-150, JASCO], to find 11 nm and 80 nm, respectively.

(Saponification Treatment)

The obtained film (TAC-3) was saponified in the same manner as Example 45.

The Re retardation difference (ΔRe=Re550 of the saponified film−Re550 of the film before saponification) and the concentration of eluted retardation increasing agent (ratio of the eluted amount per the original content of the retardation increasing agent) were measured. The results are set forth in Table 15.

TABLE 15

| | Film | ΔRe | Eluted RI agent* |
|---|---|---|---|
| Example 45 | TAC-1 | −2 nm | 0.1% |
| Comp. Ex. 14 | TAC-3 | −4 nm | 0.7% |

Remark:
*Eluted RI agent: Ratio of the eluted amount per the original content of the retardation increasing agent

EXAMPLE 46

(Preparation of Polarizing Plate)

Iodine was adsorbed on a stretched polyvinyl alcohol film to prepare a polarizing membrane. The saponified optical compensatory sheet (TAC-1) prepared in Example 45 was then laminated on one surface of the polarizing membrane with a polyvinyl alcohol adhesive so that the longitudinal direction of TAC-1 might be parallel to that of the polarizing membrane and so that the average direction of the slow axis of TAC-1 might be parallel to the transmission axis of the polarizing membrane.

On the other surface of the membrane, a commercially available cellulose triacetate film [Fujitac TD80UF, Fuji Photo Film Co., Ltd.] was saponified and laminated with a polyvinyl alcohol adhesive. Thus, a polarizing plate was prepared.

COMPARATIVE EXAMPLE 15

(Preparation of Polarizing Plate)

The procedure of Example 46 was repeated except that the not saponified optical compensatory sheet (TAC-1) prepared in Example 45 was used, to prepare a polarizing plate.

(Durability Test of Polarizing Plate)

Each of the polarizing plates prepared in Example 46 and Comparative Example 15 was laminated on a glass plate with an acrylic adhesive, aged under the conditions of high temperature and elevated pressure, and left in a thermostat at 90° C. for 1,000 hours. The thus-treated plate was observed with the eyes to check whether the cellulose acetate film (optical compensatory sheet) was separated from the polarizing membrane or not, and whether bubbles were seen or not. The results are set forth in Table 16.

TABLE 16

| | Separation*[1] | Bubbles*[2] |
|---|---|---|
| Example 46 | Not separated | Not seen |
| Comp. Ex. 15 | Separated | Seen |

Remark:
*[1]Separation or not: Whether the cellulose acetate film (optical compensatory sheet) was separated from the polarizing membrane or not
*[2]Bubbles: Whether bubbles were seen or not (Viewing Angle Character of Polarizing Plate Attached on Liquid Crystal Cell of Vertical Alignment Mode)

A pair of polarizing plates and a pair of optical compensatory sheets were removed from a commercially available liquid crystal display (VL-1530S, Fujitsu, Ltd.), which has a liquid crystal cell comprising vertically aligned liquid crystal molecules. In place of the removed members, the polarizing plate prepared in Example 46 was laminated on each side (each of the backlight side and the observer side) of the cell with an adhesive, so that the cellulose acetate film prepared in Example 45 might be on the liquid crystal cell side. The polarizing plate on the observer side was placed so that the transmission axis might be in the up-down direction, while the plate on the backlight side was placed so that the transmission axis might be in the left-right direction. Thus, the polarizing plates were arranged in cross-Nicol position.

The viewing angle character of the obtained liquid crystal display was measured by means of a measuring apparatus (EZ-Contrast 160D, ELDIM), and thereby it was found that the angle range giving a contrast ratio of 10 was 160° or more (in up-down direction) or 160° or more (in left-right direction).

(Viewing Angle Character of Polarizing Plate Attached on Liquid Crystal Cell of TN Mode)

A pair of polarizing plates were removed from a commercially available liquid crystal display (6E-A3, Sharp Corporation), which had a liquid crystal cell of TN mode. In place of the removed members, the polarizing plate prepared in Example 46 was laminated on each side (each of the backlight side and the observer side) of the cell with an adhesive, so that the cellulose acetate film prepared in Example 45 might be on the liquid crystal cell side. The polarizing plate on the observer side was placed so that the transmission axis might be in the up-down direction, while the plate on the backlight side was placed so that the transmission axis might be in the left-right direction. Thus, the polarizing plates were arranged in cross-Nicol position.

The viewing angle character of the obtained liquid crystal display was measured by means of a measuring apparatus (EZ-Contrast 160D, ELDIM), and thereby it was found that the angle range giving a contrast ratio of 10 without tone inversion was 45° (in up-down direction) or 160° (in left-right direction).

EXAMPLE 47

(Preparation of Phase Retarder)

At room temperature, 120 weight parts of cellulose triacetate (average acetic acid content: 59.2%), 9.36 weight parts of triphenyl phosphate, 4.68 weight parts of biphenyl-diphenyl phosphate, 1.50 weight parts of the retardation increasing agent used in Example 1, 2.00 weight parts of tribenzylamine, 543.14 weight parts of methylene chloride, 99.35 weight parts of methanol, and 19.87 weight parts of n-butanol were mixed to prepare a solution (dope).

The dope was cast on a band, dried at room temperature for 1 minute, and further dried at 45° C. for 5 minutes. The formed film, which contained the remaining solvent in the amount of 30 wt. %, was peeled from the band, dried at 120° C. for 10 minutes, and stretched at 130° C. parallel to the casting direction while allowed to shrink freely in the perpendicular direction. After stretched by 20%, the film was dried at 120° C. for 30 minutes and then taken out. The obtained film contained the remaining solvent in the amount of 0.1 wt. %.

The formed cellulose acetate film (phase retarder) had the thickness of 54 μm, and its retardation values Re450, Re550 and Re590 were measured at 450 nm, 550 nm and 590 nm by means of a measuring apparatus (EZ-Contrast 160D, ELDIM) to find 118.3 nm, 137.2 nm and 140.7 nm, respectively. Accordingly, it was confirmed that the cellulose acetate film gave λ/4 in a wide wavelength region. Thus, a λ/4 plate was obtained.

Further, the refractive index was measured by means of an Abbe's refractometer and also the angular dependence of retardation was measured at 550 nm, to determine the refractive index (nx) in the direction parallel to the slow axis in the plane, the refractive index (ny) in the direction perpendicular to the slow axis in the plane, and the refractive index (nz) in the thickness direction. From the obtained refractive indexes at 550 nm, the value of $(nx-nz)/(nx-ny)$ was calculated to find 1.58.

EXAMPLE 48

(Preparation of Retarder)

The dope prepared in Example 47 was cast by means of a band casting machine to form a film containing the remaining solvent in the amount of 15 wt. %. The film was laterally stretched with a tenter at 150° C. by 45%.

The stretched cellulose acetate film (phase retarder) had the thickness of 40 μm, and its retardation values Re450, Re550 and Re590 were measured at 450 nm, 550 nm and 590 nm by means of a measuring apparatus (EZ-Contrast 160D, ELDIM) to find 118.3 nm, 137.2 nm and 140.7 nm, respectively. Accordingly, it was confirmed that the cellulose acetate film gave λ/4 in a wide wavelength region. Thus, a λ/4 plate was obtained.

Further, the refractive index was measured by means of an Abbe's refractometer and also the angular dependence of retardation was measured at 550 nm, to determine the refractive index (nx) in the direction parallel to the slow axis in the plane, the refractive index (ny) in the direction perpendicular to the slow axis in the plane, and the refractive index (nz) in the thickness direction. From the obtained refractive indexes at 550 nm, the value of (nx−nz)/(nx−ny) was calculated to find 1.70.

EXAMPLE 49

(Preparation of Phase Retarder)

At room temperature, 120 weight parts of cellulose triacetate (average acetic acid content: 59.0%), 2.0 weight parts of the retardation increasing agent used in Example 1, 9.36 weight parts of triphenyl phosphate, 4.68 weight parts of biphenyldiphenyl phosphate, 543.14 weight parts of methylene chloride, 99.35 weight parts of methanol and 19.87 weight parts of n-butanol were mixed to prepare a solution (dope).

The dope was cast on a band, dried at room temperature for 1 minute, and further dried at 45° C. for 5 minutes. The formed film, which contained the remaining solvent in the amount of 30 wt. %, was peeled from the band, dried at 120° C. for 5 minutes, and stretched at 130° C. at the angle of 45° to the casting direction by about 50%. After dried at 130° C. for 20 minutes, the film was taken out. The obtained film contained the remaining solvent in the amount of 0.1 wt. %.

The formed cellulose acetate film (phase retarder) had the thickness of 63 μm, and its retardation values Re450, Re550 and Re590 were measured at 450 nm, 550 nm and 590 nm by means of a measuring apparatus (EZ-Contrast 160D, ELDIM) to find 115.7 nm, 137.4 nm and 141.1 nm, respectively. Accordingly, it was confirmed that the cellulose acetate film gave λ/4 in a wide wavelength region. Thus, a λ/4 plate was obtained. The Rth retardation value (Rth) was 137.5 nm.

Further, the refractive index was measured by means of an Abbe's refractometer and also the angular dependence of retardation was measured at 550 nm, to determine the refractive index (nx) in the direction parallel to the slow axis in the plane, the refractive index (ny) in the direction perpendicular to the slow axis in the plane, and the refractive index (nz) in the thickness direction. From the obtained refractive indexes at 550 nm, the value of (nx−nz)/(nx−ny) was calculated to find 1.50.

EXAMPLE 50

(Preparation of Circularly Polarizing Plate)

The cellulose acetate film prepared in Example 47 and a commercially available polarizing plate (Sunritz Co., Ltd.) were laminated with an adhesive so that the slow axis of the cellulose acetate film might be at the angle of 45° to the transmission axis of the polarizing plate, to prepare a circularly polarizing plate.

The obtained circularly polarizing plate gave almost complete circularly polarized light in a wide wavelength region (450 to 590 nm).

EXAMPLE 51

(Preparation of Polarizing Membrane)

Polyvinyl alcohol (average polymerization degree: 4,000, saponification degree: 99.8 mol. %) was dissolved in water to prepare 4.0% aqueous solution. The solution was cast on a band, and dried to form a film. The film was then peeled off, stretched in the casing direction, immersed for 1 minute in an aqueous solution containing 0.5 g/l of iodine and 50 g/l of potassium iodine (liquid temperature: 30° C.), further immersed for 5 minutes in an aqueous solution containing 100 g/l of boric acid and 60 g/l of potassium iodide (liquid temperature: 70° C.), and washed in a water bath (temperature: 20° C.) for 10 seconds. The washed film was dried at 80° C. for 5 minutes to prepare a long polarizing membrane (width: 1,290 mm, thickness: 20 μm).

(Preparation of Circularly Polarizing Plate)

The cellulose acetate film prepared in Example 49, the above-prepared polarizing membrane and a commercially available cellulose triacetate film (Fujitac, Fuji Photo Film Co., Ltd.) were piled up in this order and laminated through roll-to-roll, to prepare a circularly polarizing plate.

The obtained circularly polarizing plate gave almost complete circularly polarized light in a wide wavelength region (450 to 590 nm).

EXAMPLE 52

(Preparation of TN-mode Liquid Crystal Display of Reflection Type)

A glass substrate having an ITO transparent electrode and another glass substrate having a finely rugged aluminum reflective electrode were prepared. On the electrode of each glass substrate, a polyimide orientation layer (SE-7992, Nissan Chemicals Co., Ltd.) was formed and subjected to rubbing treatment. The substrates were laminated so that the polyimide orientation layers might face to each other, and a spacer of 3.4 μm was inserted between the substrates. The substrates were placed so that the rubbing directions of the orientation layers might be crossed at the angle of 110°. To the gap between the substrates, a liquid crystal compound (MLC-6252, Merck) was injected to form a liquid crystal layer. Thus, a liquid crystal cell of TN mode (twisted angle: 70°, Δnd: 269 nm) was produced.

The λ/4 plate prepared in Example 47 was laminated with an adhesive on the glass substrate having the ITO transparent electrode, and further thereon a polarizing plate (a polarizing membrane laminated with a protective film whose surface was subjected to AR treatment) was laminated.

To the thus-prepared liquid crystal display of reflection type, voltage of a square wave 1 kHz was applied. The display was then observed with eyes, and thereby it was confirmed that an image of neutral gray was given without undesirable coloring in either white mode (1.5 V) or black mode (4.5 V).

The contrast ratio of reflection brightness was measured by means of a meter (EZ-Contrast 160D, ELDIM), and thereby it was found that the front contrast ratio was 25 and that the viewing angle giving the contrast ratio of 3 was not less than 120° (up-downward) or not less than 120° (left-rightward). Further, the display was subjected to the durability test (temperature: 60° C., relative humidity: 90%) for 500 hours, but even so the displayed image had no defect.

EXAMPLE 53

(Preparation of STN-mode Liquid Crystal Display of Reflection Type)

A glass substrate having an ITO transparent electrode and another glass substrate having a smooth aluminum reflective electrode were prepared. On the electrode of each glass substrate, a polyimide orientation layer (SE-150, Nissan Chemicals Co., Ltd.) was formed and subjected to rubbing treatment. The substrates were laminated so that the polyimide orientation layers might face to each other, and a spacer of 6.0 μm was inserted between the substrates. The substrates were placed so that the rubbing directions of the orientation layers might be crossed at the angle of 60°. To the gap between the substrates, a liquid crystal compound (ZLI-2977, Merck) was injected to form a liquid crystal layer. Thus, a liquid crystal cell of STN mode (twisted angle: 240°, Δnd: 791 nm) was produced.

A commercially available internal diffusing sheet (IDS, Dai Nippon Printing Co., Ltd.) and the circularly polarizing plate prepared in Example 51 were laminated in this order with an adhesive on the glass substrate having the ITO transparent electrode, so the polarizing plate might be the top or bottom.

To the thus-prepared liquid crystal display of reflection type, voltage of a square wave 55 Hz was applied. The display was then observed with eyes, and thereby it was confirmed that an image of neutral gray was given without undesirable coloring in either white mode (2.5 V) or black mode (2.0 V).

The contrast ratio of reflection brightness was measured by means of a meter (EZ-Contrast 160D, ELDIM), and thereby it was found that the front contrast ratio was 8 and that the viewing angle giving the contrast ratio of 3 was 90° (up-downward) or 105° (left-rightward).

EXAMPLE 54

(Preparation of HAN-mode Liquid Crystal Display of Reflection Type)

A glass substrate having an ITO transparent electrode and another glass substrate having a smooth aluminum reflective electrode were prepared. On the ITO transparent electrode, a polyimide orientation layer (SE-610, Nissan Chemicals Co., Ltd.) was formed and subjected to rubbing treatment. On the aluminum reflective electrode, a vertical orientation layer (SE-1211, Nissan Chemicals Co., Ltd.) was formed and not subjected to rubbing treatment. The substrates were laminated so that the orientation layers might face to each other, and a spacer of 4.0 μm was inserted between the substrates. To the gap between the substrates, a liquid crystal compound (ZLI-1565, Merck) was injected to form a liquid crystal layer. Thus, a liquid crystal cell of HAN mode (Δnd: 519 nm) was produced.

The λ/4 plate prepared in Example 47 was laminated with an adhesive on the glass substrate having the ITO transparent electrode, and further thereon a commercially available polarizing plate (NPF-G1225DU, Nitto Denko K.K.) was laminated. Furthermore, thereon a light-diffusing membrane (Lumisty, Sumitomo Chemical Co., Ltd.) was laminated.

To the thus-prepared liquid crystal display of reflection type, voltage of a square wave 55 Hz was applied. The display was then observed with eyes, and thereby it was confirmed that an image of neutral gray was given without undesirable coloring in either white mode (2.0 V) or black mode (0.8 V).

The contrast ratio of reflection brightness was measured by means of a meter (EZ-Contrast 160D, ELDIM), and thereby it was found that the front contrast ratio was 8 and that the viewing angle giving the contrast ratio of 3 was not less than 120° (up-downward) or not less than 120° (left-rightward).

EXAMPLE 55

(Preparation of Liquid Crystal Display of G/H Type)

On a glass substrate having an ITO transparent electrode, a polymer for forming a vertical orientation layer (LQ-1800, Hitachi-Du Pont Microsystems Co., Ltd.) was applied, dried and subjected to rubbing treatment.

The λ/4 plate prepared in Example 48 was laminated with an adhesive on an aluminum-deposited glass substrate (reflection board). On the λ/4 plate, a SIO layer was formed with sputtering, and further thereon an ITO transparent electrode was provided. Furthermore, thereon a solution of the polymer for forming a vertical orientation layer (LQ-1800, Hitachi-Du Pont Microsystems Co., Ltd.) was applied, dried and subjected to rubbing treatment at the angle of 45° to the slow axis of the λ/4 plate.

The above-prepared two substrates were laminated so that the orientation layers might face to each other and so that the rubbing direction of the orientation layers might be anti-parallel, and a spacer of 7.6 pm was inserted between the substrates. To the gap between the substrates, a mixture consisting of 2.0 wt. % of dichromatic dye (NKX-1366, Japan Photosensitive Dyes Co., Ltd.) and 98.0 wt. % of liquid crystal compound (ZLI-2806, Merck) was injected according to the vacuum injection method, to form a liquid crystal layer.

Voltage of a square wave 1 kHz was applied between the ITO electrodes in the thus-prepared guest-host type liquid crystal display of reflection type. The transmittances in white mode (1 V) or black mode (10 V) were measured to find 65% and 6%, respectively. Accordingly, the ratio of transmittances (contrast ratio) between the image in white mode (1 V) and that in black mode (10 V) was 11:1. The viewing angle giving the contrast ratio of 2:1 was measured to find 120° or more in both directions of up-down and left-right. The transmittances were also measured while the voltage was changed, and thereby it was confirmed that hysteresis did not appear in the transmittance-voltage curve.

COMPARATIVE EXAMPLE 16

(Preparation of λ/4 Plate)

Polycarbonate (weight average molecular weight: 100,000) was dissolved in methylene chloride to prepare a 17 wt. % solution. The solution was cast on a glass plate to form a film (dry thickness: 80 μm), dried at room temperature for 30 minutes, and further dried at 70° C. for 30 minutes. The formed polycarbonate film (evaporated amount: about 1 wt. %) was peeled from the glass plate, and cut into pieces (size: 5 cm×10 cm). One of the pieces was uniaxially stretched at 158° C. to prepare a stretched birefringent polycarbonate film.

The retardation values Re450, Re550 and Re590 of the formed polycarbonate film (λ/4 plate) were measured at 450 nm, 550 nm and 590 nm by means of an ellipsometer [M-150, JASCO], to find 147.8 nm, 137.5 nm and 134.9 nm, respectively.

(Preparation of λ/2 Plate)

The above procedure was repeated except that the film was made to have the dry thickness of 100 μm, to prepare a λ/2 plate.

The retardation values Re450, Re550 and Re590 of the formed polycarbonate film (k/2 plate) were measured at 450 nm, 550 nm and 590 nm by means of an ellipsometer [M-150, JASCO], to find 295.0 nm, 275.0 nm and 269.8 nm, respectively.

(Preparation of TN-mode Liquid Crystal Display of Reflection Type)

The above λ/4 plate, the above λ/2 plate and a polarizing plate (a polarizing membrane laminated with a protective film whose surface was subjected to AR treatment) were laminated in this order with an adhesive on the glass substrate with an ITO transparent electrode in the liquid crystal cell of TN-mode prepared in Example 52. They were placed so that the slow axis of the polarizing plate might be at the angle of 20° to the slow axis of the λ/2 plate, and so that the slow axis of the λ/2 plate might be at the angle of 55° to the slow axis of the λ/4 plate.

To the thus-prepared liquid crystal display of reflection type, voltage of a square wave 1 kHz was applied. The display was then observed with eyes, and thereby it was confirmed that the displayed image was slightly yellowed in white mode (1.5 V) and slightly blued in black mode (4.5 V).

The contrast ratio of reflection brightness was measured by means of a meter (EZ-Contrast 160D, ELDIM), and thereby it was found that the front contrast ratio was 10 and that the viewing angle giving the contrast ratio of 3 was 100° (up-downward) or 80° (left-rightward). Further, the display was subjected to the durability test (temperature: 60° C., relative humidity: 90% RH) for 500 hours, and as a result it was observed that the thus treated display gave a displayed image framed with leaked light.

EXAMPLE 56

(Preparation of Cellulose Acetate Film SE5)

At room temperature, 45 weight parts of cellulose triacetate (average acetic acid content: 60.9%), 3.12 weight parts of the following retardation increasing agent (4), 232.7 weight parts of methylene chloride, 42.57 weight parts of methanol, and 8.50 weight parts of n-butanol were mixed to prepare a solution (dope).

Retardation Increasing Agent (4)

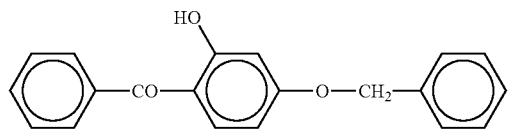

The obtained dope was cast by means of a band casting machine (effective length: 6 m), and dried to form a film SE5 (dry thickness: 60 μm).

The retardation values Re550 and Rth550 of the formed cellulose acetate film SE5 were measured at 550 nm by means of an ellipsometer [M-150, JASCO], to find 5 nm and 120 nm, respectively.

A gelatin undercoating layer of 0.1 μm thickness was formed on the cellulose acetate film SE5, and thereon the coating solution for orientation layer used in Example 2 was applied in the amount of 28 ml/m$^2$ by means of a wire bar coater of #16. The applied solution was dried with hot air at 60° C. for 60 seconds, and then further dried with hot air at 90° C. for 150 seconds.

The formed layer was subjected to rubbing treatment in which the rubbing direction was at the angle of 450 to the slow axis (measured at 632.8 nm) of the cellulose acetate film SE5.

Independently, 41.01 g of the discotic (liquid crystal) compound used in Example 2, 4.06 g of trimethylolpropane triacrylate denatured with ethylene oxide (V#360, Osaka Organic Chemicals Co., Ltd.), 0.90 g of cellulose acetate butyrate (CAB-551-0.2, Eastman Chemical), 0.23 g of cellulose acetate butyrate (CAB-531-1, Eastman Chemical), 1.35 g of a photopolymerization initiator (Irgacure 907, Ciba-Geigy) and 0.45 g of a sensitizer (Kayacure DETX, Nippon Kayaku Co., Ltd.) were dissolved in 102 g of methyl ethyl ketone. The coating solution was then applied on the above-formed orientation layer by means of a wire bar coater of #3. The thus-treated film was fixed on a metal frame, and heated in a thermostat at 130° C. for 2 minutes to align the molecules of the discotic compound. The film was then irradiated at 130° C. for 4 seconds with ultraviolet rays emitted from a high pressure mercury lamp of 120 W/cm, to polymerize the discotic compound. The film was cooled to room temperature. Thus, an optically anisotropic layer 1E was formed.

The Re retardation value (Re550) of the optically anisotropic layer 1E was measured at 550 nm, and found 40 nm. The average angle (inclined angle) between the disc plane and the cellulose acetate film SE was 42°.

(Preparation of Elliptically Polarizing Plate E)

The prepared cellulose acetate film SE5 was saponified in an alkali bath, and was laminated with an adhesive on a polarizing membrane of polyvinyl alcohol and iodine, to prepare a polarizing plate. Further, the polarizing plate and the cellulose acetate film having the optically anisotropic layer 1E was laminated so that the SE5 face of the plate and the cellulose acetate face (back face of the anisotropic layer 1E) might be in contact. The transmission axis of the polarizing membrane was placed perpendicularly to the slow axis of the cellulose acetate film with the anisotropic layer 1E (perpendicularly to the slow axis of the film SE5).

EXAMPLE 57

(Preparation of Cellulose Acetate Film SE6)

At room temperature, 45 weight parts of cellulose triacetate (average acetic acid content: 60.9%), 3.62 weight parts of the following retardation increasing agent (1), 232.72 weight parts of methylene chloride, 42.57 weight parts of methanol, and 8.50 weight parts of n-butanol were mixed to prepare a solution (dope).

Retardation Increasing Agent (1)

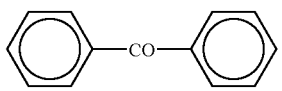

The obtained dope was cast by means of a band casting machine (effective length: 6 m), and stretched with a tenter to form a film SE6 (dry thickness: 40 μm).

The retardation values Re550 and Rth550 of the formed cellulose acetate film SE6 were measured at 550 nm by means of an ellipsometer [M-150, JASCO], to find 18 nm and 100 nm, respectively.

The surface of the obtained film SE6 was saponified with a 2 N aqueous NaOH solution, and washed with water. The contact angle of the saponified surface with pure water was 30°.

On the saponified surface, the coating solution for orientation layer used in Example 2 was applied in the amount of 28 ml/m² by means of a wire bar coater of #16. The applied solution was dried with hot air at 60° C. for 60 seconds, and then further dried with hot air at 90° C. for 150 seconds.

The formed layer was subjected to rubbing treatment in which the rubbing direction was at the angle of 45° to the slow axis (measured at 632.8 nm) of the cellulose acetate film SE6.

Independently, 41.01 g of the discotic (liquid crystal) compound used in Example 2, 4.06 g of trimethylolpropane triacrylate denatured with ethylene oxide (V#360, Osaka Organic Chemicals Co., Ltd.), 0.90 g of cellulose acetate butyrate (CAB-551-0.2, Eastman Chemical), Q.23 g of cellulose acetate butyrate (CAB-531-1, Eastman Chemical), 1.35 g of a photopolymerization initiator (Irgacure 907, Ciba-Geigy) and 0.45 g of a sensitizer (Kayacure DETX, Nippon Kayaku Co., Ltd.) were dissolved in 102 g of methyl ethyl ketone. The coating solution was then applied on the above-formed orientation layer by means of a wire bar coater of #3. The thus-treated film was fixed on a metal frame, and heated in a thermostat at 130° C. for 2 minutes to align the molecules of the discotic compound. The film was then irradiated at 130° C. for 4 seconds with ultraviolet rays emitted from a high pressure mercury lamp of 120 W/cm, to polymerize the discotic compound. The film was cooled to room temperature. Thus, an optically anisotropic layer 1F was formed.

The Re retardation value (Re550) of the optically anisotropic layer 1F was measured at 550 nm, and found 40 nm. The average angle (inclined angle) between the disc plane and the cellulose acetate film SE was 42°.

(Preparation of Elliptically Polarizing Plate F)

The prepared cellulose acetate film SE6 was saponified in an alkali bath, and was laminated with an adhesive on a polarizing membrane of polyvinyl alcohol and iodine, to prepare a polarizing plate. Further, the polarizing plate and the cellulose acetate film having the optically anisotropic layer 1F was laminated so that the SE6 face of the plate and the cellulose acetate face might be in contact. The transmission axis of the polarizing membrane was placed parallel to the slow axis of the cellulose acetate film with the anisotropic layer iF (parallel to the slow axis of the film SE6).

COMPARATIVE EXAMPLE 17

(Preparation of Cellulose Acetate Film SE7)

On a commercially available cellulose triacetate film (Fujitac TD80UF, Fuji Photo Film Co., Ltd.) having 100 μm thickness, a gelatin undercoating layer of 0.1 μm thickness was provided to prepare a cellulose acetate film SE7.

The retardation values (Re550 and Rth550) were measured at 550 nm to find 0.6 nm and 35 nm, respectively.

On the gelatin undercoating layer of SE7, the coating solution for orientation layer used in Example 2 was applied in the amount of 28 ml/m² by means of a wire bar coater of #16. The applied solution was dried with hot air at 60° C. for 60 seconds, and then further dried with hot air at 90° C. for 150 seconds.

The formed layer was subjected to rubbing treatment in which the rubbing direction was at the angle of 450 to the slow axis (measured at 632.8 nm) of the cellulose acetate film.

Independently, 41.01 g of the discotic (liquid crystal) compound used in Example 2, 4.06 g of trimethylolpropane triacrylate denatured with ethylene oxide (V#360, Osaka Organic Chemicals Co., Ltd.), 0.90 g of cellulose acetate butyrate (CAB-551-0.2, Eastman Chemical), 0.23 g of cellulose acetate butyrate (CAB-531-1, Eastman Chemical), 1.35 g of a photopolymerization initiator (Irgacure 907, Ciba-Geigy) and 0.45 g of a sensitizer (Kayacure DETX, Nippon Kayaku Co., Ltd.) were dissolved in 102 g of methyl ethyl ketone. The coating solution was then applied on the above-formed orientation layer by means of a wire bar coater of #3. The thus-treated film was fixed on a metal frame, and heated in a thermostat at 130° C. for 2 minutes to align the molecules of the discotic compound. The film was then irradiated at 130° C. for 1 minute with ultraviolet rays emitted from a high pressure mercury lamp of 120 W/cm, to polymerize the discotic compound. The film was cooled to room temperature. Thus, an optically anisotropic layer 1G was formed.

The Re retardation value (Re550) of the optically anisotropic layer 1G was measured at 550 nm, and found 40 nm. The average angle (inclined angle) between the disc plane and the cellulose acetate film SE7 was 42°.

Resin of 2,2'-bis(4-hydroxyphenyl)propane polycarbonate (viscosity average molecular weight: 28,000) was dissolved in dichloromethane to prepare 18 wt. % solution. The solution was defoamed in vacuo to prepare a dope. The dope was cast on a band, and dried at 50° C. for 10 minutes, and the formed film was peeled and further dried at 100° C. for 10 minutes. The film was then longitudinally stretched at 170° C. by 3.3%, and laterally stretched by 4.7% to obtain a biaxially stretched film of 80 μm thickness in the form of roll. The longitudinal stretching was controlled with a pair of checking rollers differentially rotating, and the lateral stretching was controlled with width of the tenter.

The retardation values (Re550 and Rth550) were measured at 550 nm to find 4 nm and 205 nm, respectively.

(Preparation of Elliptically Polarizing Plate G)

The prepared polycarbonate film was laminated with an adhesive on a polarizing membrane of polyvinyl alcohol and iodine, to prepare a polarizing plate. Further, the polarizing plate and the cellulose acetate film having the optically anisotropic layer 1G was laminated so that the polycarbonate face of the plate and the cellulose acetate SE7 face might be in contact, to prepare an elliptically polarizing plate G. The transmission axis of the polarizing membrane was placed perpendicularly to the slow axis of the cellulose acetate film with the anisotropic layer 1G (perpendicularly to the slow axis of the polycarbonate film).

(Optical Characters of Elliptically Polarizing Plates)

The optical characters of the elliptically polarizing plates prepared in Examples 56, 57 and Comparative Example 17 are set forth in Table 17.

TABLE 17

|  | First optical anisotropic layer | | Second optical anisotropic layer | |
| --- | --- | --- | --- | --- |
|  | Re550*[1] | β*[3] | Re550*[1] | Rth550*[2] |
| Example 56 | 40 nm | 42° | 12.0 nm | 250 nm |
| Example 57 | 40 nm | 42° | 40.0 nm | 210 nm |
| Comp. 17 | 40 nm | 42° | 3.6 nm | 235 nm |

Remark:
*[1]Re550: Re retardation value measured at 550 nm
*[2]Rth550: Rth retardation value measured at 550 nm
*[3]β: Average inclined angle of disc plane

EXAMPLE 58

(Preparation of Liquid Crystal Cell of Bend Alignment Mode)

On a glass plate having an ITO electrode, an orientation film of polyimide was provided and subjected to a rubbing treatment. This procedure was repeated to prepare two substrates, and the substrates were arranged face-to-face so that the rubbing directions might be parallel and that the cell gap might be 6 μm. Between them, a liquid crystal having Δn of 0.1396 (ZLI1132, Merck & Co., Inc.) was introduced to prepare a liquid crystal cell of bend alignment.

While voltage (5 or 5.5 V) of a square wave 55 Hz was applied to the prepared liquid crystal cell of bend alignment mode, the Re retardation values were measured at 436 nm, 546 nm and 611.5 nm.

(Preparation of Liquid Crystal Display)

Two elliptically polarizing plates E prepared in Example 56 were laminated on the prepared liquid crystal cell of bend alignment mode so that the cell might be between the plates. The plates were arranged so that the optically anisotropic layer in each plate might face to the cell substrate and so that the rubbing directions of the cell and the optically anisotropic layer might be anti-parallel.

EXAMPLE 59

(Preparation of Liquid Crystal Display)

Two elliptically polarizing plates F prepared in Example 57 were laminated on the liquid crystal cell of bend alignment mode prepared in Example 58 so that the cell might be between the plates. The plates were arranged so that the optically anisotropic layer in each plate might face to the cell substrate and so that the rubbing directions of the cell and the optically anisotropic layer might be anti-parallel.

COMPARATIVE EXAMPLE 18

(Preparation of Liquid Crystal Display)

Two elliptically polarizing plates G prepared in Comparative Example 17 were laminated on the liquid crystal cell of bend alignment mode prepared in Example 58 so that the cell might be between the plates. The plates were arranged so that the optically anisotropic layer in each plate might face to the cell substrate and so that the rubbing directions of the cell and the optically anisotropic layer might be anti-parallel.

(Evaluation of Liquid Crystal Display)

Voltage of a square wave 55 Hz was applied to the liquid crystal cell of each of the liquid crystal displays prepared in Examples 58, 59 and Comparative Example 18. An image was displayed according to normally white mode (white: 2V, black: 5V). The viewing angle giving the contrast ratio (transmittance ratio of white display/black display) of 10 was measured in both up-down and left-right directions.

Further, after the backlight was kept on for 2 hours, a black image was displayed and its image quality was observed.

TABLE 18

|  | Viewing angle | | | | |
| --- | --- | --- | --- | --- | --- |
|  | Up | Down | Left | Right | Image quality |
| Example 58 | 80° | 73° | 59° | 57° | Good |
| Example 59 | 80° | 75° | 78° | 78° | Good |
| Comp. Ex. 18 | 80° | 58° | 56° | 55° | Light leaked* |

Remark:
*Light leaked:
It was observed that transmittance increased at the four corners of the screen to leak light.

The invention claimed is:

1. An optical compensatory sheet comprising a cellulose acetate film which contains 100 weight parts of cellulose acetate having an acetic acid content of 59.0 to 61.5%, and 0.01 to 20 weight parts of an aromatic compound having at least two aromatic rings, wherein the cellulose acetate film is biaxially stretched, wherein the cellulose acetate film has an Re retardation value measured at 550 nm (Re550) in the range of 0 to 70 nm, an Rth retardation value measured at 550 nm (Rth550) in the range of 70 to 400 nm, and a thickness in the range of 10 to 70 μm, and wherein the cellulose acetate film has at least one surface having a surface energy of 55 to 75 mN/m.

2. The optical compensatory sheet as defined in claim 1, wherein the Re550 value is in the range of 20 to 70 nm.

3. The optical compensatory sheet as defined in claim 1, wherein the cellulose acetate film is subjected to a saponification treatment, and the saponification treatment changes the Re550 value by 3 nm or less.

4. The optical compensatory sheet as defined in claim 1, wherein the cellulose acetate film has at least one surface subjected to a corona discharge treatment at a discharge frequency of 50 Hz to 5,000 kHz.

5. The optical compensatory sheet as defined in claim 1, wherein the cellulose acetate film has at least one surface saponified with an alkaline solution of a concentration in the range of 0.1 to 3.0 N.

6. The optical compensatory sheet as defined in claim 1, wherein the stretching treatment is conducted at a stretching ratio in the range of 3 to 100%.

7. The optical compensatory sheet as defined in claim 1, wherein the Re550 value is in the range of 0 to 20 nm.

8. The optical compensatory sheet as defined in claim 7, wherein an optically anisotropic layer is formed from a liquid crystal compound on the cellulose acetate film.

9. The optical compensatory sheet as defined in claim 8, wherein the liquid crystal compound is a discotic compound.

10. The optical compensatory sheet as defined in claim 1, wherein the aromatic compound has at least one 1,3,5-triazine ring.

11. A polarizing plate which comprises a pair of transparent protective films and a polarizing membrane provided between the films, one of said transparent protective films comprising a cellulose acetate film which contains 100 weight parts of cellulose acetate having an acetic acid content of 59.0 to 61.5% and 0.01 to 20 weight parts of an aromatic compound having at least two aromatic rings, wherein the cellulose acetate film is biaxially stretched, and wherein the cellulose acetate film has an Re retardation value measured at 550 nm (Re550) in the range of 0 to 70 nm, an Rth retardation value measured at 550 nm (Rth550) in the range of 70 to 400 nm, and a thickness in the range of 10 to 70 μm, and wherein the cellulose acetate film has at least one surface having a surface enemy of 55 to 75 mN/m.

12. A liquid crystal display comprising a pair of polarizing plates and a liquid crystal cell provided between the plates, wherein each of the polarizing plates comprises a pair of transparent protective films and a polarizing membrane provided between the films, at least one of said transparent protective films placed between the cell and the membranes comprising a cellulose acetate film which contains 100 weight parts of cellulose acetate having an acetic acid content of 59.0 to 61.5% and 0.01 to 20 weight parts to an aromatic compound having at least two aromatic rings, wherein the cellulose acetate film is biaxially stretched, and wherein the cellulose acetate film has an Re retardation value measured at 550 nm (Re550) in the range of 0 to 70 nm, an Rth retardation value measured at 550 nm (Rth550) in the range of 70 to 400 nm, and a thickness in the range of 10 to 70 μm, and wherein the cellulose acetate film has at least one surface having a surface energy of 55 to 75 mN/m.

13. The liquid crystal display as defined in claim 12, wherein the liquid crystal cell works according to TN mode, VA mode, MVA mode, n-ASM mode or OCB mode.

14. A liquid crystal display comprising a pair of polarizing plates and a liquid crystal cell of bend alignment mode provided between the plates, wherein at least one polarizing plate is an elliptically polarizing plate which comprises a first optically anisotropic layer comprising discotic molecules oriented in hybrid alignment, a second optically anisotropic layer comprising at least one cellulose acetate film, and a polarizing membrane, said polarizing membrane being arranged as an outermost layer, said first and second optically anisotropic layers and said polarizing membrane being so arranged that a direction giving the maximum refractive index in plane of the first optically anisotropic layer is oriented essentially at an angle of 45° to a transmission axis in plane of the polarizing membrane and that a direction giving the maximum refractive index in plane of the second optically anisotropic layer is directed essentially parallel or perpendicular to a transmission axis in plane of the polarizing membrane, wherein the cellulose acetate film of the second optically anisotropic layer contains 100 weight parts of cellulose acetate having an acetic acid content of 59.0 to 61.5% and 0.01 to 20 weight parts of an aromatic compound having at least two aromatic rings, wherein the cellulose acetate film is biaxially stretched, said cellulose acetate film having an Re retardation value measured at 550 nm (Re550) in the range of 1 to 20 nm, an Rth retardation value measured at 550 nm (Rth550) in the range of 150 to 300 nm, and a thickness in the range of 10 to 70 μm, and wherein the cellulose acetate film has at least one surface having a surface energy of 55 to 75 mN/m.

15. A liquid crystal display comprising a pair of polarizing plates and a liquid crystal cell of bend alignment mode provided between the plates, wherein at least one polarizing plate is an elliptically polarizing plate which comprises a first optically anisotropic layer comprising discotic molecules oriented in hybrid alignment, a second optically anisotropic layer comprising at least one cellulose acetate film, and a polarizing membrane, said polarizing membrane being arranged as an outermost layer, said first and second optically anisotropic layers and said polarizing membrane being so arranged that a direction giving the maximum refractive index in plane of the first optically anisotropic layer is oriented essentially at an angle of 45° to a transmission axis in plane of the polarizing membrane and that a direction giving the maximum refractive index in plane of the second optically anisotropic layer is directed essentially parallel to a transmission axis in plane of the polarizing membrane, wherein the cellulose acetate film of the second optically anisotropic layer contains 100 weight parts of cellulose acetate having an acetic acid content of 59.0 to 61.5% and 0.01 to 20 weight parts of an aromatic compound having at least two aromatic rings, wherein the cellulose acetate film is biaxially stretched, said cellulose acetate film having an Re retardation value measured at 550 nm (Re550) in the range of 20 to 70 nm, an Rth retardation value measured at 550 nm (Rth550) in the range of 150 to 300 nm, and a thickness in the range of 10 to 70 μm, and wherein the cellulose acetate film has at least one surface having a surface energy of 55 to 75 mN/m.

\* \* \* \* \*